United States Patent
Takai

(10) Patent No.: US 9,831,808 B1
(45) Date of Patent: Nov. 28, 2017

(54) ROTOR POSITION SENSING SYSTEM FOR THREE PHASE MOTORS AND RELATED METHODS

(71) Applicant: SEMICONDUCTOR COMPONENTS INDUSTRIES, LLC, Phoenix, AZ (US)

(72) Inventor: Kazumasa Takai, Kakamigahara (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/219,021

(22) Filed: Jul. 25, 2016

Related U.S. Application Data

(63) Continuation-in-part of application No. 15/215,425, filed on Jul. 20, 2016.

(51) Int. Cl.
   *H02P 6/00* (2016.01)
   *H02P 6/18* (2016.01)

(52) U.S. Cl.
   CPC .................... *H02P 6/183* (2013.01)

(58) Field of Classification Search
   USPC .... 318/400.32, 700, 400.02, 400.03, 400.04, 318/400.13, 400.33
   See application file for complete search history.

(56) References Cited

U.S. PATENT DOCUMENTS 5,608,300 A * 3/1997 Kawabata ........... B60L 11/1807
                                                       318/400.16
6,281,656 B1 * 8/2001 Masaki .................. B60L 11/14
                                                       318/700

(Continued)

FOREIGN PATENT DOCUMENTS

JP   1994-113585   4/1994
JP   1995-177788   7/1995

(Continued)

OTHER PUBLICATIONS

Jeff Wilson, "Industrial Motor Control Part 2: Introduction to ACIM and PMSM Motor Control," published online at least as early as Jul. 2009 by NXP/Freescale, available online at https://www.nxp.com/files/training_pdf/VFTF09_AZ134.pdf, last visited Jun. 16, 2016.
NXP/Freescale, "PMSM Vector Control with Single-Shunt Current-Sensing Using MC56F8013/23 Design Reference Manual," published online at least as early as Apr. 2008 by NXP/Freescale, available online at http://cache.nxp.com/files/microcontrollers/doc/ref_manual/DRM102.pdf, last visited Jun. 16, 2016.

(Continued)

*Primary Examiner* — Jorge L Carrasquillo
(74) *Attorney, Agent, or Firm* — IPTechLaw

(57) ABSTRACT

A system and method for sensing rotor position of a three-phase permanent magnet synchronous motor (PMSM) includes a controller coupled with the PMSM and causing a plurality of voltage pulses to be applied thereto. A timer and/or an analog-to-digital converter is coupled with the PMSM and measures a plurality of values (measured values) from a three-phase inverter coupled with the PMSM. Each measured value may correspond with one of the plurality of voltage pulses and includes a current value or time value corresponding with an inductance of the PMSM. One or more logic elements calculates, based on the measured values and on one or more position algorithms, a position of a rotor of the PMSM relative to a stator of the PMSM. The system is configured to calculate the position of the rotor when the rotor is in a stopped configuration and when the rotor is in a rotating configuration.

17 Claims, 35 Drawing Sheets

(56) References Cited

U.S. PATENT DOCUMENTS

| | | | | |
|---|---|---|---|---|
| 6,396,229 | B1* | 5/2002 | Sakamoto | H02P 6/18 318/400.02 |
| 7,928,675 | B2* | 4/2011 | Chen | B60L 15/025 318/400.02 |
| 8,796,974 | B2* | 8/2014 | Wang | H02K 29/12 318/400.01 |
| 9,444,375 | B2* | 9/2016 | Goetting | H02P 6/185 |
| 2002/0113569 | A1* | 8/2002 | Iijima | H02P 6/18 318/727 |
| 2005/0269982 | A1* | 12/2005 | Coles | H02P 6/185 318/400.05 |
| 2008/0129243 | A1* | 6/2008 | Nashiki | H02K 1/145 318/701 |
| 2013/0057184 | A1* | 3/2013 | Kim | H02P 6/183 318/400.02 |
| 2013/0314009 | A1 | 11/2013 | Sanchez et al. | |
| 2014/0225548 | A1 | 8/2014 | Xu et al. | |

FOREIGN PATENT DOCUMENTS

| | | | |
|---|---|---|---|
| JP | 2007-174721 A | | 7/2007 |
| JP | 2008-295113 A | | 12/2008 |
| JP | 2008295113 A | * | 12/2008 |
| JP | 2009-071926 | | 4/2009 |
| JP | 2010-220416 | | 9/2010 |

OTHER PUBLICATIONS

Shigeo Morimoto, Keisuke Kawamoto, Masayuki Sanada, Yoji Takeda, "Sensorless Control Strategy for Salient-Pole PMSM Based on Extended EMF in Rotating Reference Frame," IEEE Transactions on Industry Applications, vol. 38, No. 4, Jul./Aug. 2002, p. 1054-1061, available online at http://www.masters.dgtu.donetsk.ua/2014/etf/izvekov/library/article9.pdf, last visited Jun. 16, 2016.

NXP/Freescale, "Sensorless PMSM Field-Oriented Control," published online at least as early as Jun. 22, 2016 by NXP/Freescale, available online at http://cache.nxp.com/files/microcontrollers/doc/ref_manual/DRM148.pdf, last visited Jun. 22, 2016.

NXP/Freescale, "Three-Phase PMSM Sensorless FOC using MC56F82748 and MC56F84789 with Automated Motor Parameter Identification," published online by NXP/Freescale at least as early as Jun. 22, 2016, available online at http://cache.nxp.com/files/dsp/doc/app_note/AN5014.pdf, last visited Jun. 22, 2016.

NXP/Freescale, "3-Phase Sensorless BLDC Motor Control Using MC9S08MP16," published online by NXP/Freescale at least as early as Jun. 22, 2016, available online at http://cache.nxp.com/files/microcontrollers/doc/ref_manual/DRM117.pdf, last visited Jun. 22, 2016.

NXP/Freescale, "PMSM and BLDC Sensorless Motor Control using the 56F8013 Device," published online by NXP/Freescale at least as early as Jun. 22, 2016, available online at http://cache.nxp.com/files/dsp/doc/ref_manual/DRM077.pdf, last visited Jun. 22, 2016.

* cited by examiner

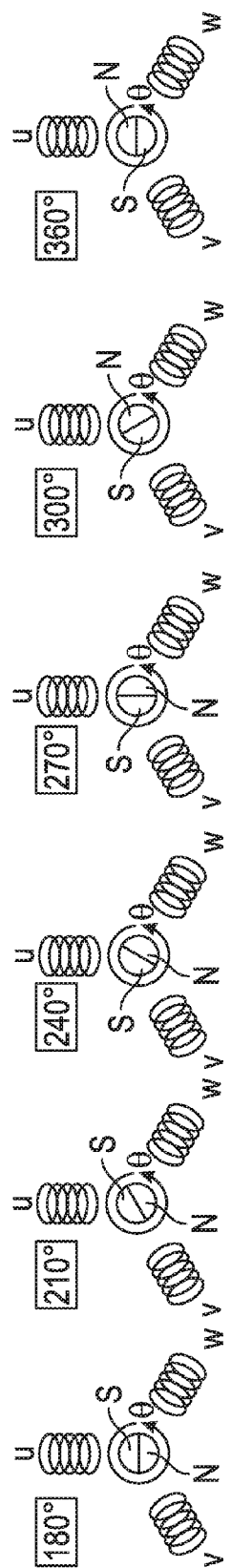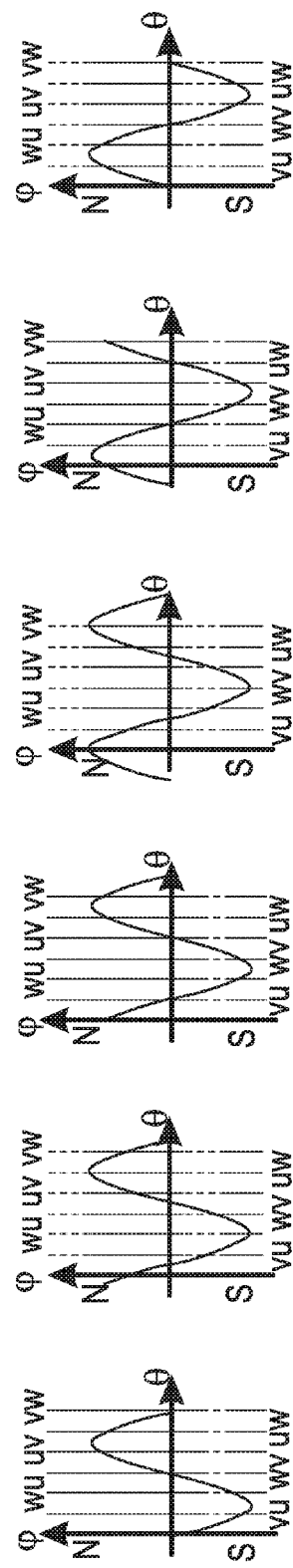
FIG. 5B

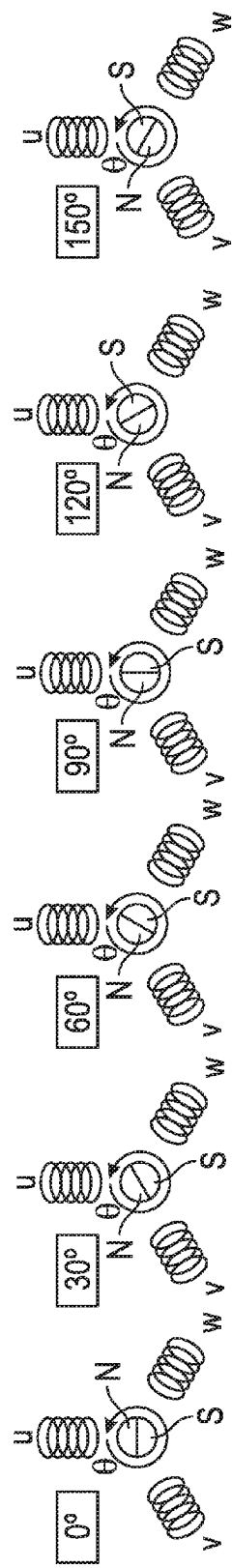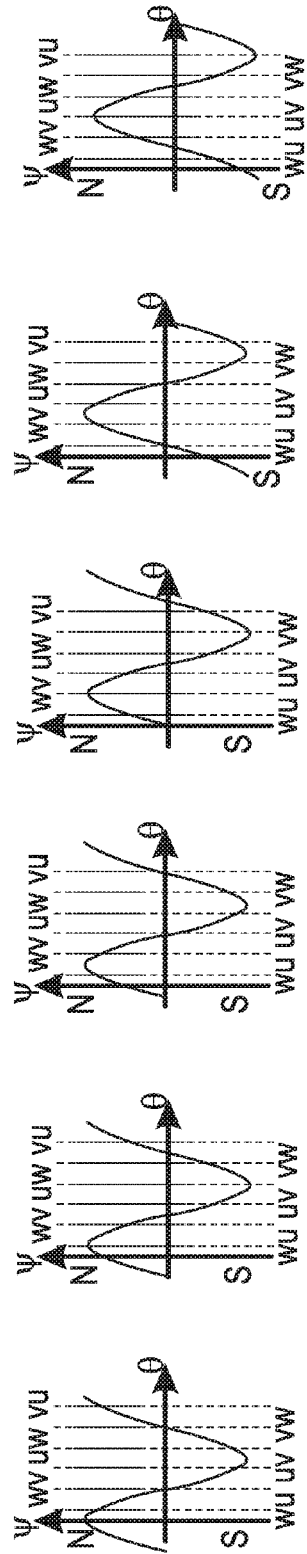
FIG. 10A

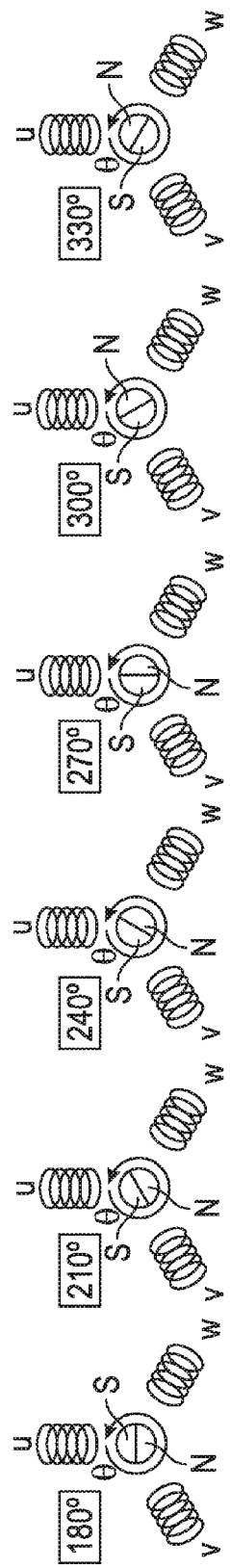
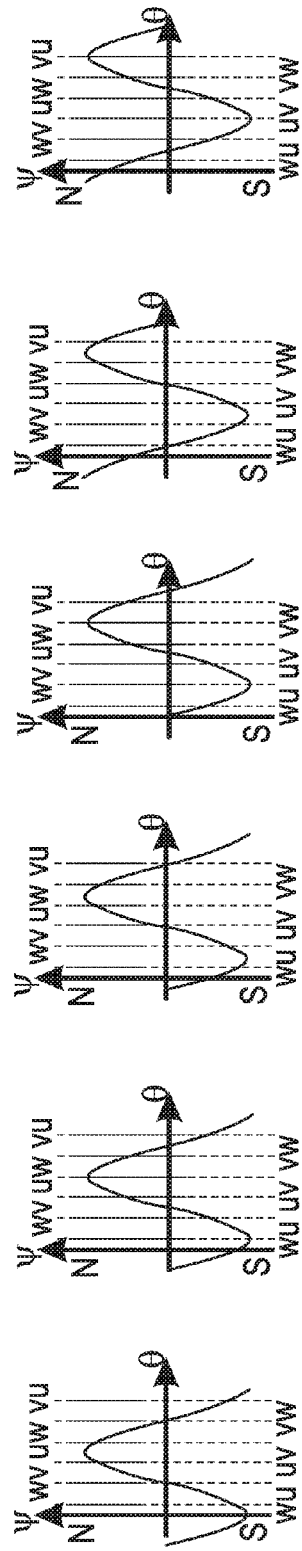
FIG. 10B

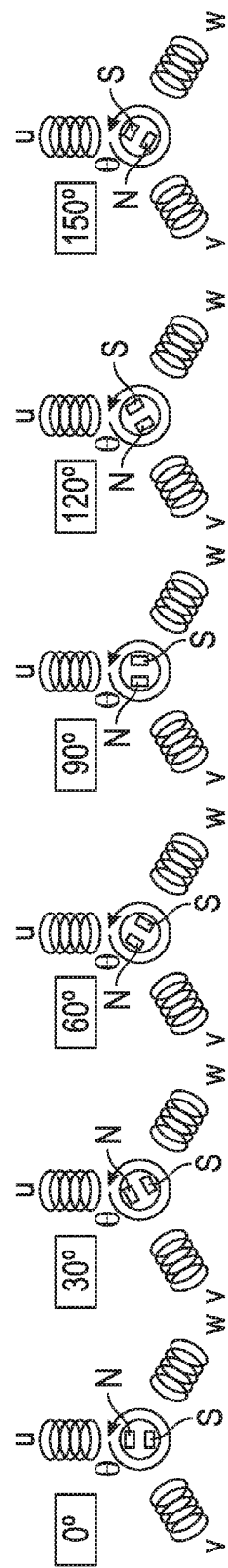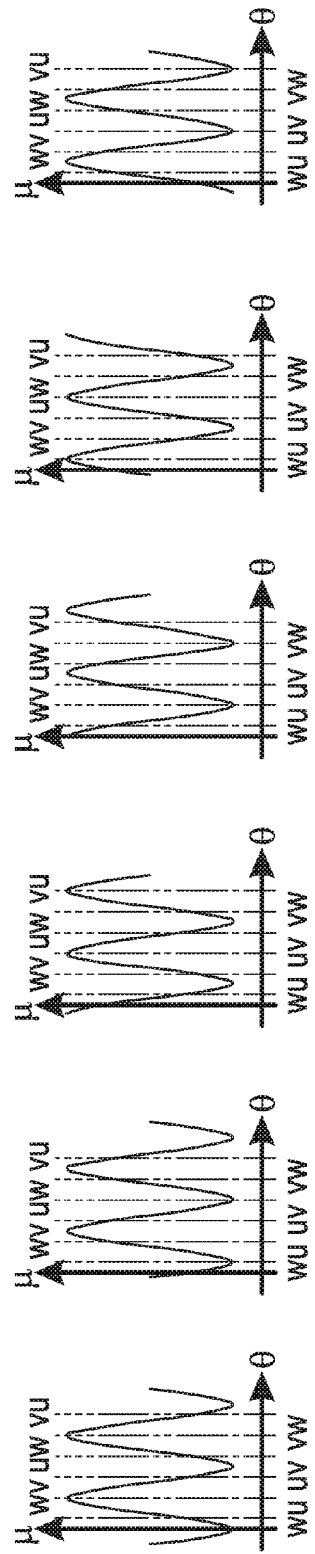
FIG. 11A

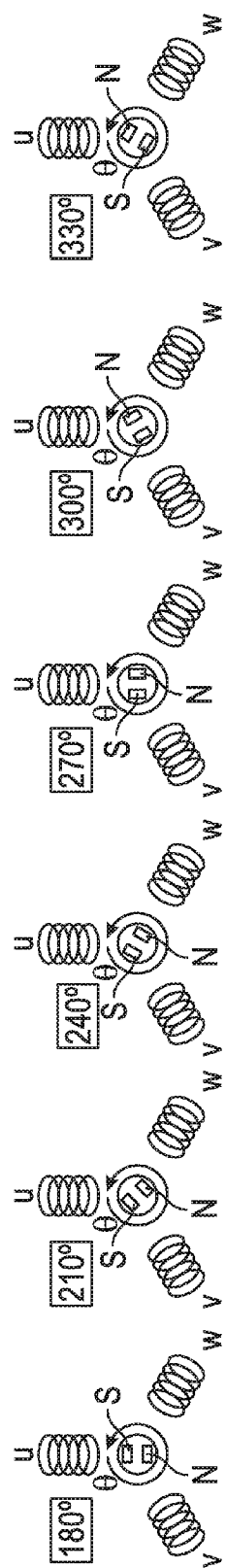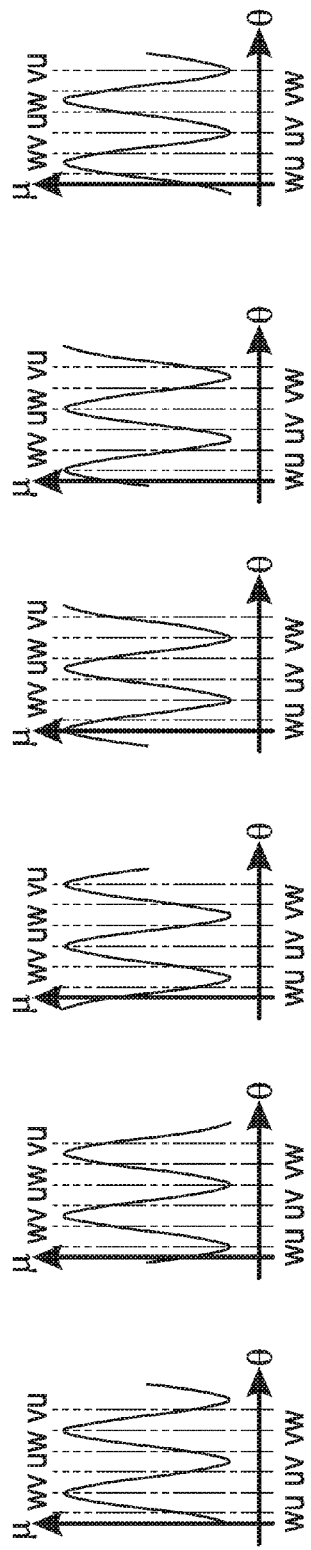
FIG. 11B

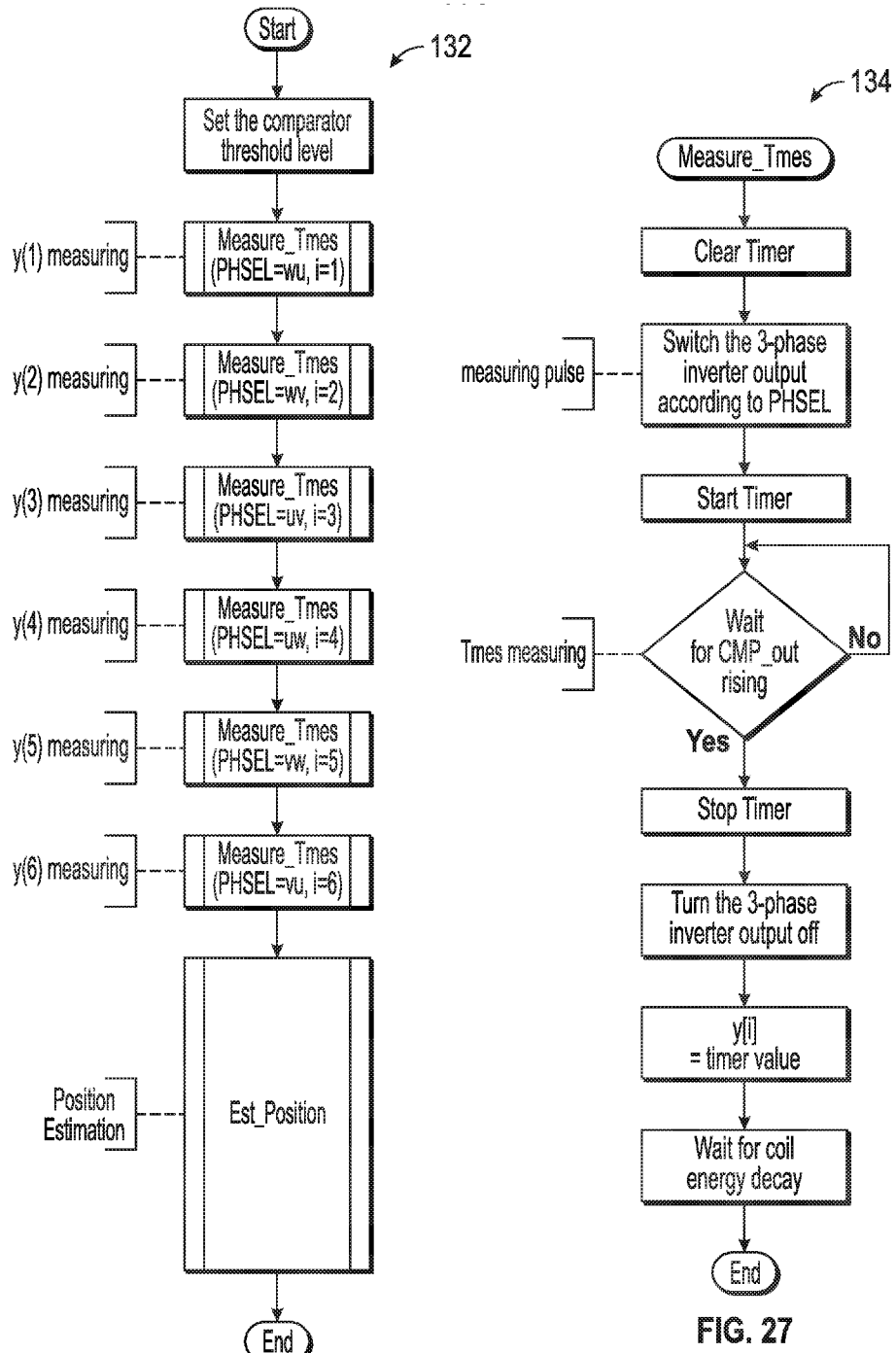

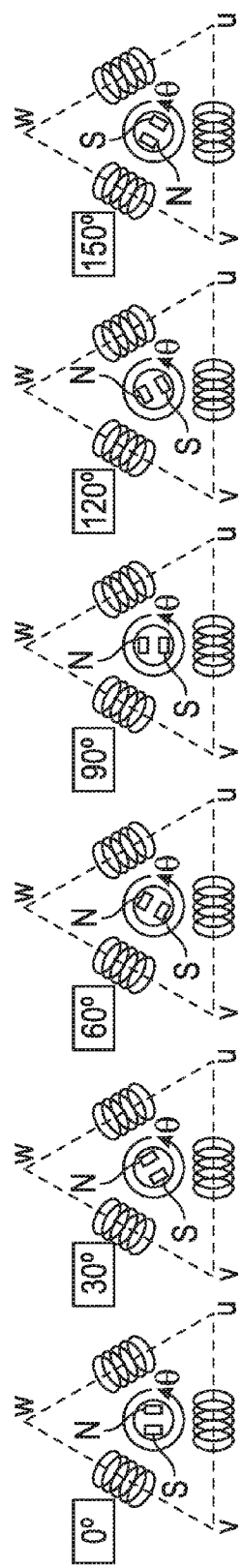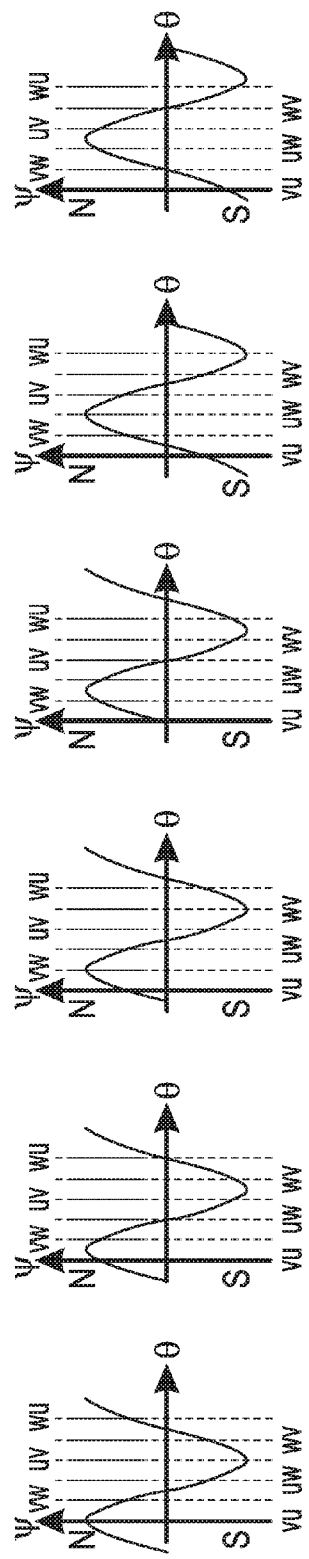
FIG. 29A

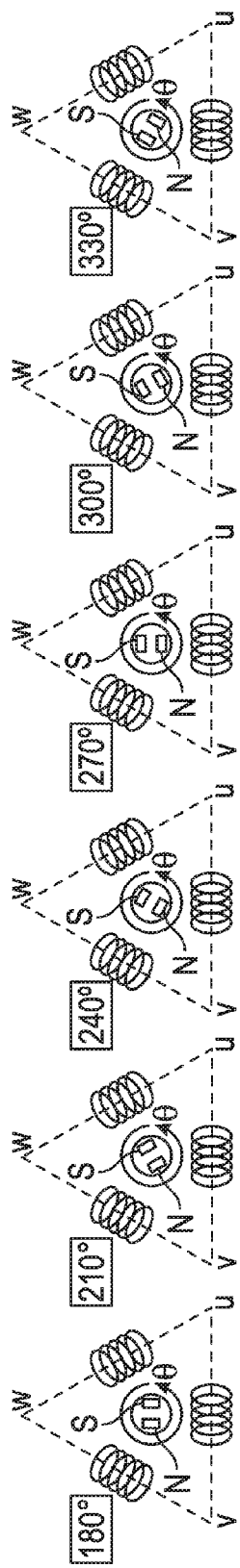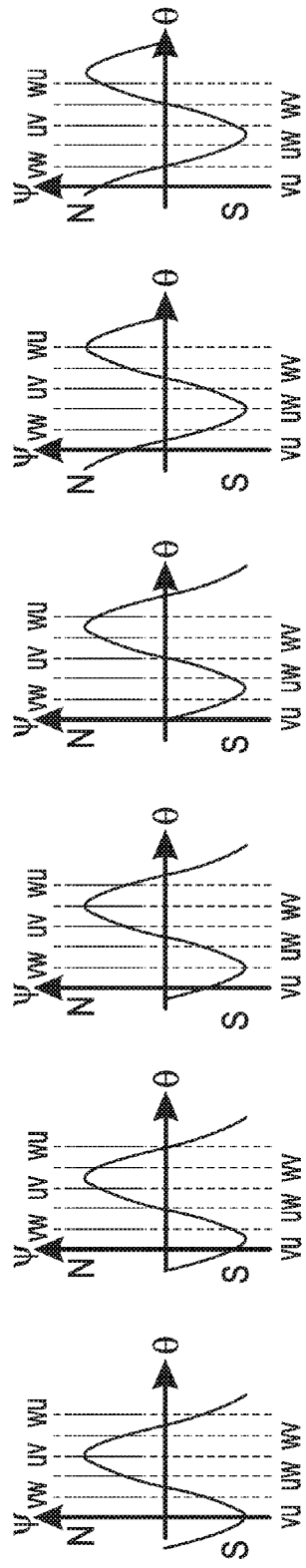
FIG. 29B

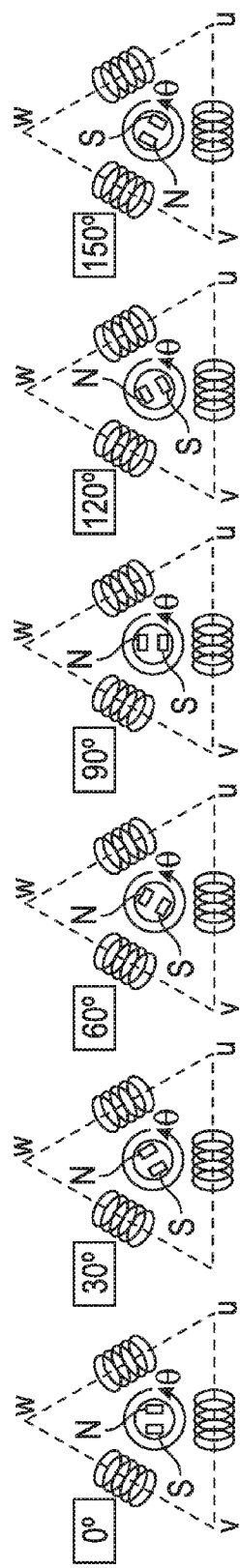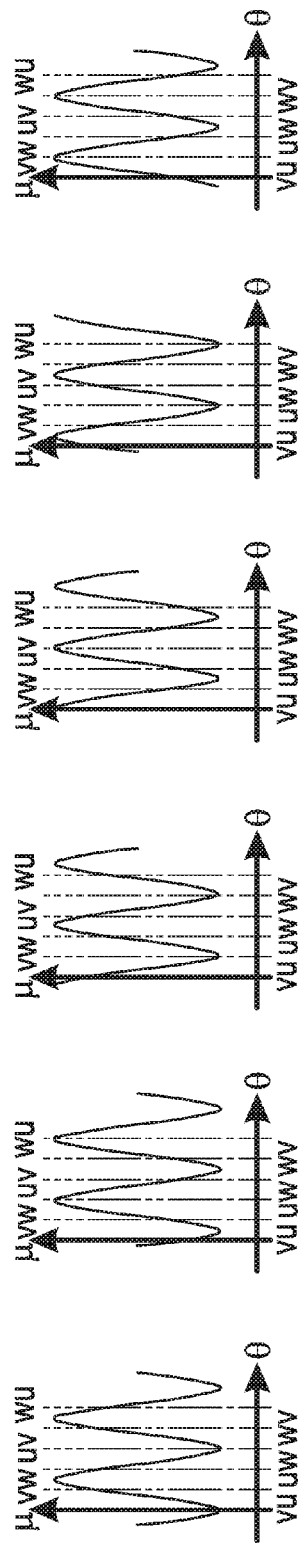
FIG. 30A

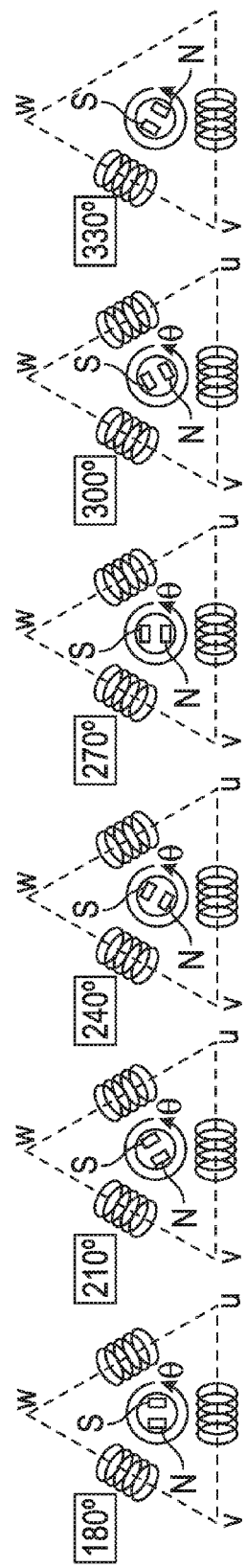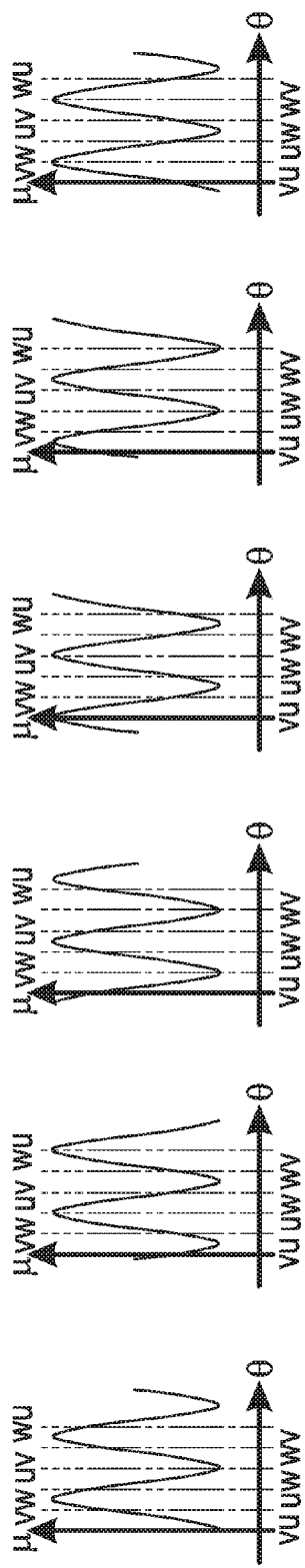
FIG. 30B

ROTOR POSITION SENSING SYSTEM FOR THREE PHASE MOTORS AND RELATED METHODS

CROSS REFERENCE TO RELATED APPLICATIONS

This application is a continuation-in-part application of the earlier U.S. Utility patent application Ser. No. 15/215,425, entitled "Rotor Position Sensing System for Three Phase Motors and Related Methods," listing as first inventor Kazumasa Takai, filed Jul. 20, 2016, now pending, the disclosure of which is hereby incorporated entirely herein by reference.

BACKGROUND

1. Technical Field

Aspects of this document relate generally to three-phase motors. Specific implementations involve three-phase motors that use a star (wye) (Y) configuration or a delta configuration. Specific implementations involve permanent magnet synchronous motors (PMSMs).

2. Background

Three-phase power system use three conductors each carrying alternating current. The currents have the same frequencies and amplitudes but are each one-third out of phase relative to the other two. The phase difference results in a voltage peak on each conductor one third of a cycle after the voltage peak an another conductor (and so on), which effect may be used to product a rotating magnetic field in a motor. Permanent magnet synchronous motors (PMSMs) exist which utilize such a rotating magnetic field, including surface PMSMs (SPMSMs) and interior/internal PMSMs (IPMSMs).

SUMMARY

Implementations of system for sensing rotor position of a motor (systems) may include: a controller coupled with a delta configuration three-phase permanent magnet synchronous motor (PMSM), the controller configured to cause a plurality of voltage pulses to be applied to the PMSM; a timer and/or an analog-to-digital converter (ADC) coupled with the PMSM and with the controller and configured to measure a plurality of values (measured values) from a three-phase inverter coupled with the PMSM, each of the measured values corresponding with one of the plurality of voltage pulses and including a current value corresponding with an inductance of the PMSM or a time value corresponding with an inductance of the PMSM, and; one or more logic elements configured to calculate, based on the measured values and using one or more position algorithms, a position of a rotor of the PMSM relative to a stator of the PMSM; wherein the system is configured to calculate the position of the rotor when the rotor is in a stopped configuration and when the rotor is in a rotating configuration.

Implementations of systems for sensing rotor position of a motor (systems) may include one, all, or any of the following:

The one or more logic elements may be coupled with one or more shunt resistors that are coupled with the three-phase inverter.

The system may be configured to calculate a position of a rotor of a PMSM that is not controlled using vector control (field-oriented control).

The PMSM may be a surface permanent magnet synchronous motor (SPMSM).

The PMSM may be an interior permanent magnet synchronous motor (IPMSM).

The one or more logic elements may calculate the position of the rotor within 30 degrees of accuracy.

The system may include the timer, a comparator coupled with the timer, and a signal processor coupled with the timer and configured to toggle the timer between a start configuration and a stop configuration in response to an input from the comparator.

The one or more position algorithms may include $$\tan^{-1}\left(\frac{\sum_{i=1}^{N} -\sin(2\alpha_i)y_i}{\sum_{i=1}^{N} -\cos(2\alpha_i)y_i}\right)$$

and/or $$\tan^{-1}\left(\frac{\sum_{i=1}^{N} \sin(2\alpha_i)y_i}{\sum_{i=1}^{N} \cos(2\alpha_i)y_i}\right)$$

wherein each $\alpha_i$ includes a value between 0 and $2\pi$ and wherein each $y_i$ includes one of the measured values.

The system may be configured to calculate a position of a rotor of a PMSM that is controlled using vector control (field-oriented control).

Implementations of systems for sensing rotor position of a motor (systems) may include: a controller coupled with a delta configuration three-phase permanent magnet synchronous motor (PMSM), the controller configured to cause a plurality of voltage pulses to be applied to the PMSM; at least three shunt resistors coupled with a three-phase inverter coupled with the PMSM; a timer and/or an analog-to-digital converter (ADC) coupled with the at least three shunt resistors and configured to measure a plurality of values (measured values), each of the measured values corresponding with one of the plurality of voltage pulses and including a current value corresponding with an inductance of the PMSM or a time value corresponding with an inductance of the PMSM, and; one or more logic elements coupled with the timer and/or the ADC and configured to calculate, based on the measured values and using one or more position algorithms, a position of a rotor of the PMSM relative to a stator of the PMSM; wherein the system is configured to calculate the position of the rotor when the rotor is in a stopped configuration and when the rotor is in a rotating configuration.

Implementations of systems for sensing rotor position of a motor (systems) may include one, all, or any of the following:

The system may be configured to calculate a position of a rotor of a PMSM that is not controlled using vector control (field-oriented control).

The system may include the timer, the ADC, a comparator, and a multiplexer each coupled with the one or more logic elements.

The system may further include a sample and hold element (S/H) and an analog multiplexer (AMUX) coupled with the one or more logic elements.

The one or more position algorithms may include $$\tan^{-1}\left(\frac{\sum_{i=1}^{N} -\sin(2\alpha_i)y_i}{\sum_{i=1}^{N} -\cos(2\alpha_i)y_i}\right)$$

and $$\tan^{-1}\left(\frac{\sum_{i=1}^{N} \sin(2\alpha_i)y_i}{\sum_{i=1}^{N} \cos(2\alpha_i)y_i}\right)$$

wherein each $\alpha_i$ includes a value between 0 and $2\pi$ and wherein each $y_i$ includes one of the measured values.

Implementations of methods for sensing rotor position of a motor (methods) may include: coupling a controller and a timer and/or an analog-to-digital converter (ADC) with a delta configuration three-phase permanent magnet synchronous motor (PMSM); applying, using the controller, a plurality of voltage pulses to the PMSM; measuring, with the timer and/or the ADC, a plurality of values (measured values) from a three-phase inverter coupled with the PMSM, each of the measured values corresponding with one of the plurality of voltage pulses and including a current value corresponding with an inductance of the PMSM or a time value corresponding with an inductance of the PMSM, and; calculating, with one or more logic elements coupled with the PMSM, based on the measured values and using one or more position algorithms, a position of a rotor of the PMSM relative to a stator of the PMSM; wherein the one or more logic elements are configured to calculate the position of the rotor when the rotor is in a stopped configuration and when the rotor is in a rotating configuration, and; wherein the one or more logic elements are configured to calculate a position of a rotor of a PMSM that is not controlled using vector control (field-oriented control).

Implementations of methods for sensing rotor position of a motor (methods) may include one, all, or any of the following:

The one or more position algorithms may include $$\tan^{-1}\left(\frac{\sum_{i=1}^{N} -\sin(2\alpha_i)y_i}{\sum_{i=1}^{N} -\cos(2\alpha_i)y_i}\right)$$

and $$\tan^{-1}\left(\frac{\sum_{i=1}^{N} \sin(2\alpha_i)y_i}{\sum_{i=1}^{N} \cos(2\alpha_i)y_i}\right)$$

wherein each $\alpha_i$ includes a value between 0 and $2\pi$ and wherein each $y_i$ includes one of the measured values.

Calculating, with the one or more logic elements, the position of the rotor relative to the stator when the rotor is in the stopped configuration.

Coupling the timer with the PMSM and toggling the timer between a start configuration and a stop configuration using a signal processor in response to an input from a comparator.

Coupling the ADC with the PMSM, converting an analog signal from the three-phase inverter to a digital signal using the ADC, and communicating the digital signal from the ADC to the one or more logic elements.

The measured values may be measured using one or more elements coupled with one or more shunt resistors that are coupled with the three-phase inverter.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIGS. 5A-5B representatively illustrates rotor magnetic flux distribution corresponding with various rotor positions of an SPMSM;

FIGS. 10A-10B representatively illustrates rotor magnetic flux distribution corresponding with various rotor positions of an SPMSM having a star configuration;

FIGS. 11A-11B representatively illustrates rotor magnetic flux distribution corresponding with various rotor positions of an IPMSM having a star configuration;

FIG. 26 is a flowchart representatively illustrating a method for sensing rotor position of a motor;

FIG. 27 is a flowchart representatively illustrating a method for measuring a time value which is a portion of the method of FIG. 26;

FIGS. 29A-29B representatively illustrates rotor magnetic flux distribution corresponding with various rotor positions of an SPMSM having a delta configuration;

FIGS. 30A-30B representatively illustrates rotor permeability distribution corresponding with various rotor positions of an SPMSM having a delta configuration;

DESCRIPTION

This disclosure, its aspects and implementations, are not limited to the specific components, assembly procedures or method elements disclosed herein. Many additional components, assembly procedures and/or method elements known in the art consistent with the intended rotor position sensing system for three phase motors and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such rotor position sensing system for three phase motors and related methods, and implementing components and methods, consistent with the intended operation and methods.

Figure 1:
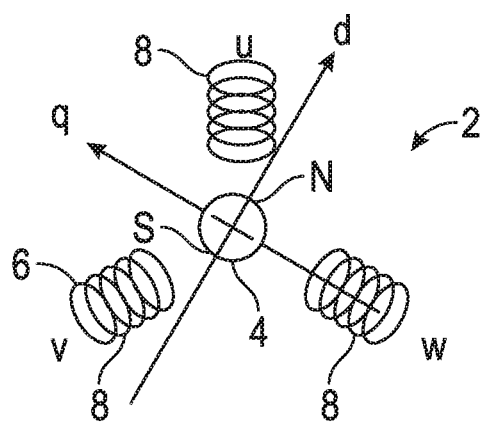
FIG. 1 is a diagram representatively illustrating elements and axes of an implementation of a permanent magnet synchronous motor (PMSM)

Referring now to FIG. 1, a diagram representatively illustrating elements and axes of an implementation of a permanent magnet synchronous motor (PMSM) 2 are shown, including a rotor 4 and a stator 6 including windings 8 that are wrapped around stator core elements (not shown). FIG. 1 shows a vector control (VC) example wherein a stator current space vector may be defined in a (d,q) coordinate system having orthogonal components along d (direct) and q (quadrature, or 90 degrees offset) axes so that a magnetic flux component of the stator current is aligned with the d axis and a torque component of the stator current is aligned with the q axis. In the representative examples that follow the d axes are defined to align with the N/S poles of magnets while the q axes are defined to be orthogonal thereto.

Figure 8:
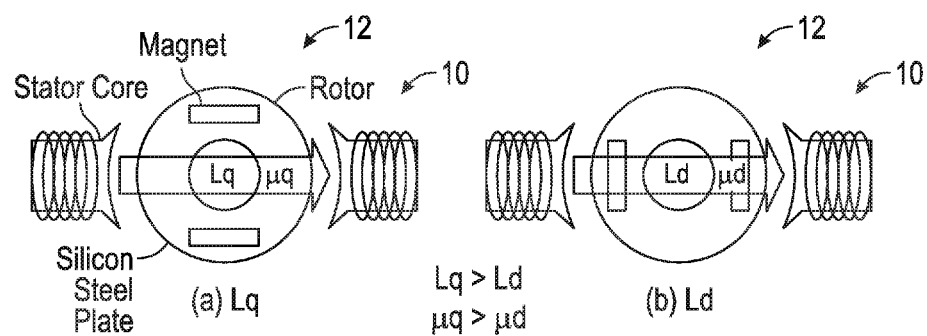
FIG. 8 is a diagram representatively illustrating an interior/internal PMSM (IPMSM) with the permanent magnets not aligned with a stator core (left image) and aligned with the stator core (right image)

Interior/internal permanent magnet synchronous motors (IPMSMs) exhibit salient-pole characteristics so that d-axis inductance is smaller than q-axis inductance. In other words, when the d-axis overlaps with a stator axis (u, v, or w) the inductance is expected to be smallest. FIG. 8 representatively illustrates an example of a PMSM 10 having an interior/internal permanent magnetic synchronous motor (IPMSM) 12 configuration, and the salient pole characteristics may be easily visualized. Only two stator cores are shown, for ease of illustration and explanation. The rotor in this representative example includes a pair of internal magnets and the rotor is formed of silicon steel (or is bounded by a silicon steel plate).

Other materials and configurations are possible, but in the leftmost image the q-axis of the rotor is aligned with the stator cores/windings and in the rightmost image the d-axis of the rotor is aligned with the stator cores/windings. Inductance in this example can be given by the equation:

$$L = \frac{\mu N^2 |S|}{l} \quad \text{(Eq. 0)}$$

where μ is the permeability, N is the number of coil turns, S is the coil cross-section area, and l is the coil length.

The permeability of the silicon steel material is higher than the permeability of the magnets, and accordingly the permeability μq when the q-axis is aligned with the stator core/winding is higher than the permeability μd when the d-axis is aligned with the stator core/winding. Accordingly, inductance Lq (when the q-axis is aligned with the stator core/winding) is higher than inductance Ld (when the d-axis is aligned with the stator core/winding), resulting in the salient-pole characteristic. As described, the two-core example given in FIG. 8 is used for ease of explanation, but the same characteristics apply to a three-core stator as shown in FIG. 1 and used with a three phase motor, so that a three phase IPMSM exhibits salient pole characteristics.

Figure 9:
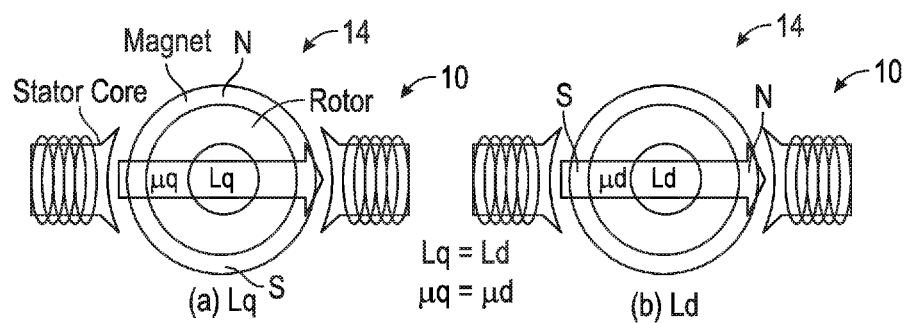
FIG. 9 is a diagram representatively illustrating an SPMSM with poles of the permanent magnet not aligned with a stator core (left image) and aligned with the stator core (right image)

FIG. 9 shows a representative example of a PMSM 10 having a surface permanent magnet synchronous motor (SPMSM) 14 configuration. As can be seen, whether the poles N/S of the surface magnet are aligned with the stator cores/windings (rightmost image), or orthogonal thereto (leftmost image), the permeability is the same. Thus the permeability μq when the q-axis is aligned with the stator core/winding is the same as the permeability μd when the d-axis is aligned with the stator core/winding. Thus there are no permeability differences to generate salient-pole characteristics or, in other words, differences between the inductance Lq (when the q-axis is aligned with the stator core/winding) and the inductance Ld (when the d-axis is aligned with the stator core/winding).

Nevertheless, with an SPMSM there is a difference in inductance between the q-axis and d-axis alignments due at least in part to the effect of rotor magnetic flux and stator magnetic saturation characteristics. This is representatively illustrated in FIG. 3 and FIG. 4, where Ψm is the permanent magnet flux, Ψd and Ψq are components of the integrated magnetic flux made by the permanent magnet and the stator current along the d-axis and q-axis respectively, Id and Iq are stator current components along the d-axis and q-axis respectively, and the inductance L at any point on either graph is the slope, i.e., the change in integrated magnetic flux divided by the change in the stator current component. It can be seen from the example that Ld0 is greater than Ld1, and it can also be seen that Ld0 is equal to Lq1, so it follows that Lq1 is greater than Ld1. In other words, the inductance of an SPMSM is smaller at d-axis alignment than q-axis alignment due to the effects of rotor magnetic flux and magnetic saturation characteristics, despite an SPMSM being considered to not have salient-pole characteristics. Thus when the stator current vector overlaps with the d-axis, the inductance is expected to be smallest.

Figure 3:
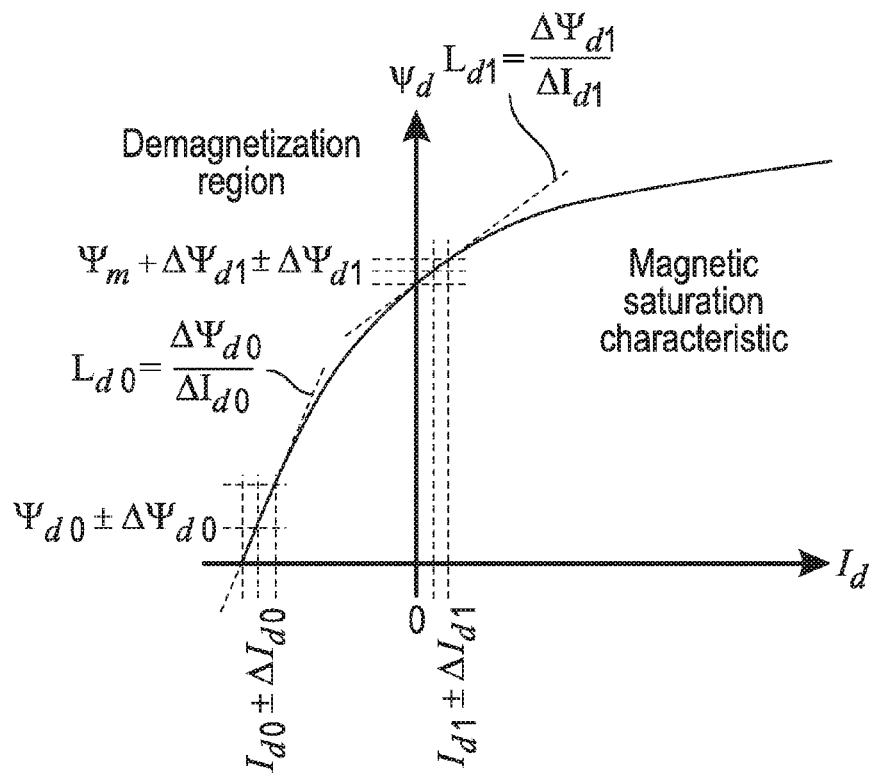
FIG. 3 is a graph representatively illustrating magnetic saturation characteristics of a surface PMSM (SPMSM) with the permanent magnet(s) of the SPMSM aligned with the d axis.
Figure 4:
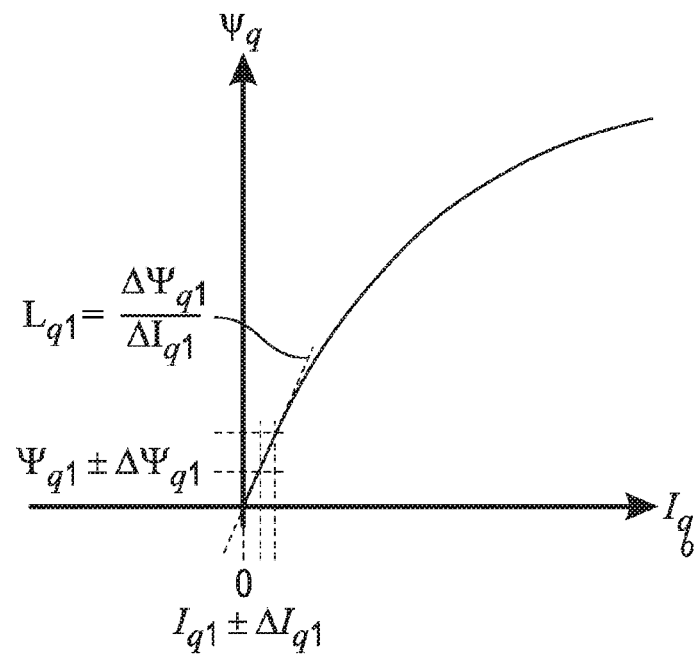
FIG. 4 is a graph representatively illustrating magnetic saturation characteristics of an SPMSM with the permanent magnet(s) of the SPMSM aligned with the q axis.
Figure 5A:
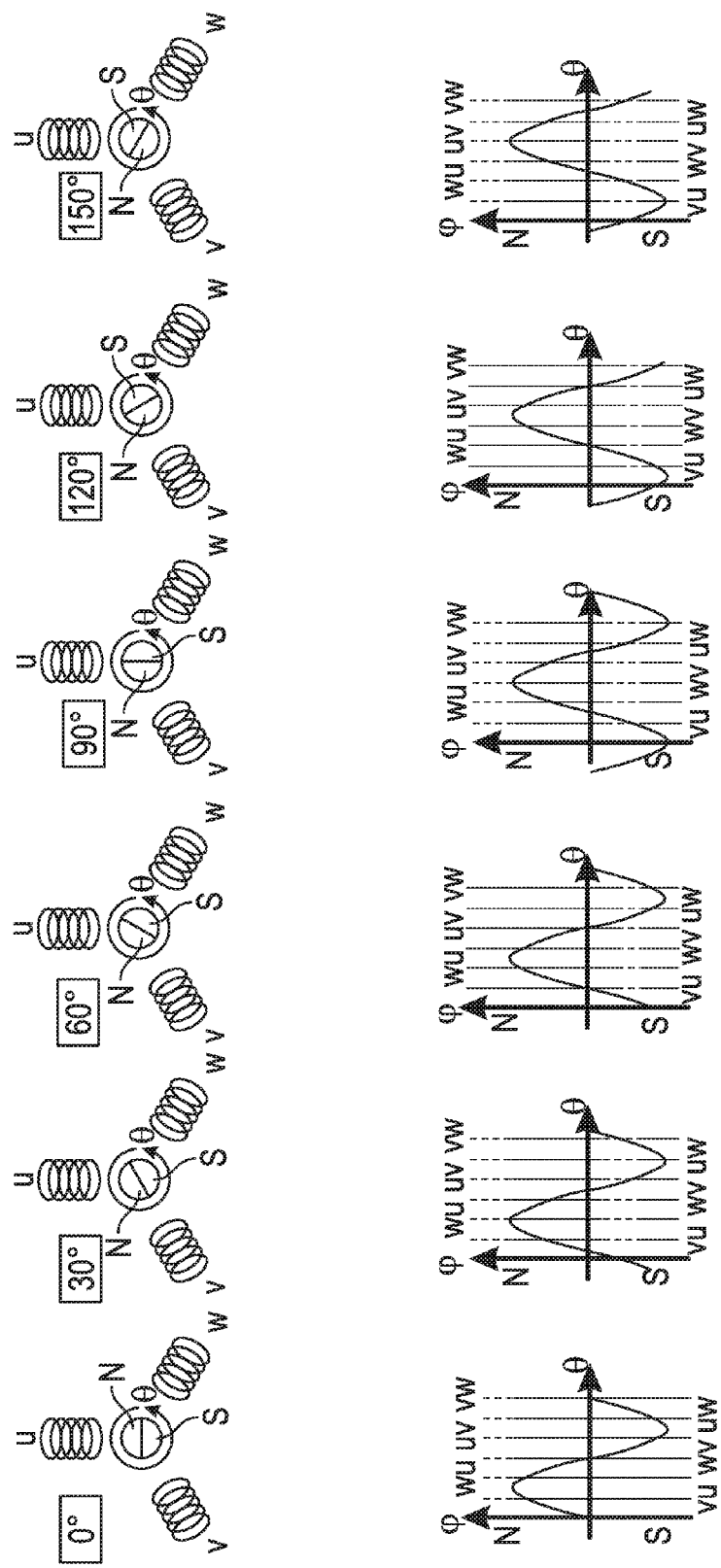

Based on the characteristics shown in FIGS. 3-4 and described above, rotor magnetic flux distribution at various rotor positions of an SPMSM are given in FIGS. 5A-5B. In this representative example the distribution shows an approximately sinusoidal waveform which completes one cycle with one rotation of electric angle of the rotor. The rotor position in FIGS. 5A-5B is defined as 0 degrees when the u-axis overlaps or aligns with the d-axis. The phases are represented so that, for example, uv represents the current vector in which the energization is performed in the direction from the u phase to the v phase, while vu represents energization from the v phase to the u phase, and so forth with the other designations wu, vw, wv, uw. For example, if the rotor position is at 30 degrees, then if a wu current vector is applied the inductance is expected to be smallest.

Figure 6:
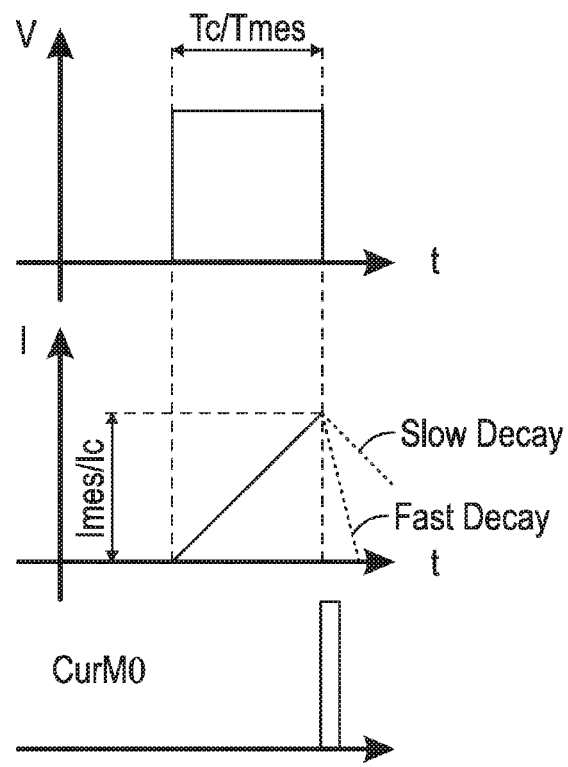
FIG. 6 representatively illustrates inductance sensing waveforms for a PMSM.

Inductance of a PMSM may be used to determine its position. Inductance may be found using the equation L=Vdt/dI, where L is the inductance, V is the voltage (unit function) and I is the current. If V is constant (unit function) the relationship between inductance and time/current is such that a small inductance could be indicative of a small time in which a specified current variation was exhibited or a large current variation within a certain amount of time. Inductance may therefore be sensed by applying a pulse voltage to a PMSM and measuring time or current as representatively illustrated in FIG. 6, where Tc is a specified constant time, Imes is a measured current, Ic is a specified constant current, Tmes is a measured time, and CURM0 is an Ic sensing flag For example, a voltage pulse may be applied for a specified constant time Tc, and at the end of that time the current may be measured (Imes). In other implementations, a voltage pulse may be applied until a specified current is reached (Ic) and the time to reach that current may be measured (Tmes). As different voltage pulses will be applied to the PMSM, when the current begins to decay (or some point thereafter) the CURM0 signal may be generated by one or more elements of a position sensing system to indicate that the next pulse may be applied and/or to otherwise trigger other elements of a position sensing system. The CURM0 signal may trigger one or more events based on how quickly the current decays, and as seen in FIG. 6 in some PMSMs current may decay quickly and in others it may decay slowly. Accordingly, the rotor position sensing system may be configured to wait to send the next pulse until after the current from the previous pulse has fully decayed. Thus CURM0 may be sent at the time when decay starts, and the system may be configured to wait until decay will be complete before generating the next pulse, or CURM0 may be sent when decay is already complete.

Figure 2:
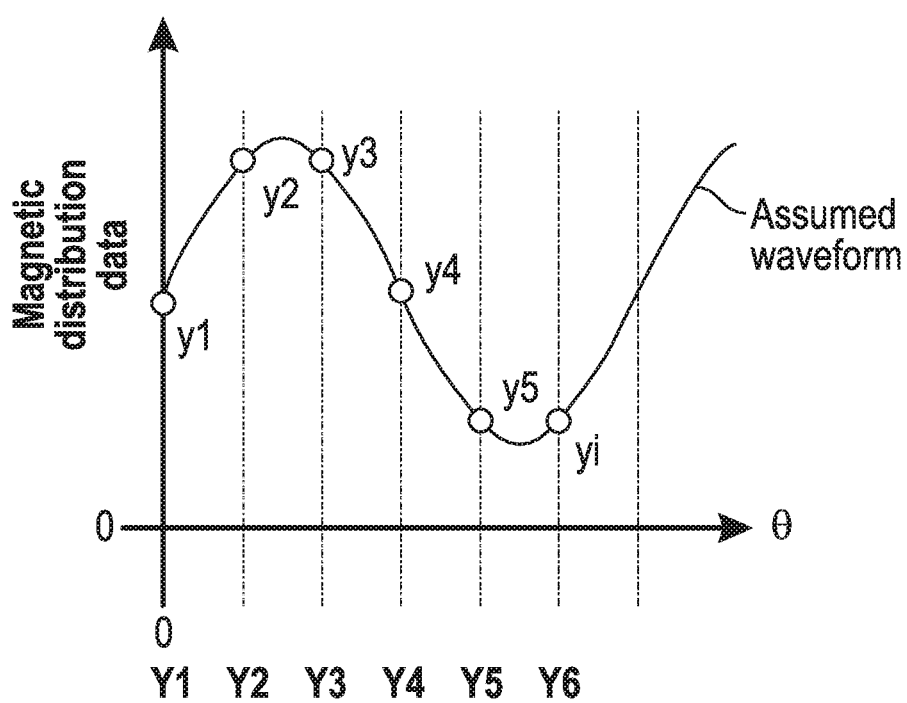
FIG. 2 is graph representatively illustrating magnetic distribution of a PMSM having an assumed sine or cosine waveform.

Rotor position estimation may be done using a few assumptions and mathematics as will now be described. If it is assumed that rotor magnetic flux shows an approximately sinusoidal waveform in ideal conditions, and the magnetic flux data are given in some way, then the sinusoidal waveform may be estimated by curve fitting, as representatively illustrated in FIG. 2, where a plurality of measured values $y_1$-$y_6$ (or up to any $y_i$) are used to fit a curve. Some of the math that will be given below is based on quadrature detection and a least squares method.

A model equation y=A sin(wt+θ) may be used, where A is amplitude, y is a measured value or measured data, ω is angular velocity, t is measured time, and θ is a phase, which indicates rotor position. Since the curve fitting algorithm uses a least squares method, any DC offset of $y_i$ may be ignored.

When the measured time and the measured data are defined as $(t_1, t_2, t_3, \ldots t_N)$ and $(y_1, y_2, y_3, \ldots y_N)$ the model equation may be written as follows:

$$\begin{bmatrix} y_1 \\ y_2 \\ \vdots \\ y_N \end{bmatrix} = \begin{bmatrix} A\sin(\omega t_1 + \theta) \\ A\sin(\omega t_2 + \theta) \\ \vdots \\ A\sin(\omega t_N + \theta) \end{bmatrix} =$$

$$\begin{bmatrix} A\sin(\omega t_1 + \theta) + A\cos(\omega t_1)\sin(\theta) \\ A\sin(\omega t_2 + \theta) + A\cos(\omega t_2)\sin(\theta) \\ \vdots \\ A\sin(\omega t_N + \theta) + A\cos(\omega t_N)\sin(\theta) \end{bmatrix} = \begin{bmatrix} \sin(\omega t_1) & \cos(\omega t_1) \\ \sin(\omega t_2) & \cos(\omega t_2) \\ \vdots & \vdots \\ \sin(\omega t_N) & \cos(\omega t_N) \end{bmatrix} \begin{bmatrix} A\cos(\theta) \\ A\sin(\theta) \end{bmatrix}$$

The above equation may be written as Y=GP, where:

$$Y = \begin{bmatrix} y_1 \\ y_2 \\ \vdots \\ y_N \end{bmatrix} \quad \text{(Eq. 1)}$$

$$G = \begin{bmatrix} \sin(\omega t_1) & \cos(\omega t_1) \\ \sin(\omega t_2) & \cos(\omega t_2) \\ \vdots & \vdots \\ \sin(\omega t_N) & \cos(\omega t_N) \end{bmatrix}$$

$$P = \begin{bmatrix} A\cos(\theta) \\ A\sin(\theta) \end{bmatrix}$$

If measurement error E is added, the equation may be written as Y=GP+E or E=Y-GP. The least squares method finds the solution to P which gives the extremum of square norm of E, as follows:

$$\|E\|^2 = E^* \cdot E$$

$$= (Y^* - P^*G^*)(Y-GP)$$

$$= Y^*Y - Y^*GP - P^*G^*Y + P^*G^*GP$$

$$= Y^*Y - 2Y^*GP + P^*G^*GP$$

$$\frac{\partial}{\partial P}\|E\|^2 = -2Y*G + 2P*G*G = 0$$

$$Y^*G = P^*G^*G$$

$$P^* = Y^*G(G^*G)^{-1}$$

$$P = (G^*G)^{-1}G^*Y$$

$$P = G^+Y \quad \text{(Eq. 2)}$$

Where:

$Y^*, P^*, G^*$; adjoint matrix $G^+ = (G^*G)^{-1}G^*$; pseudo-inverse matrix

If $G^+$ is found by what Eq. 1 is assigned to Eq. 2, then P may be found.

$$P = G^+Y$$

$$P = (G^TG)^{-1}G^TY; \ G^T = G^* \text{ since } G \text{ is a real number}$$

$$= \left( \begin{bmatrix} \sin(\omega t_1) & \sin(\omega t_2) & \cdots & \sin(\omega t_N) \\ \cos(\omega t_1) & \cos(\omega t_2) & \cdots & \cos(\omega t_N) \end{bmatrix} \begin{bmatrix} \sin(\omega t_1) & \cos(\omega t_1) \\ \sin(\omega t_2) & \cos(\omega t_2) \\ \vdots & \vdots \\ \sin(\omega t_N) & \cos(\omega t_N) \end{bmatrix} \right)^{-1}$$

$$\begin{bmatrix} \sin(\omega t_1) & \sin(\omega t_2) & \cdots & \sin(\omega t_N) \\ \cos(\omega t_1) & \cos(\omega t_2) & \cdots & \cos(\omega t_N) \end{bmatrix} \begin{bmatrix} y_1 \\ y_2 \\ \vdots \\ y_N \end{bmatrix} =$$

$$= \begin{bmatrix} \sum_{i=1}^{N}(\sin(\omega t_i))^2 & \sum_{i=1}^{N}\sin(\omega t_i)\cos(w t_i) \\ \sum_{i=1}^{N}\sin(\omega t_i)\cos(w t_i) & \sum_{i=1}^{N}(\cos(\omega t_i))^2 \end{bmatrix}^{-1} \begin{bmatrix} \sum_{i=1}^{N}\sin(\omega t_i)y_i \\ \sum_{i=1}^{N}\cos(\omega t_i)y_i \end{bmatrix}$$

The term of $\sum_{i=1}^{N} \sin(\omega t_i)\cos(\omega t_i)$ must be zero because the measured period is only one electric cycle and each measured time interval must be the same, so the equation becomes:

$$= \begin{bmatrix} \sum_{i=1}^{N}(\sin(\omega t_i))^2 & 0 \\ 0 & \sum_{i=1}^{N}(\cos(\omega t_i))^2 \end{bmatrix}^{-1} \begin{bmatrix} \sum_{i=1}^{N}\sin(\omega t_i)y_i \\ \sum_{i=1}^{N}\cos(\omega t_i)y_i \end{bmatrix} =$$

$$= \frac{1}{\sum_{i=1}^{N}(\sin(\omega t_i))^2 \times \sum_{i=1}^{N}(\cos(\omega t_i))^2} \begin{bmatrix} \sum_{i=1}^{N}(\cos(\omega t_i))^2 & 0 \\ 0 & \sum_{i=1}^{N}(\sin(\omega t_i))^2 \end{bmatrix}$$

$$\begin{bmatrix} \sum_{i=1}^{N}\sin(\omega t_i)y_i \\ \sum_{i=1}^{N}\cos(\omega t_i)y_i \end{bmatrix} =$$

$$= \frac{1}{\sum_{i=1}^{N}(\sin(\omega t_i))^2 \times \sum_{i=1}^{N}(\cos(\omega t_i))^2} \begin{bmatrix} \sum_{i=1}^{N}(\cos(\omega t_i))^2 \times \sum_{i=1}^{N}\sin(\omega t_i)y_i \\ \sum_{i=1}^{N}(\sin(\omega t_i))^2 \times \sum_{i=1}^{N}\cos(\omega t_i)y_i \end{bmatrix}$$

$$= \begin{bmatrix} \dfrac{\sum_{i=1}^{N}\sin(\omega t_i)y_i}{\sum_{i=1}^{N}(\sin(\omega t_i))^2} \\ \dfrac{\sum_{i=1}^{N}\cos(\omega t_i)y_i}{\sum_{i=1}^{N}(\cos(\omega t_i))^2} \end{bmatrix} = \begin{bmatrix} A\cos(\theta) \\ A\sin(\theta) \end{bmatrix} \quad \text{(Eq. 3)}$$

$$\theta = \tan^{-1}\frac{A\sin(\theta)}{A\cos(\theta)} \quad \text{(Eq. 4)}$$

Therefore, equations 3 and 4 give an estimated rotor position and:

$$A = \sqrt{(A\cos(\theta))^2 + (A\sin(\theta))^2}$$

If, instead of using the model equation $y = A\sin(\omega t + \theta)$ the model equation $y = A\cos(\omega t + \theta)$ is used, the estimated rotor position is given as follows:

$$\begin{bmatrix} y_1 \\ y_2 \\ \vdots \\ y_N \end{bmatrix} = \begin{bmatrix} A\cos(\omega t_1 + \theta) \\ A\cos(\omega t_2 + \theta) \\ \vdots \\ A\cos(\omega t_N + \theta) \end{bmatrix} =$$

$$\begin{bmatrix} A\cos(\omega t_1 + \theta) - A\sin(\omega t_1)\sin(\theta) \\ A\cos(\omega t_2 + \theta) - A\sin(\omega t_2)\sin(\theta) \\ \vdots \\ A\cos(\omega t_N + \theta) - A\sin(\omega t_N)\sin(\theta) \end{bmatrix} = \begin{bmatrix} \cos(\omega t_1) & -\sin(\omega t_1) \\ \cos(\omega t_2) & -\sin(\omega t_2) \\ \vdots & \vdots \\ \cos(\omega t_N) & -\sin(\omega t_N) \end{bmatrix} \begin{bmatrix} A\cos(\theta) \\ A\sin(\theta) \end{bmatrix}$$

The above equation may be written as $Y = GP$, where:

$$Y = \begin{bmatrix} y_1 \\ y_2 \\ \vdots \\ y_N \end{bmatrix} \quad \text{(Eq. 1A)}$$

$$G = \begin{bmatrix} \cos(\omega t_1) & -\sin(\omega t_1) \\ \cos(\omega t_2) & -\sin(\omega t_2) \\ \vdots & \vdots \\ \cos(\omega t_N) & -\sin(\omega t_N) \end{bmatrix}$$

$$P = \begin{bmatrix} A\cos(\theta) \\ A\sin(\theta) \end{bmatrix}$$

$$P = G^+ Y$$

$$P = (G^T G)^{-1} G^T Y; \quad G^T = G^* \text{ since } G \text{ is a real number}$$

$$= \left( \begin{bmatrix} \cos(\omega t_1) & \cos(\omega t_2) & \ldots & \cos(\omega t_N) \\ -\sin(\omega t_1) & -\sin(\omega t_2) & \ldots & -\sin(\omega t_N) \end{bmatrix} \begin{bmatrix} \cos(\omega t_1) & -\sin(\omega t_1) \\ \cos(\omega t_2) & -\sin(\omega t_2) \\ \vdots & \vdots \\ \cos(\omega t_N) & -\sin(\omega t_N) \end{bmatrix} \right)^{-1}$$

$$\begin{bmatrix} \cos(\omega t_1) & \cos(\omega t_2) & \ldots & \cos(\omega t_N) \\ -\sin(\omega t_1) & -\sin(\omega t_2) & \ldots & -\sin(\omega t_N) \end{bmatrix} \begin{bmatrix} y_1 \\ y_2 \\ \vdots \\ y_N \end{bmatrix} =$$

$$\begin{bmatrix} \sum_{i=1}^{N}(\cos(\omega t_i))^2 & \sum_{i=1}^{N} -\cos(\omega t_i)\sin(w t_i) \\ \sum_{i=1}^{N} -\sin(\omega t_i)\cos(w t_i) & \sum_{i=1}^{N}(-\sin(\omega t_i))^2 \end{bmatrix}^{-1} \begin{bmatrix} \sum_{i=1}^{N}\cos(\omega t_i) y_i \\ \sum_{i=1}^{N} -\sin(\omega t_i) y_i \end{bmatrix}$$

The term of $\sum_{i=1}^{N} -\sin(\omega t_i)\cos(w t_i)$ must be zero, so the equation becomes:

$$= \begin{bmatrix} \sum_{i=1}^{N}(\cos(\omega t_i))^2 & 0 \\ 0 & \sum_{i=1}^{N}(-\sin(\omega t_i))^2 \end{bmatrix}^{-1} \begin{bmatrix} \sum_{i=1}^{N}\cos(\omega t_i) y_i \\ \sum_{i=1}^{N} -\sin(\omega t_i) y_i \end{bmatrix} = \quad \text{(Eq. 3A)}$$

$$\frac{1}{\sum_{i=1}^{N}(-\sin(\omega t_i))^2 \times \sum_{i=1}^{N}(\cos(\omega t_i))^2}$$

$$\begin{bmatrix} \sum_{i=1}^{N}(-\sin(\omega t_i))^2 & 0 \\ 0 & \sum_{i=1}^{N}(\cos(\omega t_i))^2 \end{bmatrix}$$

$$\begin{bmatrix} \sum_{i=1}^{N}\cos(\omega t_i) y_i \\ \sum_{i=1}^{N} -\sin(\omega t_i) y_i \end{bmatrix} = \frac{1}{\sum_{i=1}^{N}(-\sin(\omega t_i))^2 \times \sum_{i=1}^{N}(\cos(\omega t_i))^2}$$

$$\begin{bmatrix} \sum_{i=1}^{N}(-\sin(\omega t_i))^2 \times \sum_{i=1}^{N}\cos(\omega t_i) y_i \\ \sum_{i=1}^{N}(\cos(\omega t_i))^2 \times \sum_{i=1}^{N} -\sin(\omega t_i) y_i \end{bmatrix} =$$

$$\begin{bmatrix} \dfrac{\sum_{i=1}^{N}\cos(\omega t_i) y_i}{\sum_{i=1}^{N}(\cos(\omega t_i))^2} \\ \dfrac{\sum_{i=1}^{N} -\sin(\omega t_i) y_i}{\sum_{i=1}^{N}(-\sin(\omega t_i))^2} \end{bmatrix} = \begin{bmatrix} A\cos(\theta) \\ A\sin(\theta) \end{bmatrix}$$

From FIGS. 5A-5B it can be seen that the term $\omega t_i$ may have the following values between 0 and $2\pi$ (or between 0 and $5\pi/3$): $\omega t_1 = 0$, $\omega t_2 = \pi/3$, $\omega t_3 = 2\pi/3$, $\omega t_4 = \pi$, $\omega t_5 = 4\pi/3$, $\omega t_6 = 5\pi/3$.

In summary, the estimation equations are able to be defined as follows. When the model equation is $y = A\sin(\omega t + \theta)$:

$$A\cos(\theta) = \frac{\sum_{i=1}^{N}\sin(\omega t_i) y_i}{3} \quad \text{(Eq. 5)}$$

$$A\sin(\theta) = \frac{\sum_{i=1}^{N}\cos(\omega t_i) y_i}{3}$$

$$\theta = \tan^{-1}\left(\frac{A\sin(\theta)}{A\cos(\theta)}\right) = \tan^{-1}\left(\frac{\sum_{i=1}^{N}\cos(\omega t_i)y_i}{\sum_{i=1}^{N}\sin(\omega t_i)y_i}\right)$$

When the model equation is y=A cos(ωt+θ):

$$A\cos(\theta) = \frac{\sum_{i=1}^{N}\cos(\omega t_i)y_i}{3} \quad A\sin(\theta) = \frac{\sum_{i=1}^{N}-\sin(\omega t_i)y_i}{3} \quad \text{(Eq. 5A)}$$

$$\theta = \tan^{-1}\left(\frac{A\sin(\theta)}{A\cos(\theta)}\right) = \tan^{-1}\left(\frac{\sum_{i=1}^{N}-\sin(\omega t_i)y_i}{\sum_{i=1}^{N}\cos(\omega t_i)y_i}\right)$$

Figure 17:
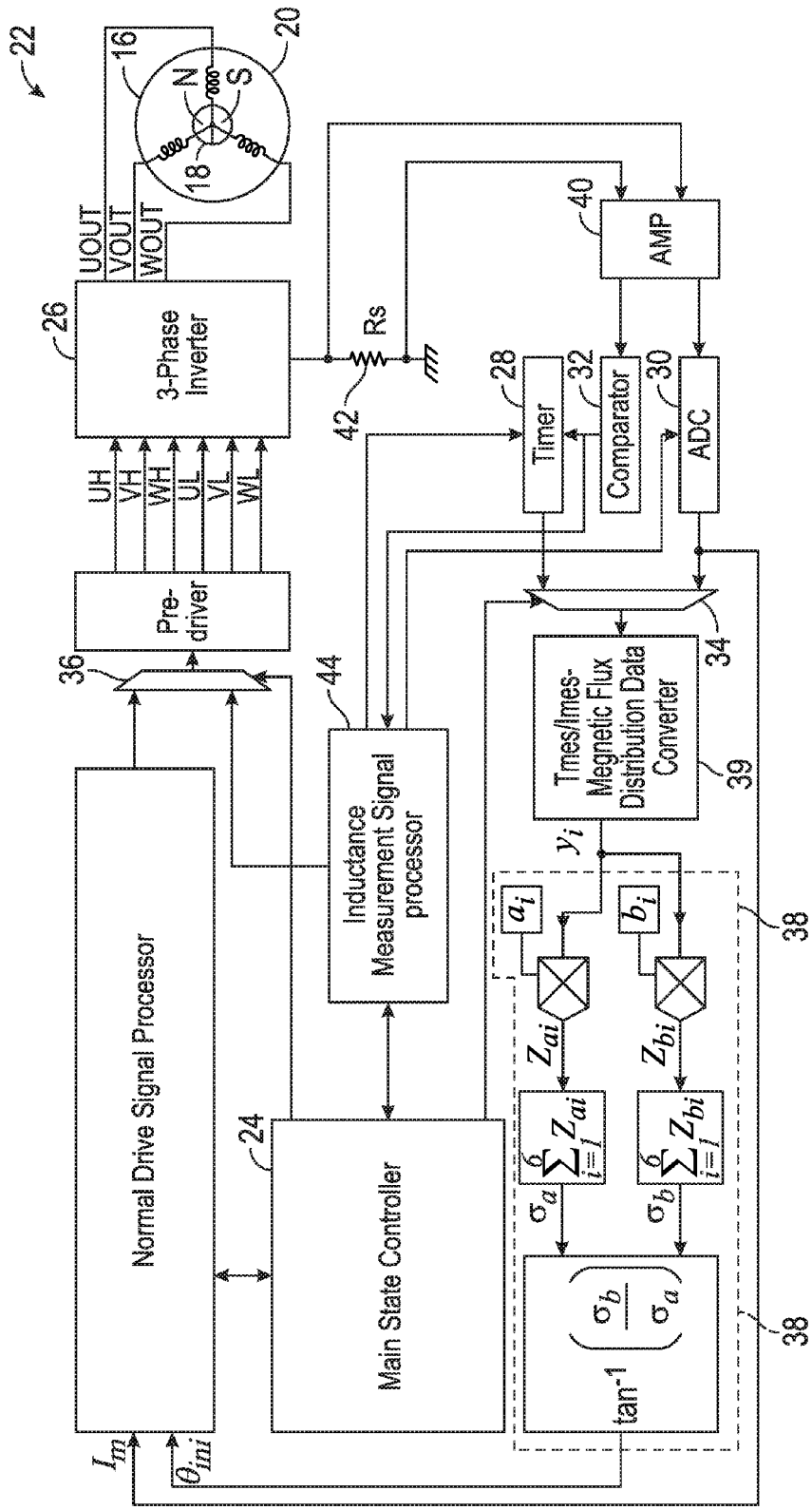
FIG. 17 is a block diagram representatively illustrating elements of an implementation of a system for sensing rotor position of a motor.
Figure 24:
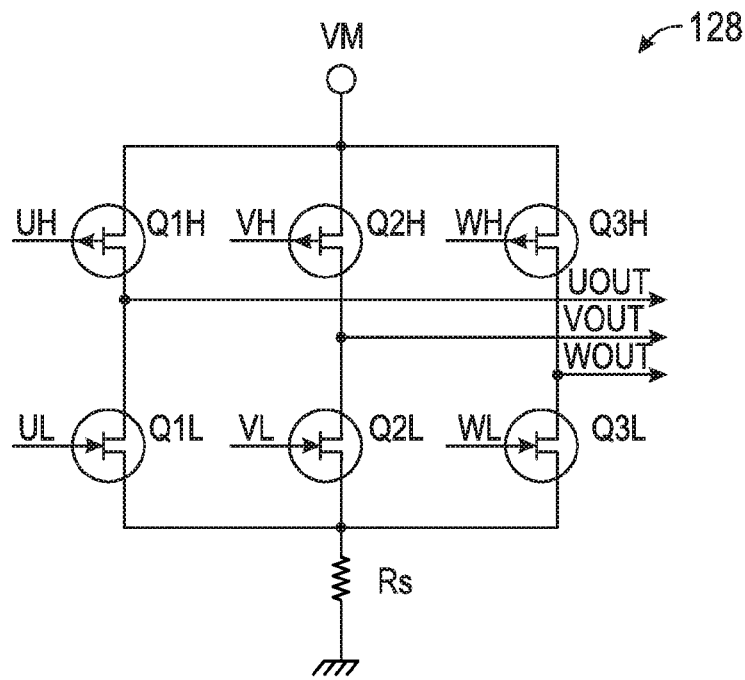
FIG. 24 is a diagram representatively illustrating elements of an implementation of a three-phase inverter and a shunt resistor coupled therewith.

For example, FIG. 17 shows a representative implementation of a system for sensing rotor position of a motor (system) 22. The motor to which the system is coupled is a star configuration three-phase permanent magnet synchronous motor (PMSM) 16 having a rotor 18 and stator 20. A three-phase inverter 26 is coupled with the PMSM and receives UH, VH, WH, UL, VL, and WL signals from a pre-driver. The three-phase inverter may, by non-limiting example, have the configuration shown of three-phase inverter 128 of FIG. 24, where the UH signal controls switch Q1H, VH signal controls switch Q2H, WH signal controls switch Q3H, UL signal controls switch Q1L, VL signal controls switch Q2L, and WL signal controls switch Q3L to output three phase power to lines UOUT, VOUT, and WOUT, which are coupled with the PMSM using a star configuration. Three-phase inverter is coupled with voltage VM and a shunt resistor 42 (labeled Rs) is also coupled therewith as part of system 22.

The switches of three-phase inverter 128 may be controlled, such as by the main-state controller controlling the normal drive signal processor and/or the inductance measurement signal processor, to accomplish the desired current vector. For example, if the uv current vector is needed, Q1H and Q2L may be turned on and all other switches turned off, so that the current shown is the Rs voltage. The switches may be otherwise changed as desired to accomplish the wu, wv, uw, vw, and vu current vectors.

FIG. 17 shows that two lines are coupled on either side of Rs and are input to an amplifier (AMP) 40. A normal drive signal processor is used to control the pre-driver, but system 22 includes a multiplexer 36 coupled between the normal drive signal processor and the pre-driver so as to receive signals from the normal drive signal processor and from an inductance measurement signal processor (signal processor) 44. The multiplexer 36 is controlled by a main state controller (controller) 24 which also may communicate with the normal drive signal processor. Accordingly, in order to determine the position of the rotor of the PMSM, the controller 24 may alter the input of the pre-driver using multiplexer 36 so that inputs from signal processor 44 are used to generate voltage pulses using the pre-driver.

In this representative example, the input from the normal drive signal processor is not received by the pre-driver while the signal processor 44 is driving the voltage pulses with the pre-driver. However, in some implementations the multiplexer 36 could be toggled with the main state controller so that the signal(s) from the normal driver signal processor to the pre-driver is only briefly cut off while the signal from the signal processor 44 is passed through and then the signal(s) from the normal drive signal processor is allowed to continue. In such an implementation the normal driver signal processor signal could be toggled back on (or in other words the multiplexer 36 toggled to allow that signal to pass through) in between voltage pulses. In other implementations the signal from the normal drive signal processor to the pre-driver could be disallowed to pass through multiplexer 36 until all voltage pulses needed to establish the position of the rotor have been accomplished. In other implementations the normal drive signal processor could be controlled to drive the voltage pulses directly instead of utilizing the signal processor 44 for that purpose.

Each time a voltage pulse occurs a signal will be received by AMP 40. In implementations this signal will be amplified by AMP 40 and passed on so that one signal will be passed to comparator 32 and another to an analog-to-digital converter (ADC) 30. In other implementations the signal could be passed only to the comparator or only to the ADC. The comparator is communicatively coupled with a timer 28 and the timer is communicatively coupled with multiplexer 34. The ADC 30 is communicatively coupled with multiplexer 34 and is also communicatively coupled with the normal drive signal processor.

A number of logic elements 38 are coupled with multiplexer 34 and with the normal drive signal processor and are used to determine the rotor position. Either the time measurement (Tmes) method or the current measurement (Imes) method, as described above, could be used to determine rotor position. If the Tmes method is used, then the timer is used in the process. For example, the signal processor 44 may cause the timer to start when the voltage pulse is initialized (or, in other implementations, may cause the timer to start when the current reaches a first level as communicated to the signal processor 44 from the comparator. When the current reaches an Ic level (some predetermined current level) as communicated from the comparator to the signal processor 44, then the timer may be caused to stop by the signal processor 44 (though in other implementations one or more signals from the comparator to the timer may be used to directly start and/or stop the timer). In this way, the system 22 measures, in conjunction with each voltage pulse, the time in which the current reaches a specified current level. As discussed previously with respect to FIG. 6, this may be used to determine inductance of the PMSM, which may in turn be used, together with one or more algorithms, to determine rotor position.

In representative examples there are six voltage pulses used for rotor position calculation, though it may be understood that fewer or more voltage pulses could be used in other implementations. Each time a voltage pulse is applied a new $y_1$ value, including a measured time Tmes (or a measured current Imes if that method is used), the signal is communicated to the multiplexer 34 from the timer. The multiplexer outputs the signal through the Tmes/Imes-Magnetic Flux Distribution Data Converter 39 which then outputs further down the line. Since in this example system 22 is using Tmes to calculate the rotor position the main state controller 24 will control multiplexer 34 so that the signals from the timer are passed through it. The measured values $y_1$ in the representative example are therefore measured time values Tmes.

The logic elements 38 are configured to calculate the position of the rotor using the measured values $y_i$. The equation $\tan^{-1}(\sigma_b/\sigma_a)$, for example, is a simplified way of writing Equation 5, given above. Therefore, $\sigma_b$ represents A $\sin(\theta)$ and $\sigma_a$ represents A $\cos(\theta)$, but since each of these is a summation (as indicated by Equation 5) it may be seen in FIG. 17 that each of these values is calculated with one or more logic elements that sums the individual values $Za_i$ and $Zb_i$. The individual $Za_i$ and $Zb_i$ values are communicated to the summing elements using one or more logic elements that perform the sine/cosine operations and/or any other needed operations as given in Equation 5, which utilize the values $\omega t_i$ and $y_i$.

The $a_i$ values shown in FIG. 17 are $\sin(\omega t_i)$ or $\cos(\omega t_i)$ and the $b_i$ values shown in FIG. 17 are $\cos(\omega t_i)$ or $-\sin(\omega t_i)$ depending on which mode is being used (current or time measurement). Summations are performed by logic elements 38 as indicated by Equation 5/5A. The inverse tangent operation is performed to obtain the $\theta$ value, indicative of the rotor position relative to the stator (within 30 degrees of accuracy in various implementations). This is communicated to the normal drive signal processor. The $\omega t_i$ values have been described above and are constants, they may be stored in memory, input by a user, or calculated by the system based on the value of N.

The motor current Im is also communicated to the normal drive signal processor from the ADC when the signal processor 44 controls the ADC to send that signal. In the implementation of FIG. 17 the PMSM is not being controlled with vector control, but nevertheless the system 22 (which includes Rs, the AMP 40, the timer, the comparator, the ADC, multiplexer 34, the logic elements 38, the main state controller, the inductance measurement signal processor, and multiplexer 36), is able to determine the rotor position of the PMSM rotor using voltage pulses and measuring the time for the current to reach a certain level with each pulse (or alternatively using the Imes method), as previously described. The normal drive signal processor may use the initial rotor position information $\theta_{ini}$ and the motor current information $I_m$ to determine how to control the pre-driver to optimally increase, maintain, or decrease the speed of the rotor as desired. The system 22 may be used when the rotor is in a stopped configuration and also when the rotor is in a rotating configuration.

In other methods of use of system 22, a voltage pulse may be applied for a specified amount of time and the current reached may be measured (Imes) instead of the time. In this case a signal may be communicated from the ADC to the Tmes/Imes-Magnetic Flux Distribution Data Converter 39 through the multiplexer 34 with each pulse. In some implementations the comparator could be used to determine when the current peaks with each pulse and may communicate this to the signal processor 44 which may then control the ADC so that the ADC sends a signal indicative of the peak current level to the Tmes/Imes-Magnetic Flux Distribution Data Converter 39 through multiplexer 34 as the $y_1$ value. The math is then performed by the logic elements using the relationships described above in Equation 5A. In this operation condition the controller 24 would control the multiplexer 34 so that the signal from the ADC is passed through to the logic elements. Many different configurations and organizations of logic elements may be used to perform the operations of Equations 5 and/or 5A.

Figure 7:
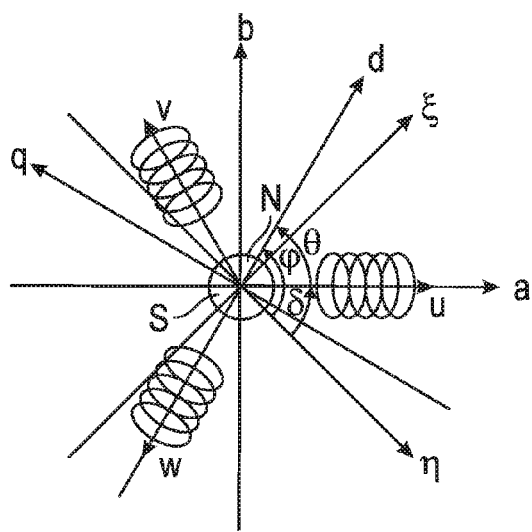
FIG. 7 is a diagram representatively illustrating elements and axes of an implementation of a PMSM having a star (wye) (Y) configuration.

Descriptions and math related specifically to a PMSM with a star (wye) (Y) configuration will now be given. Referring now to FIG. 7, various axes may be defined. The u-axis, v-axis, and w-axis are stationary axes having axes aligned with corresponding stator cores. The a-axis is a stationary axis parallel to the u-axis and the b-axis is the quadrature of the a-axis (in other words 90 degrees offset from the a-axis). The $\eta$-axis is a stationary axis having a phase difference of $\delta$ from the a-axis, and the $\xi$-axis is the quadrature of the $\eta$-axis. The d-axis is on an axis of the rotor magnetic flux and the q-axis is the quadrature of the d-axis (these are rotating axes). The $\theta$ angle is the phase difference between the a-axis and the d-axis. The rotor position in this representative example is defined as 0 degrees when the u-axis is parallel with the d-axis. The $\phi$ angle is $\theta+\delta$. The north and south poles (N/S) of the permanent magnet of the PMSM rotor may be seen at the center of the figure.

The descriptions above with respect to the d-axis and q-axis inductance of IPMSMs and SPMSMs apply, namely, that d-axis inductance is smaller than q-axis inductance. FIGS. 10A-10B show rotor magnetic flux distribution and rotor position of an SPMSM which applies to an SPMSM having a star configuration, and the distribution shows an approximate sinusoidal waveform completing one cycle with one electric angle rotation of the rotor. This is essentially the same as that shown in FIGS. 5A-5B previously. FIGS. 11A-11B show rotor permeability distribution and rotor position of an IPMSM which applies to an IPMSM having a star configuration. The distribution shows a sinusoidal waveform having a double cycle with one electric angle rotation of the rotor. As described previously, uv means the current vector phase in which the energization is performed with direction from the u-phase to the v-phase, vu means energization performed with direction from the v-phase to the u-phase, and vw, wv, wu, and uw are similarly defined.

Figure 12:
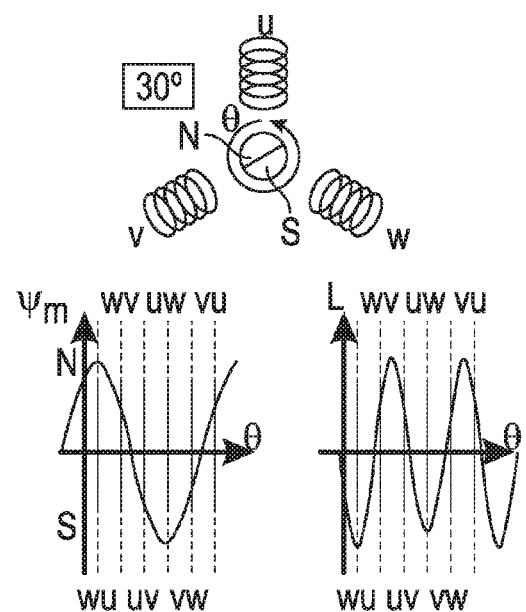
FIG. 12 representatively illustrates magnetic flux distribution and expected stator inductance distribution in an SPMSM.
Figure 13:
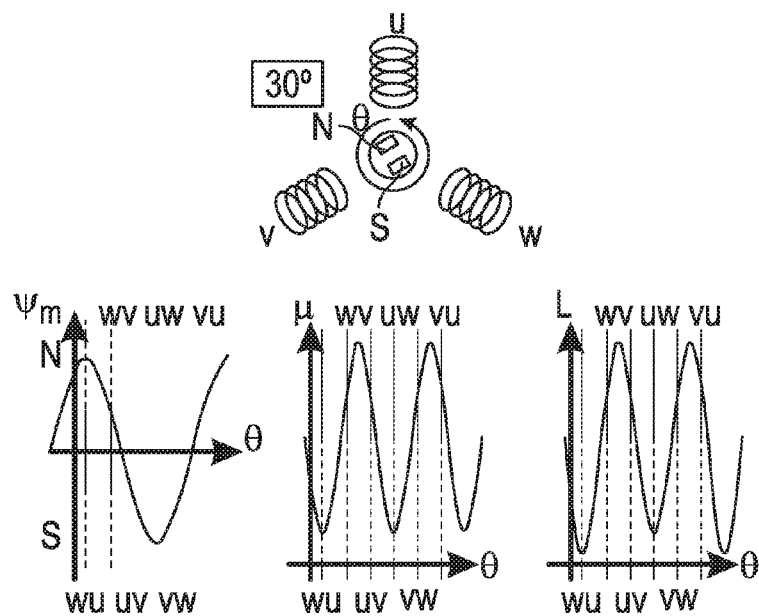
FIG. 13 representatively illustrates magnetic flux distribution, permeability distribution, and expected stator inductance distribution in an IPMSM.

FIG. 12 shows an example of an SPMSM where the rotor position is at 30 degrees. In this position, when the wu-current vector is input, the stator inductance is expected to be smallest due to the magnetic saturation characteristics, and when the uw-current vector is input the inductance is expected to be second smallest. FIG. 13 shows an example of an IPMSM where the rotor position is at 30 degrees. When the wu-current vector is input the inductance is expected to be smallest due to the $\mu$ distribution and the magnetic saturation characteristics. When the uw-current vector is input the inductance is expected to be second smallest. The inductance distribution may be represented as a superimposed distribution of $\mu$ and the magnetic saturation characteristics, and the inductance distribution is seen to have a double frequency of the flux distribution.

Rotor position estimation specifically for a PMSM having a star configuration is done using the following assumptions: rotor magnetic flux has a sinusoidal waveform even if there is some distortion; inductance distribution has double the frequency of the flux distribution; the phase of the sinusoidal waveform will indicate rotor position, and; although the inductance distribution shows double frequency of the magnetic flux distribution, magnetic saturation characteristics solve double function issues. The sinusoidal waveform is estimated by curve fitting.

The relation between the energization patterns vu, vw, uw, uv, wv, and wu are defined as: $\alpha_1$=wu, $\alpha_2$=wv, $\alpha_3$=uv, $\alpha_4$=uw, $\alpha_5$=vw, $\alpha_6$=vu. Accordingly, $\alpha_i$ is the energization current vector phase and has intervals of $\pi/3$. As shown in FIG. 7 and FIGS. 10A-11B, when $\alpha_i$ is defined on the ab-axis the $\alpha_i$ values are as follows: $\alpha_1=\pi/6$, $\alpha_2=\pi/2$, $\alpha_3=5\pi/6$, $\alpha_4=7\pi/6$, $\alpha_5$ $3\pi/2$, $\alpha_6=11\pi/6$. They therefore range between $0-2\pi$ (or $0-11\pi/6$).

When $2\alpha_i$ is zero or an integral multiple of $\pi/2$, the value of the sine or cosine function becomes zero. To avoid this, the $\eta\xi$-coordinate system and $\phi$ are introduced. As described above:

$$\phi=\theta+\delta \qquad \text{(Eq. 1B)}$$

Figure 14:
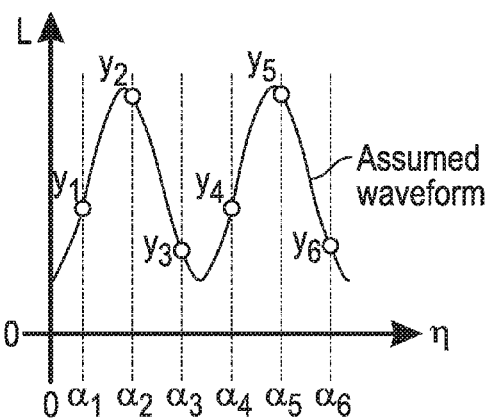
FIG. 14 representatively illustrates an assumed inductance (L) waveform of a PMSM generated using measured values $y_1$ through $y_6$.
Figure 15:
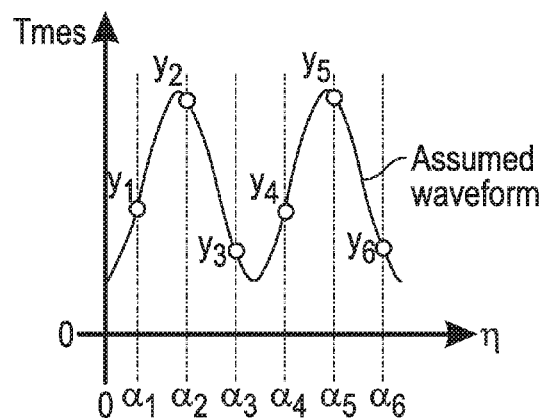
FIG. 15 representatively illustrates an assumed time value (Tmes) waveform of a PMSM generated using measured values $y_1$ through $y_6$.
Figure 16:
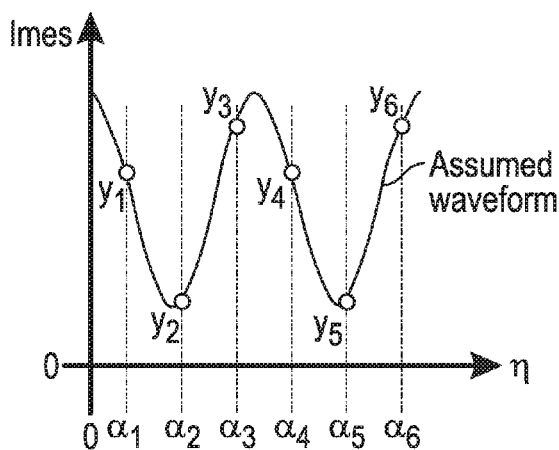
FIG. 16 representatively illustrates an assumed current value (Imes) waveform of a PMSM generated using measured values $y_1$ through $y_6$.

Therefore, $\alpha_i$ is biased with $\delta$ and is defined as follows:

$$\alpha_i = \frac{\pi}{6} + \delta + \frac{\pi}{3}(i-1) \quad \text{(Eq. 2B)}$$

Where i=1, 2, 3, 4, 5, or 6 (though in other implementations more than six values could be used). The term $\delta$ is set to avoid the condition where $2\alpha_i$ becomes an integral multiple of $\pi/2$ or zero (for example setting $\delta$ equal to $\pi/24$ works). FIG. 14-16 show the relationship between inductance (L), Tmes, Imes, and the measuring data (or measured values) $y_i$. FIG. 14 representatively illustrates an assumed inductance (L) waveform of a PMSM generated using measured values $y_1$ through $y_6$. FIG. 15 representatively illustrates an assumed time value (Tmes) waveform of a PMSM generated using measured values $y_1$ through $y_6$. FIG. 16 representatively illustrates an assumed current value (Imes) waveform of a PMSM generated using measured values $y_1$ through $y_6$.

The below math is based on a least squares method. When the measuring is performed using Tmes based on FIGS. 10A-11B, the model equation is given as $y=-A\cos(2\alpha-2\phi)$ where A is amplitude, y is measured data or a measured value, $\alpha$ is measuring current vector phase on the $\eta\xi$-coordinate system, and $\phi$ is the phase, which indicates the rotor position on the $\eta\xi$-coordinate system. If $\alpha$ and y are known, then the equation is solved by finding the solution to A and $\phi$. On the other hand, if measuring is performed with Imes, the model equation is given as $y=A\cos(2\alpha-2\phi)$. The DC bias of y may be ignored because the curve fitting algorithm uses a least squares method.

When the curve fitting algorithm is $y=-A\cos(2\alpha-2\phi)$, and each measuring current phase is defined as ($\alpha_1$, $\alpha_2$, $\alpha_3$, ... $\alpha_N$), the model equation is shown as follows:

$$\begin{bmatrix} y_1 \\ y_2 \\ \vdots \\ y_N \end{bmatrix} = -\begin{bmatrix} A\cos(2\alpha_1 - 2\varphi) \\ A\cos(2\alpha_2 - 2\varphi) \\ \vdots \\ A\cos(2\alpha_N - 2\varphi) \end{bmatrix} =$$

$$-\begin{bmatrix} A\cos(2\alpha_1)\cos(2\varphi) + A\sin(2\alpha_1)\sin(2\varphi) \\ A\cos(2\alpha_2)\cos(2\varphi) + A\sin(2\alpha_2)\sin(2\varphi) \\ \vdots \\ A\cos(2\alpha_N)\cos(2\varphi) + A\sin(2\alpha_N)\sin(2\varphi) \end{bmatrix} =$$

$$\begin{bmatrix} -\cos(2\alpha_1) & -\sin(2\alpha_1) \\ -\cos(2\alpha_2) & -\sin(2\alpha_2) \\ \vdots & \vdots \\ -\cos(2\alpha_N) & -\sin(2\alpha_N) \end{bmatrix} \begin{bmatrix} A\cos(2\varphi) \\ A\sin(2\varphi) \end{bmatrix}$$

The above equation may be written as Y=GP, where:

$$Y = \begin{bmatrix} y_1 \\ y_2 \\ \vdots \\ y_N \end{bmatrix} \quad G = \begin{bmatrix} -\cos(2\alpha_1) & -\sin(2\alpha_1) \\ -\cos(2\alpha_2) & -\sin(2\alpha_2) \\ \vdots & \vdots \\ -\cos(2\alpha_N) & -\sin(2\alpha_N) \end{bmatrix} \quad \text{(Eq. 3B)}$$

$$P = \begin{bmatrix} A\cos(2\varphi) \\ A\sin(2\varphi) \end{bmatrix}$$

If measurement error E is added, the equation may be written as Y=GP+E or E=Y-GP. The least squares method finds the solution to P which gives the extremum of square norm of E, as follows:

$$\|E\|^2 = E^* \cdot E$$

$$= (Y^* - G^*) \cdot (Y - GP)$$

$$= Y^*Y - Y^*GP - P^*G^*Y + P^*G^*GP$$

$$= Y^*Y - 2Y^*GP + P^*G^*GP$$

$$\frac{\partial}{\partial P}\|E\|^2 = -2Y^*G + 2P^*G^*G = 0$$

$$Y^*G = P^*G^*G$$

$$P^* = Y^*G(G^*G)^{-1}$$

$$P = (G^*G)^{-1}G^*Y$$

$$P = G^+Y \quad \text{(Eq. 4B)}$$

Where:

$Y^*, P^*, G^*$; adjoint matrix $= (G^*G)^{-1}G^*$; pseudo-inverse matrix

If $G^+$ is found by what Eq. 3B is assigned to Eq. 4B, then P may be found.

$$P = G^+Y$$

$$P = (G^TG)^{-1}G^TY; G^T = G^* \text{ since } G \text{ is a real number}$$

$$= \left(\begin{bmatrix} -\cos(2\alpha_1) & -\cos(2\alpha_2) & \dots & -\cos(2\alpha_N) \\ -\sin(2\alpha_1) & -\sin(2\alpha_2) & \dots & -\sin(2\alpha_N) \end{bmatrix} \begin{bmatrix} -\cos(2\alpha_1) & -\sin(2\alpha_1) \\ -\cos(2\alpha_2) & -\sin(2\alpha_2) \\ \vdots & \vdots \\ -\cos(2\alpha_N) & -\sin(2\alpha_N) \end{bmatrix}\right)^{-1}$$

$$\begin{bmatrix} -\cos(2\alpha_1) & -\cos(2\alpha_2) & \dots & -\cos(2\alpha_N) \\ -\sin(2\alpha_1) & -\sin(2\alpha_2) & \dots & -\sin(2\alpha_N) \end{bmatrix} \begin{bmatrix} y_1 \\ y_2 \\ \vdots \\ y_N \end{bmatrix} =$$

$$\begin{bmatrix} \sum_{i=1}^{N}(-\cos(2\alpha_i))^2 & \sum_{i=1}^{N}\sin(2\alpha_i)\cos(2\alpha_i) \\ \sum_{i=1}^{N}\sin(2\alpha_i)\cos(2\alpha_i) & \sum_{i=1}^{N}(-\sin(2\alpha_i))^2 \end{bmatrix}^{-1} \begin{bmatrix} \sum_{i=1}^{N}-\cos(2\alpha_i)y_i \\ \sum_{i=1}^{N}-\sin(2\alpha_i)y_i \end{bmatrix}$$

The term of $\Sigma_{i=1}^{N}\sin(2\alpha_i)\cos(2\alpha_i)$ must be zero because $\alpha_i$ is the same t=interval and is within just one period of the model equation, so the equation becomes:

$$= \left[\begin{array}{cc} \sum_{i=1}^{N}(-\cos(2\alpha_i))^2 & 0 \\ 0 & \sum_{i=1}^{N}(-\sin(2\alpha_i))^2 \end{array}\right]^{-1} \left[\begin{array}{c} \sum_{i=1}^{N}-\cos(2\alpha_i)y_i \\ \sum_{i=1}^{N}-\sin(2\alpha_i)y_i \end{array}\right] = \quad \text{(Eq. 5B)}$$

$$\frac{1}{\sum_{i=1}^{N}(-\sin(2\alpha_i))^2 \times \sum_{i=1}^{N}(-\cos(2\alpha_i))^2}$$

$$\left[\begin{array}{cc} \sum_{i=1}^{N}(-\sin(2\alpha_i))^2 & 0 \\ 0 & \sum_{i=1}^{N}(-\cos(2\alpha_i))^2 \end{array}\right] \left[\begin{array}{c} \sum_{i=1}^{N}-\cos(2\alpha_i)y_i \\ \sum_{i=1}^{N}-\sin(2\alpha_i)y_i \end{array}\right] =$$

$$\frac{1}{\sum_{i=1}^{N}(-\sin(2\alpha_i))^2 \times \sum_{i=1}^{N}(-\cos(2\alpha_i))^2}$$

$$\left[\begin{array}{c} \sum_{i=1}^{N}(-\sin(2\alpha_i))^2 \times \sum_{i=1}^{N}-\cos(2\alpha_i)y_i \\ \sum_{i=1}^{N}(-\cos(2\alpha_i))^2 \times \sum_{i=1}^{N}-\sin(2\alpha_i)y_i \end{array}\right] =$$

$$\left[\begin{array}{c} \dfrac{\sum_{i=1}^{N}-\cos(2\alpha_i)y_i}{\sum_{i=1}^{N}(-\cos(2\alpha_i))^2} \\ \dfrac{\sum_{i=1}^{N}-\sin(2\alpha_i)y_i}{\sum_{i=1}^{N}(-\sin(2\alpha_i))^2} \end{array}\right] = \left[\begin{array}{c} A\cos(2\varphi) \\ A\sin(2\varphi) \end{array}\right]$$

Therefore, $\phi$ is given as follows:

$$2\varphi = \tan^{-1}\frac{A\sin(2\varphi)}{A\cos(2\varphi)} \quad \text{(Eq. 6B)}$$

And:

$$A = \sqrt{(A\cos(2\phi))^2 + (A\sin(2\phi))^2}$$

When the model equation is $y = A\cos(2\alpha - 2\phi)$ each measuring current phase is defined as $(\alpha_1, \alpha_2, \alpha_3, \ldots \alpha_N)$, and the model equation is shown as follows:

$$\left[\begin{array}{c} y_1 \\ y_2 \\ \vdots \\ y_N \end{array}\right] = \left[\begin{array}{c} A\cos(2\alpha_1 - 2\varphi) \\ A\cos(2\alpha_2 - 2\varphi) \\ \vdots \\ A\cos(2\alpha_N - 2\varphi) \end{array}\right] = \left[\begin{array}{c} A\cos(2\alpha_1)\cos(2\varphi) + A\sin(2\alpha_1)\sin(2\varphi) \\ A\cos(2\alpha_2)\cos(2\varphi) + A\sin(2\alpha_2)\sin(2\varphi) \\ \vdots \\ A\cos(2\alpha_N)\cos(2\varphi) + A\sin(2\alpha_N)\sin(2\varphi) \end{array}\right] =$$

$$= \left[\begin{array}{cccc} \cos(2\alpha_1) & \sin(2\alpha_1) \\ \cos(2\alpha_2) & \sin(2\alpha_2) \\ \vdots & \vdots \\ \cos(2\alpha_N) & \sin(2\alpha_N) \end{array}\right] \left[\begin{array}{c} A\cos(2\varphi) \\ A\sin(2\varphi) \end{array}\right]$$

The above equation may be written as Y=GP, where:

$$Y = \left[\begin{array}{c} y_1 \\ y_2 \\ \vdots \\ y_N \end{array}\right] \quad G = \left[\begin{array}{cc} \cos(2\alpha_1) & \sin(2\alpha_1) \\ \cos(2\alpha_2) & \sin(2\alpha_2) \\ \vdots & \vdots \\ \cos(2\alpha_N) & \sin(2\alpha_N) \end{array}\right] \quad \text{(Eq. 3C)}$$

$$P = \left[\begin{array}{c} A\cos(2\varphi) \\ A\sin(2\varphi) \end{array}\right]$$

If measurement error E is added, the equation may be written as Y=GP+E or E=Y−GP. The least squares method finds the solution to P which gives the extremum of square norm of E, as follows:

$$\|E\| = E^* \cdot E$$

$$= (Y^* - P^* G^*) \cdot (Y - GP)$$

$$= Y^* Y - Y^* GP - P^* G^* Y + P^* G^* GP$$

$$= Y^* Y - 2 Y^* GP + P^* G^* GP$$

$$\frac{\partial}{\partial P}\|E\|^2 = -2Y^* G + 2P^* G^* G = 0$$

$$Y^* G = P^* G^* G$$

$$P^* = Y^* G (G^* G)^{-1}$$

$$P = (G^* G)^{-1} G^* Y$$

$$P = G^+ Y \quad \text{(Eq. 4C)}$$

Where:

$Y^*, P^*, G^*$; adjoint matrix $G^+ = (G^* G)^{-1} G^*$; pseudo-inverse matrix

If $G^+$ is found by what Eq. 3C is assigned to Eq. 4C, then P may be found.

$$P = G^+ Y$$

$$P = (G^T G)^{-1} G^T Y;\; G^T = G^* \text{ since } G \text{ is a real number}$$

$$= \left(\left[\begin{array}{cccc} \cos(2\alpha_1) & \cos(2\alpha_2) & \ldots & \cos(2\alpha_N) \\ \sin(2\alpha_1) & \sin(2\alpha_2) & \ldots & \sin(2\alpha_N) \end{array}\right] \left[\begin{array}{cc} \cos(2\alpha_1) & \sin(2\alpha_1) \\ \cos(2\alpha_2) & \sin(2\alpha_2) \\ \vdots & \vdots \\ \cos(2\alpha_N) & \sin(2\alpha_N) \end{array}\right]\right)^{-1}$$

$$\begin{bmatrix} \cos(2\alpha_1) & \cos(2\alpha_2) & \ldots & \cos(2\alpha_N) \\ \sin(2\alpha_1) & \sin(2\alpha_2) & \ldots & \sin(2\alpha_N) \end{bmatrix} \begin{bmatrix} y_1 \\ y_2 \\ \vdots \\ y_N \end{bmatrix} =$$

$$\begin{bmatrix} \sum_{i=1}^{N}(\cos(2\alpha_i))^2 & \sum_{i=1}^{N}\sin(2\alpha_i)\cos(2\alpha_i) \\ \sum_{i=1}^{N}\sin(2\alpha_i)\cos(2\alpha_i) & \sum_{i=1}^{N}(\sin(2\alpha_i))^2 \end{bmatrix}^{-1} \begin{bmatrix} \sum_{i=1}^{N}\cos(2\alpha_i)y_i \\ \sum_{i=1}^{N}\sin(2\alpha_i)y_i \end{bmatrix}$$

The term of $\Sigma_{i=1}^{N} \sin(2\alpha_i)\cos(2\alpha_i)$ must be zero because $\alpha_i$ is the same interval and is within just one period of the model function, so the equation becomes:

$$= \begin{bmatrix} \sum_{i=1}^{N}(\cos(2\alpha_i))^2 & 0 \\ 0 & \sum_{i=1}^{N}(\sin(2\alpha_i))^2 \end{bmatrix}^{-1} \begin{bmatrix} \sum_{i=1}^{N}\cos(2\alpha_i)y_i \\ \sum_{i=1}^{N}\sin(2\alpha_i)y_i \end{bmatrix} = \quad \text{(Eq. 5C)}$$

$$\frac{1}{\sum_{i=1}^{N}(\sin(2\alpha_i))^2 \times \sum_{i=1}^{N}(\cos(2\alpha_i))^2}$$

$$\begin{bmatrix} \sum_{i=1}^{N}(\sin(2\alpha_i))^2 & 0 \\ 0 & \sum_{i=1}^{N}(\cos(2\alpha_i))^2 \end{bmatrix} \begin{bmatrix} \sum_{i=1}^{N}\cos(2\alpha_i)y_i \\ \sum_{i=1}^{N}\sin(2\alpha_i)y_i \end{bmatrix} =$$

$$\frac{1}{\sum_{i=1}^{N}(\sin(2\alpha_i))^2 \times \sum_{i=1}^{N}(\cos(2\alpha_i))^2}$$

$$\begin{bmatrix} \sum_{i=1}^{N}(\sin(2\alpha_i))^2 \times \sum_{i=1}^{N}\cos(2\alpha_i)y_i \\ \sum_{i=1}^{N}(\cos(2\alpha_i))^2 \times \sum_{i=1}^{N}\sin(2\alpha_i)y_i \end{bmatrix} =$$

$$\begin{bmatrix} \dfrac{\sum_{i=1}^{N}\cos(2\alpha_i)y_i}{\sum_{i=1}^{N}(\cos(2\alpha_i))^2} \\ \dfrac{\sum_{i=1}^{N}\sin(2\alpha_i)y_i}{\sum_{i=1}^{N}(\sin(2\alpha_i))^2} \end{bmatrix} = \begin{bmatrix} A\cos(2\varphi) \\ A\sin(2\varphi) \end{bmatrix}$$

Therefore, $\phi$ is given as follows:

$$2\varphi = \tan^{-1}\frac{A\sin(2\varphi)}{A\cos(2\varphi)}$$

Therefore, when the model equation is $y = -A\cos(2\alpha - 2\phi)$ the following algorithms may be used:

$$A\cos(2\varphi) = \frac{\sum_{i=1}^{N} -\cos(2\alpha_i)y_i}{3} \quad A\sin(2\varphi) = \frac{\sum_{i=1}^{N} -\sin(2\alpha_i)y_i}{3} \quad \text{(Eq. 7A)}$$

$$2\varphi = \tan^{-1}\left(\frac{A\sin(2\varphi)}{A\cos(2\varphi)}\right) = \tan^{-1}\left(\frac{\sum_{i=1}^{N} -\sin(2\alpha_i)y_i}{\sum_{i=1}^{N} -\cos(2\alpha_i)y_i}\right)$$

And when the model equation is $y = A\cos(2\alpha - 2\phi)$ the following algorithms may be used:

$$A\cos(2\varphi) = \frac{\sum_{i=1}^{N}\cos(2\alpha_i)y_i}{3} \quad A\sin(2\varphi) = \frac{\sum_{i=1}^{N}\sin(2\alpha_i)y_i}{3} \quad \text{(Eq. 7B)}$$

$$2\varphi = \tan^{-1}\left(\frac{A\sin(2\varphi)}{A\cos(2\varphi)}\right) = \tan^{-1}\left(\frac{\sum_{i=1}^{N}\sin(2\alpha_i)y_i}{\sum_{i=1}^{N}\cos(2\alpha_i)y_i}\right)$$

The following procedure is used to determine $\theta$ since the model equation is a trigonometric function with double angle variable.

$$\theta_a = \phi - \delta \quad \text{(Eq. 8)}$$

$$\theta_b = \begin{cases} \theta_a + \pi, & \theta_a < 0 \\ \theta_a, & \theta_a \geq 0 \end{cases} \quad \text{(Eq. 9)}$$

$$\theta = \begin{cases} \theta_b, & -\dfrac{\pi}{3} < \tau < +\dfrac{\pi}{3} \\ \theta_b + \pi, & \tau < -\dfrac{\pi}{3}, \tau > +\dfrac{\pi}{3} \end{cases} \quad \text{(Eq. 10)}$$

Where $$\tau_a = \theta_b - \alpha_k$$

$$\alpha_k = \begin{cases} \alpha_i \text{ which gives the least } y_i, \text{ model equation } y = -A\cos(2\alpha - 2\varphi) \\ \alpha_i \text{ which gives the largest } y_i, \text{ model equation } y = A\cos(2\alpha - 2\varphi) \end{cases}$$

$$\tau = \begin{cases} \tau_a, & \tau_a > -\left(\dfrac{7}{6}\pi + \delta\right) \\ \tau_a + 2\pi, & \tau_a < -\left(\dfrac{7}{6}\pi + \delta\right) \end{cases}$$

Equation 7A or 7B and Equations 8-10 are then used for the actual operation. For example, referring now to FIG. 18, a representative example of a system for sensing rotor position of a motor (system) 46 is given. System 46 is coupled with a PMSM having a star configuration, and is in many ways similar to system 22 described previously, except that logic elements 47 are configured specifically to perform the operations of Equations 7A/7B and Equations 8-10. As previously described, the PMSM has a star configuration and voltage pulses may be used and then a time measured (Tmes) or a current measured (Imes) in order to determine the position of the rotor.

Figure 18:
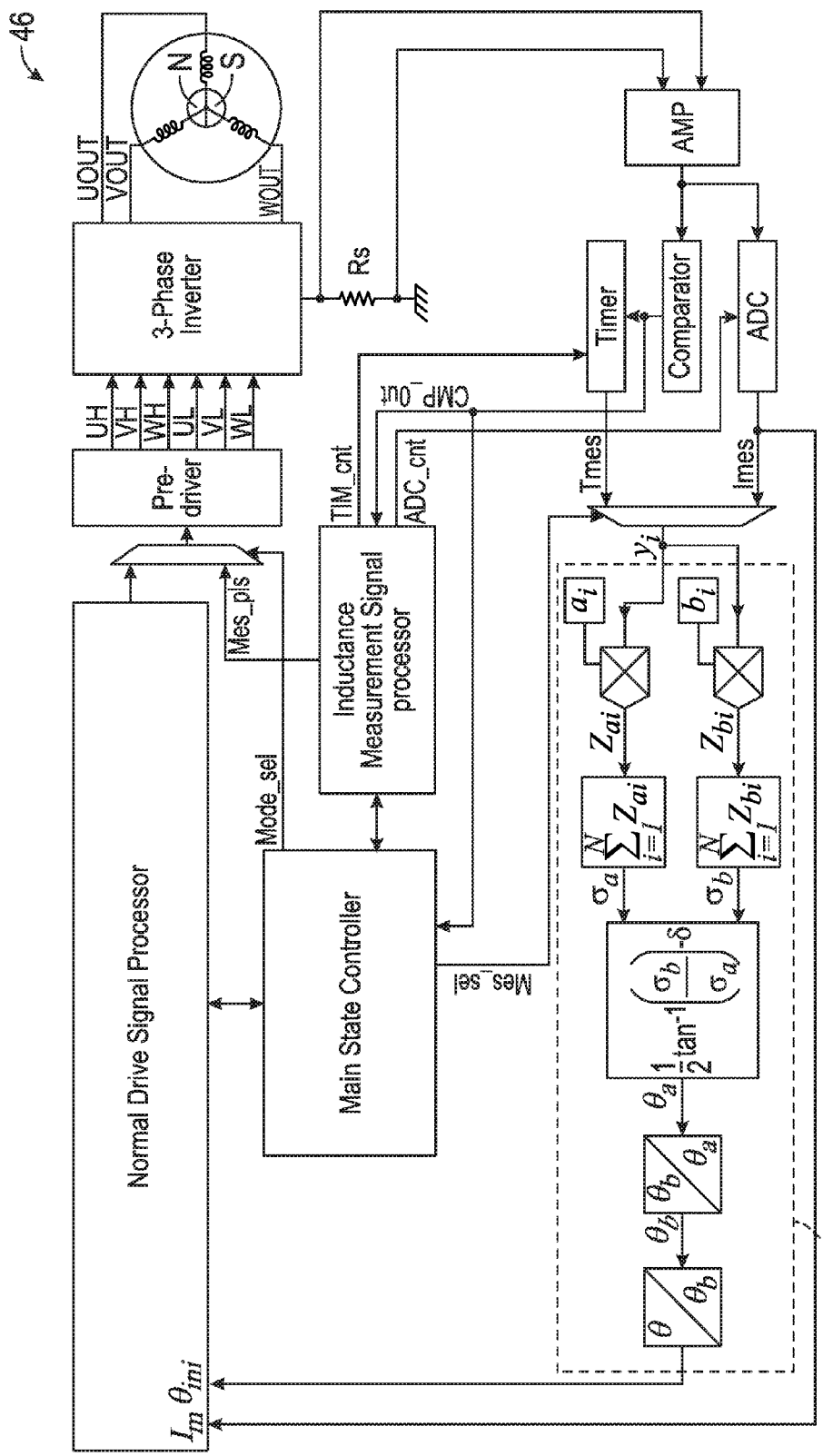
FIG. 18 is a block diagram representatively illustrating elements of another implementation of a system for sensing rotor position of a motor.

The multiplexer 34 is accordingly identical to that previously described and allows the measured values $y_1$ (whether Tmes or Imes values) to be passed through to logic elements 47 so that the position of the rotor of the PMSM may be calculated. The $a_i$ values shown in FIG. 18 are $-\cos(2\alpha_i)$ or $\cos(2\alpha_i)$ and the $b_i$ values shown in FIG. 18 are $\sin(2\alpha_i)$ or $-\sin(2\alpha_i)$ depending on which mode is being used (current or time measurement). The value of $\alpha_i$ may also be described as being equal to $\pi/6+\delta+(i-1)(\pi/3)$. The value of i is greater than or equal to 1 and less than or equal to N (as described, in some implementations i=1, 2, 3, 4, 5, 6). Summations are performed by logic elements 47 as indicated by Equation 7A/7B. The $\phi$ value is calculated using Equation 7A/7B and the $\delta$ value is subtracted therefrom to obtain the $\theta_a$ value as indicated by Equation 8. The $\theta_b$ value is then calculated from the $\theta_a$ value using Equation 9. The $\theta$ value is then calculated from the $\theta_b$ value using Equation 10. System 46, similar to system 22, is thus used with a non-vector-control PMSM.

FIG. 18 gives labels to some of the previously described signals, which also apply to FIG. 17. The Mes_sel is the mode selection signal which is communicated from the main state controller to the multiplexer 34 to determine whether to allow Tmes or Imes signals to pass through (depending on which is being measured, the time or the current). The Mode_sel signal is communicated from the main state controller to the multiplexer 36 to switch between normal operation and initial rotor sensor position sensing operation. The Mes_pls signal is a measuring pulse signal to perform the position sensing. In implementations the Mes_pls signal could itself be the voltage pulse though in other implementations it is only a signal used to effectuate the voltage pulse. TIM_cnt is a control signal from the signal processor 44 to the timer to start/stop the timer. ADC_cnt is a control signal for the ADC to communicate the Imes value to the logic elements (and the Im value to the normal drive signal processor). CMP_out is the comparator output which is communicated to signal processor 44 and to the main state controller. $\theta_{ini}$ represents the initial rotor position as calculated by the system.

Figure 19:
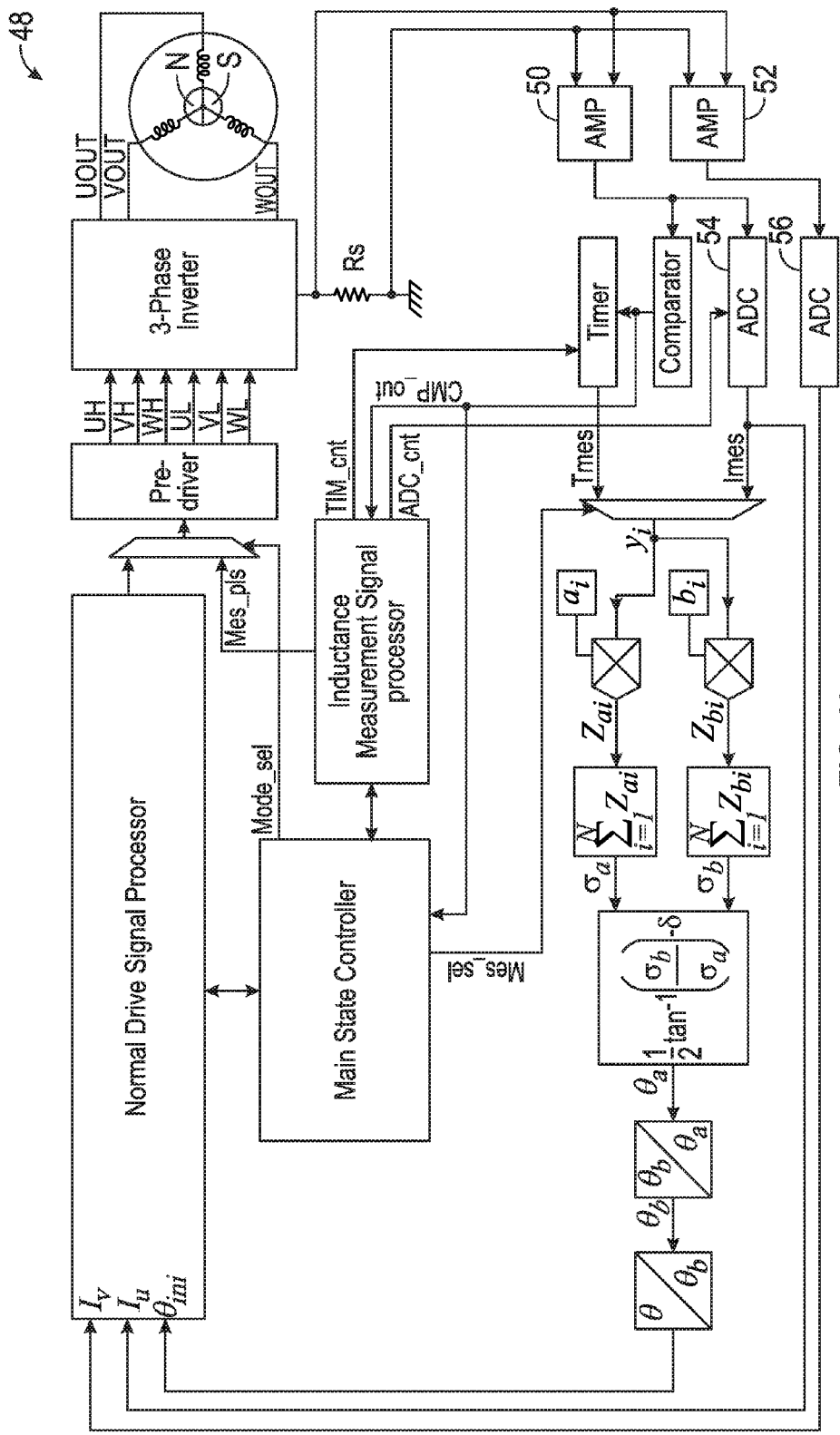
FIG. 19 is a block diagram representatively illustrating elements of another implementation of a system for sensing rotor position of a motor.

FIG. 19 shows a representative example of a system for sensing rotor position of a motor (system) 48 that is similar to system 46 except configured for vector control. An additional amplifier and ADC element are included so that two motor current signals Iv and Iu are sent to the normal drive signal processor for vector control. Thus AMP 50 and AMP 52 are both coupled with the single shunt resistor Rs. The output from AMP 50 is communicated to the comparator for Tmes measuring (for when Tmes mode is used) and the output from AMP 50 is also communicated to the ADC 54 which is converted to a digital signal and then sent to the normal drive signal processor as signal Iu for vector control. Additionally, the output from ADC 54 is communicated to multiplexer 34 but is only passed through to the logic elements 47 if the main state controller has switched the multiplexer to Imes mode. The ADC 54 output is communicated to the multiplexer 34 and to the normal drive signal processor when controlled to do so by the signal processor 44 using the ADC_cnt signal. AMP 52 communicates an analog signal to ADC 56 and ADC 56 coverts this to a digital signal and forwards it to the normal drive signal processor as signal Iv for vector control. The CMP_out signal is forwarded to both the signal processor 44 and to the main state controller. The normal drive signal processor thus uses the initial rotor position signal $\theta_{ini}$ and the vector control current signals Iv and Iu to optimally increase, maintain, or decrease the speed of the rotor of the PMSM as desired.

Figure 20:
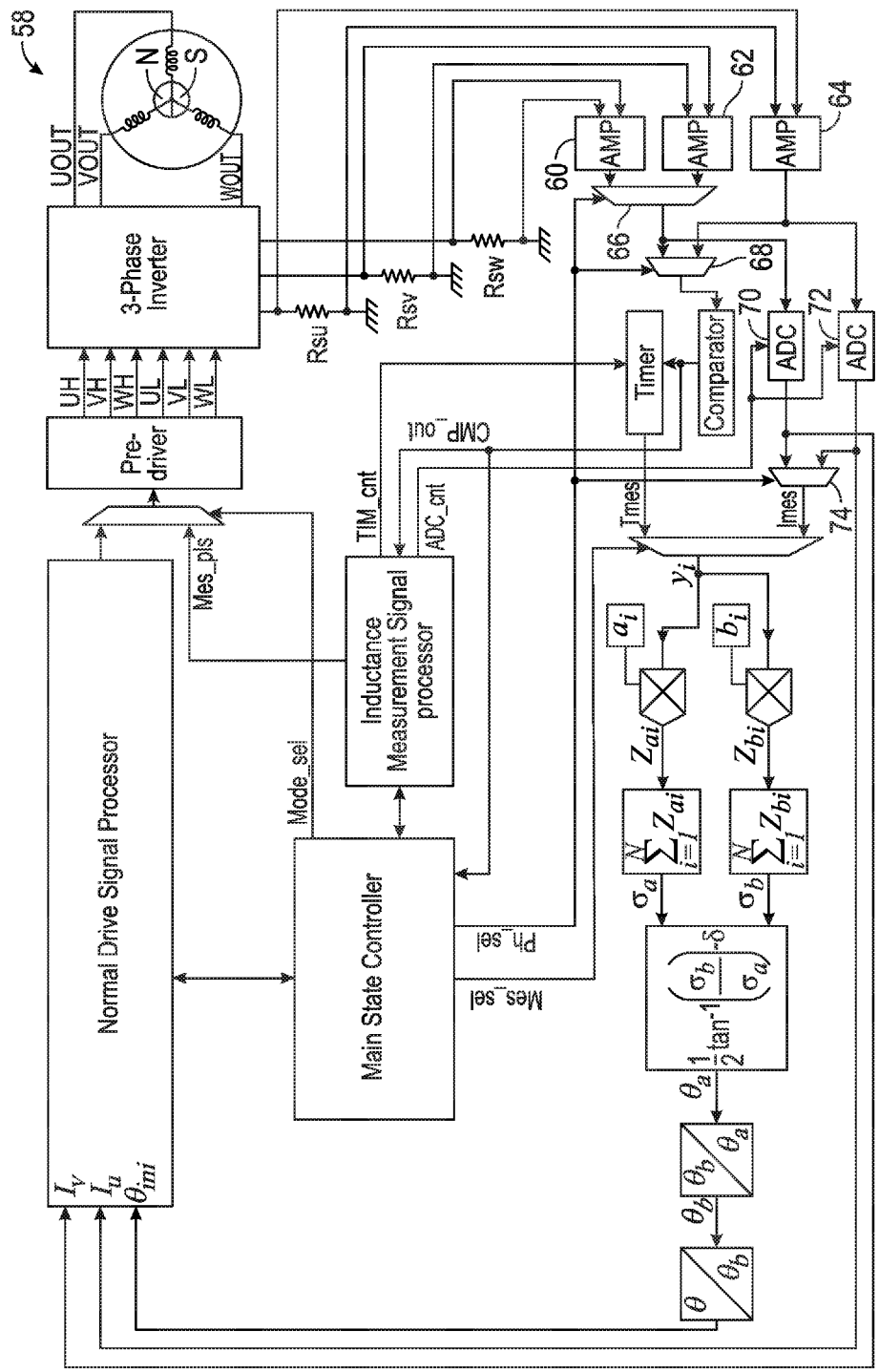
FIG. 20 is a block diagram representatively illustrating elements of another implementation of a system for sensing rotor position of a motor.
Figure 25:
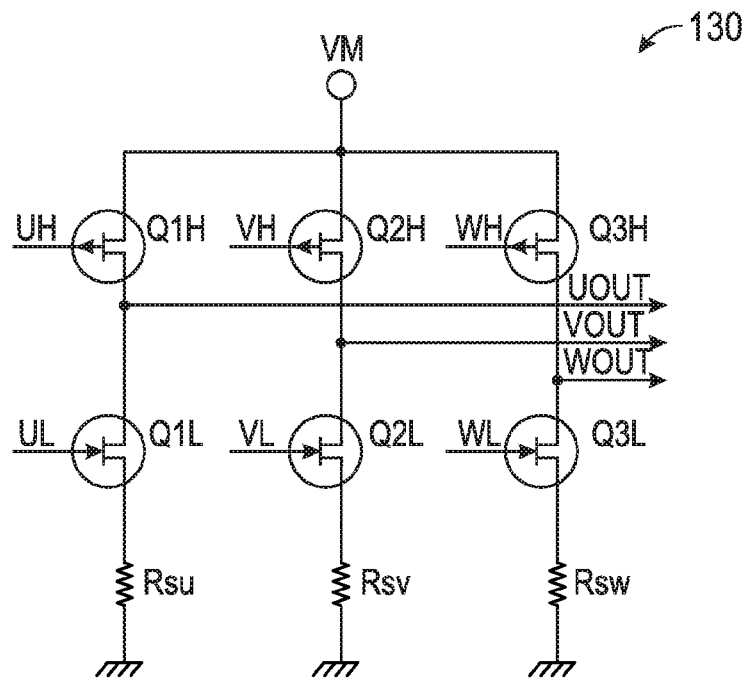
FIG. 25 is a diagram representatively illustrating elements of another implementation of a three-phase inverter and three shunt resistors coupled therewith.

FIG. 20 shows an implementation of a system for sensing rotor position of a motor (system) 58 that is in many ways similar to system 48, except that the three-phase inverter has a different configuration and three shunt resistors Rsu, Rsv, and Rsw are used for rotor position measurement. The three-phase inverter of FIG. 20 has the configuration of three-phase inverter 130 of FIG. 25. The same signals are used to control the same switches, as previously described with respect to three-phase inverter 128, but three shunt resistors are coupled therewith as seen: Rsu, Rsv, and Rsw.

Additional amplifiers and multiplexers are used, and the main state controller is used to control the additional multiplexers. AMP 60 is coupled across Rsw, AMP 62 is coupled across Rsv, and AMP 64 is coupled across Rsu. Multiplexer 66 determines whether the signal from AMP 60 or from AMP 62 is forwarded, and multiplexer 68 determines whether the signal from multiplexer 66 or from AMP 64 is forwarded. Furthermore, the output from multiplexer 66 is communicated to ADC 70, which is controlled by signal processor 44 to send the Iv signal to the normal drive signal processor and to multiplexer 74. The output from AMP 64 is communicated to ADC 72 which forwards a converted digital signal Iu to the normal drive signal processor and to multiplexer 74.

The Ph_sel signal is a shunt resistor selection signal and is used to determine which shunt resistors are used in the Tmes or Imes measurement. For example, assuming the top input of each multiplexer corresponds with a 1 position and the bottom input corresponds with a 0 position, if the Ph_sel signal is a 1 then multiplexer 66 will forward a Tmes or Imes value corresponding with Rsw to multiplexer 68 and then this value will be further forwarded to the comparator and to ADC 70, and from there to multiplexer 34 and it will also be forwarded as the Iv signal to the normal drive signal processor. Additionally, AMP 64 will forward an amplified signal corresponding with a Tmes or Imes value related to Rsu to the normal drive signal processor as an Iu signal. Thus, in this case, The Rsw and Rsu shunt resistors are used for measurement (whether it is Tmes or Imes measurement).

On the other hand, if the Ph_sel signal is a 0 then multiplexer 66 will forward a Tmes or Imes value corresponding with Rsv to multiplexer 68 but multiplexer 68 will forward the Tmes or Imes value corresponding with Rsu to the comparator. The Rsv Tmes or Imes value will be forwarded to ADC 70 and will be used to generate Iv, and the Rsu Tmes or Imes value will also be forwarded to ADC 72 and from there to multiplexer 74 and onward to multiplexer 34, and it will also be forwarded to the normal drive signal processor as signal Iu. Thus, in this case, shunt resistors Rsv and Rsu are used for measurement (whether it is Tmes or Imes measurement). In either case, the normal drive signal processor uses the received $\theta_{ini}$ value for rotor position and Iv and Iu values for vector control. The PMSM is again, as with the other examples, a PMSM having a star configuration and could be an SPMSM or an IPMSM. The CMP_out signal is forwarded to both the signal processor 44 and to the main state controller.

In other implementations other elements and configurations may be used so that, for example, any of the shunt resistors Rsu, Rsv, or Rsw may be used for the comparator and timing measurements (Tmes) and/or current measurements (Imes).

Furthermore, the main state controller may be used to control the signal processor 44 and/or the normal drive signal processor to select which switches of the three-phase inverter are on or off to accomplish the desired current vector. For example, referring to FIG. 25, if the uv current vector is needed, Q1H and Q2L are turned on, and all other switches are turned off, the current is shown as the Rsv voltage. Other configurations will result in the Rsu or Rsw voltage and in the wu, wv, uw, vw, and vu current vectors.

Figure 21:
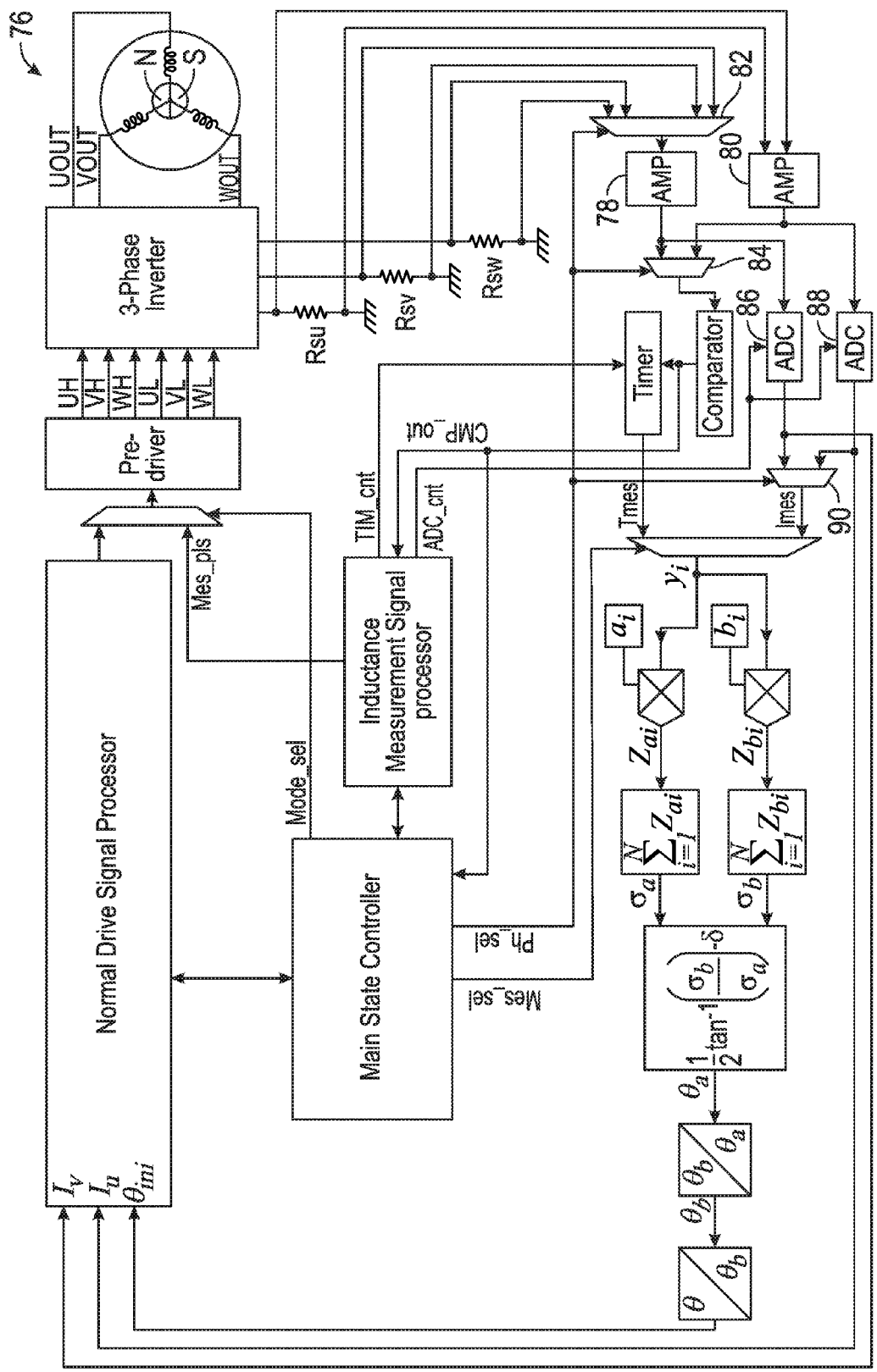
FIG. 21 is a block diagram representatively illustrating elements of another implementation of a system for sensing rotor position of a motor.

FIG. 21 shows a representative example of a system for sensing rotor position of a motor (system) 76 that is in many ways similar to system 58 except that amplifiers 60 and 62 before multiplexer 66 are replaced by a single amplifier (AMP) 78 after multiplexer 82. Thus, one less amplifier is used, but the signal selection and forwarding is as described above for system 58. Multiplexer 82 forwards either a Tmes or Imes signal corresponding with Rsw or Rsv, and this is amplified using AMP 78 on one line and on another line is forwarded to ADC 86. AMP 80 amplifies a Tmes or Imes signal corresponding with Rsu and forwards it to multiplexer 84 and ADC 88. Multiplexer 90 forwards either the input from ADC 86 or ADC 88 to multiplexer 34. Except for the placement of one amplifier after a multiplexer instead of two amplifiers after that multiplexer, the operation of the elements of system 76 is similar or identical to similarly situated elements of system 58. The CMP_out signal is forwarded to both the signal processor 44 and to the main state controller. System 76 is thus used for rotor position measurement or calculation of a vector-controlled star configuration PMSM (whether SPMSM or IPMSM).

Figure 22:
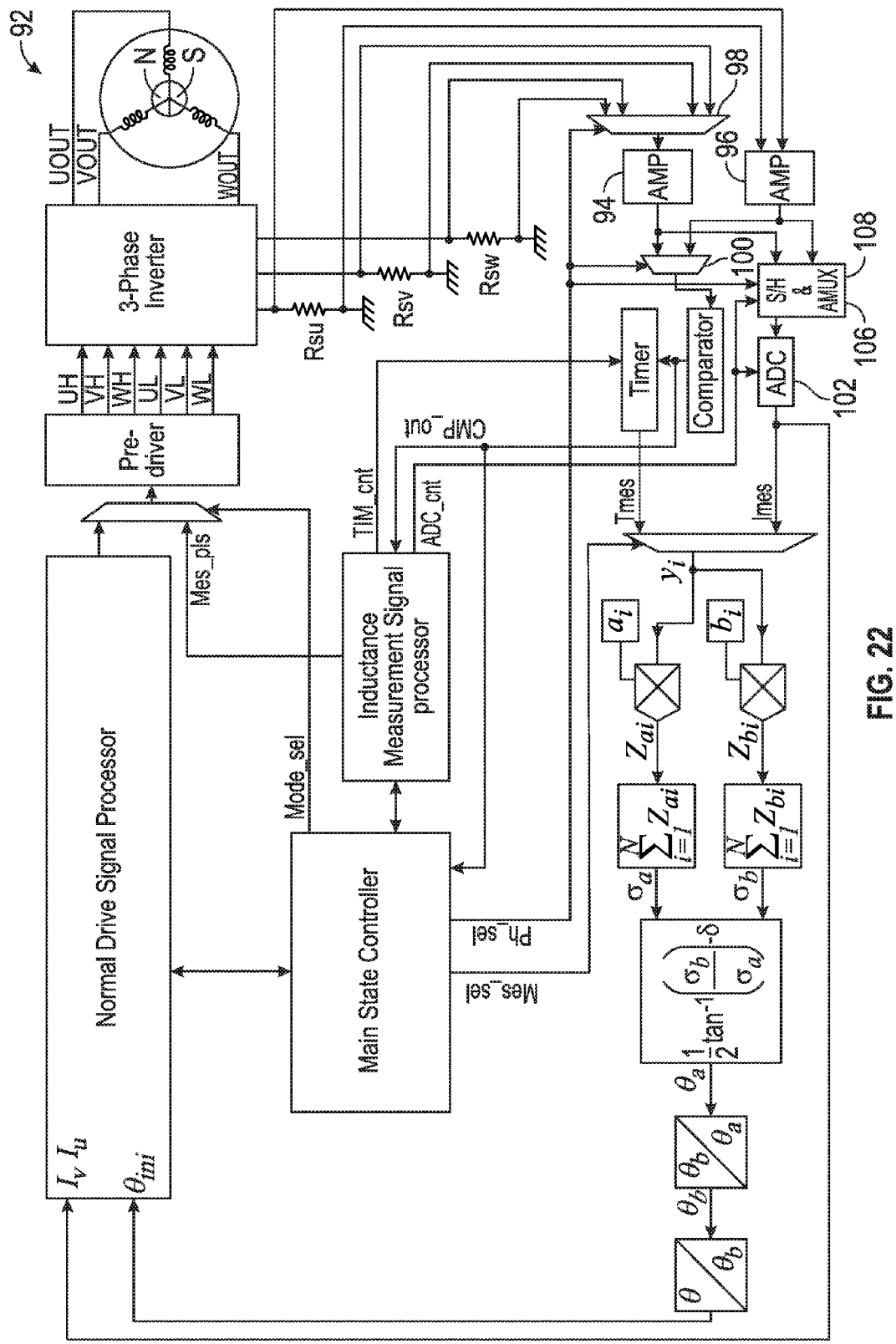
FIG. 22 is a block diagram representatively illustrating elements of another implementation of a system for sensing rotor position of a motor.

FIG. 22 shows a representative example of a system for sensing rotor position of a motor (system) 92 which is in many respects similar to system 76 except that ADC 88 and multiplexer 90 may be replaced with a single sample and hold element (S/H) 106 and analog multiplexer (AMUX) 108. The S/H and AMUX elements may be included in a single logic element or unit or may be a plurality of elements. Thus AMP 94 receives a signal from multiplexer 98 and forwards it to multiplexer 100 as well as to S/H 106/AMUX 108. AMP 96 forwards a signal to multiplexer 100 as well as to S/H 106/AMUX 108. ADC 102 forwards signals from S/H 106/AMUX 108 to multiplexer 34 and to the normal drive signal processor. The same line is thus used to communicate the signals Iu, Iv to the normal drive signal processor. Except for the replacement of one multiplexer and one ADC with the combined S/H/AMUX element and the removal of one communication line to the normal drive signal processor, the operations of the elements of system 92 are similar or identical to similarly situated elements of system 76. The CMP_out signal is forwarded to both the signal processor 44 and to the main state controller. The Ph_sel signal is used to control the S/H 106, AMUX 108, multiplexer 100 and multiplexer 98. System 92 is thus used for rotor position measurement or calculation of a vector-controlled star configuration PMSM (whether SPMSM or IPMSM).

Figure 23:
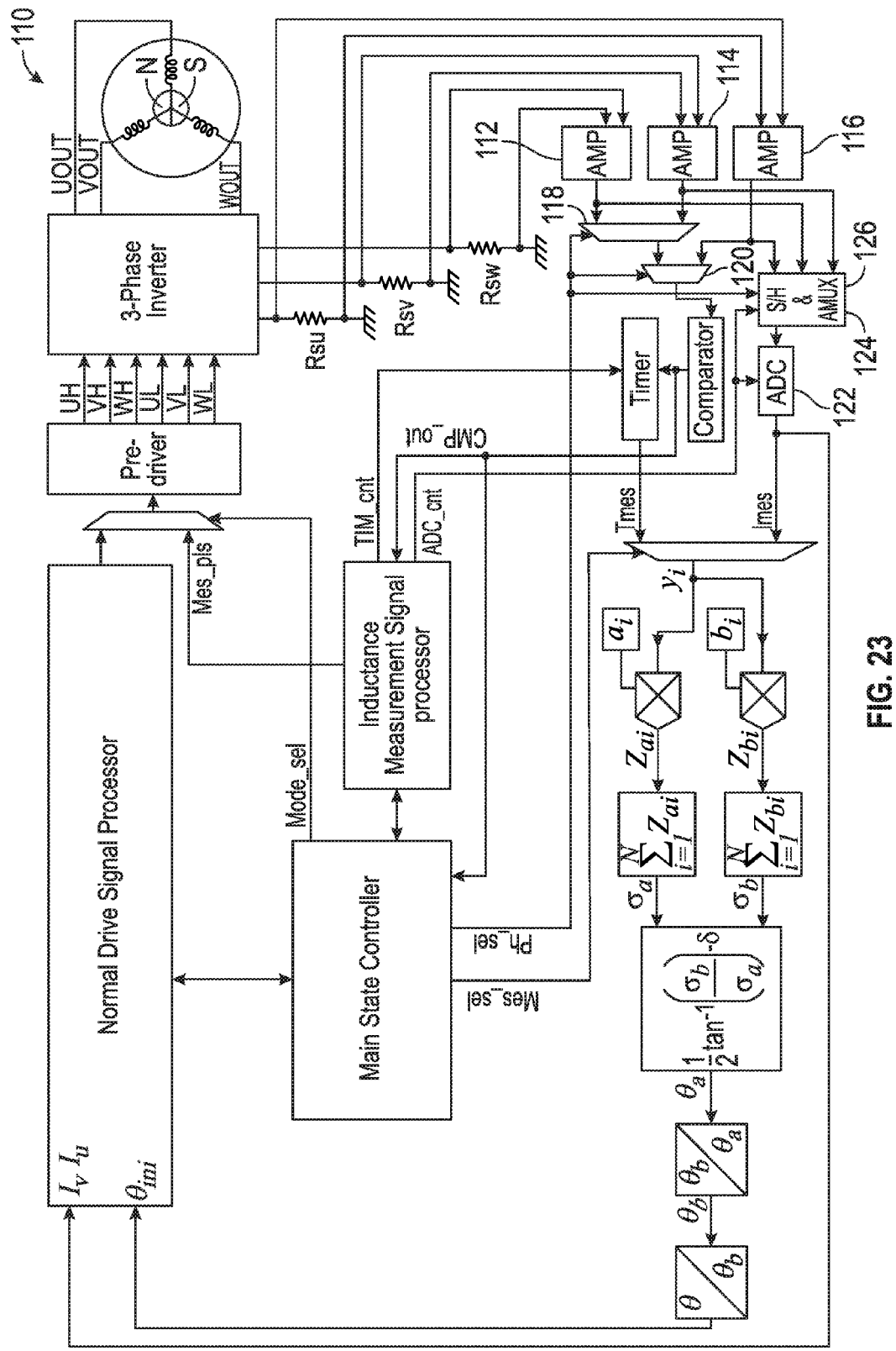
FIG. 23 is a block diagram representatively illustrating elements of another implementation of a system for sensing rotor position of a motor.

FIG. 23 shows a representative example of a system for sensing rotor position of a motor (system) 110 that is in many ways identical to system 92, except that there are again three AMPs as in previous examples instead of having one AMP after a multiplexer. Thus multiplexer 118 receives signals from AMP 112 and AMP 114 and forwards one of these to multiplexer 120, while the outputs from AMPs 112 and 114 are also both communicated to stated hold element (S/H) 124/analog multiplexer (AMUX) 126. The output from AMP 116 is communicated to multiplexer 120 and also to S/H 124/AMUX 126. The output from S/H 124/AMUX 126 is forwarded to ADC 122. Except for the addition of one AMP and the relocation of one multiplexer after two AMPS instead of before one AMP, the operations of the elements of system 110 are similar or identical to similarly situated elements of system 92. The CMP_out signal is forwarded to both the signal processor 44 and to the main state controller. The Ph_sel signal is used to control the S/H 124, AMUX 126, multiplexer 120 and multiplexer 118. System 110 is thus used for rotor position measurement or calculation of a vector-controlled star configuration PMSM (whether SPMSM or IPMSM).

FIG. 26 shows a flow chart representing a method for sensing rotor position of a motor (method) 132 which may be used to sense or calculate the rotor position of a star-configuration vector-controlled or non-vector controlled PMSM (whether an SPMSM or IPMSM). The flow chart method representatively illustrates a method which utilizes the Tmes measuring (a similar flowchart with some variations could be shown for Imes measuring). A comparator threshold value is set (to determine when the Ic value is reached for Tmes measuring or to determine when Imes peaks for Imes measuring) and the first $y_1$ measurement $y_1$ is done to measure Tmes corresponding with the wu current vector. This measurement corresponds with i=1. A second $y_i$ measurement $y_2$ is done to measure Tmes corresponding with the wv current vector, which measurement corresponds with i=2. A third measurement $y_3$ is done to measure Tmes corresponding with the uv current vector, which measurement corresponds with i=3. A fourth measurement $y_4$ is done to measure Tmes corresponding with the uw current vector, which measurement corresponds with i=4. A fifth measurement $y_5$ is done to measure Tmes corresponding with the vw current vector, which measurement corresponds with i=5. A sixth measurement $y_6$ is done to measure Tmes corresponding with the vu current vector, which measurement corresponds with i=6. In an Imes example the Imes values corresponding with each current vector could instead be measured.

Position is then done using Equation 7A or Equation 7B (depending on whether Tmes or Imes was measured—in this case Tmes was measured) and then Equations 8-10 are used to calculate the rotor position as has been described previously.

FIG. 27 representatively illustrates a method for measuring time values (method) 134 that is a portion of each $y_1$ measuring step of FIG. 26. The timer is cleared and then the three-phase inverter output is switched to correspond with the Ph_sel signal to select either the wu, wv, uv, uw, vw, or vu current vector. The timer is then started. A wait time occurs until the comparator outputs a signal indicative that a current level Ic has been reached, at which point the timer is stopped. The three-phase inverter output is turned off (i.e., the end of the voltage pulse) and the measured Tmes value is the measured value $y_i$. A wait period then occurs to ensure full decay of the stator coil energy, after which the process may be started again. Although the current vectors are measured in this representative example in a specific order, in other implementations they could be measured in other orders.

A method similar to method 134, but for measuring Imes, could include utilizing the comparator to determine when to control one or more ADCs to forward an Imes signal to the multiplexer 34 for processing. For example, the comparator may determine when a current peaks and, at that time, may signal the signal processor 44 to control the ADC to forward a signal to multiplexer 34. This may be done for each current vector wu, wv, uv, uw, vw, and vu as described above for Tmes measuring.

In implementations of systems for sensing rotor position of a motor the timer and/or comparator may also be used, such as in conjunction with signal processor 44 and/or one or more ADCs, to provide the voltage pulses. In implementations the shunt voltages, or in other words the voltages across shunt resistors, are measured voltages or are reference voltages used in determining the position of a rotor. In implementations the rotor position is sensed or calculated without directly sensing the speed or position of the rotor (as with all examples described herein).

Systems described herein for sensing rotor position of a motor do not need to apply high frequency voltages for sensing rotor position (for example a frequency lower than the actual operation frequency of the motor may be used) and may have little random noise. Because systems described herein are capable of being used both with vector control and non-vector control motors, they may be applied to legacy motor systems. When applied to non-vector control motors there may not need to be any coordinate transformation function(s) performed by the system. The systems may sense rotor position with very few calculations, as has been shown herein.

Systems described herein may be able to detect accuracy within less than a 30-degree electric angle, and sample and hold (S/H) elements, as shown, may or may not be used depending on the configuration used. Measuring currents do not need to be large, and no waveform data needs to be stored in memory in advance. Back electromotive force (BEMF) is not needed to be used by the systems described herein to determine the position of the rotor. Systems described herein may be used for reliable and silent startup of a motor, as a sinusoidal drive will have proper vector currents applied right from the startup phase. Systems described herein may allow sensor-less rotor drivers to be used with electric fans and similar elements because rotor shaking at startup may be eliminated. Systems described herein may increase product reliability by making motor startup more robust.

Figure 28:
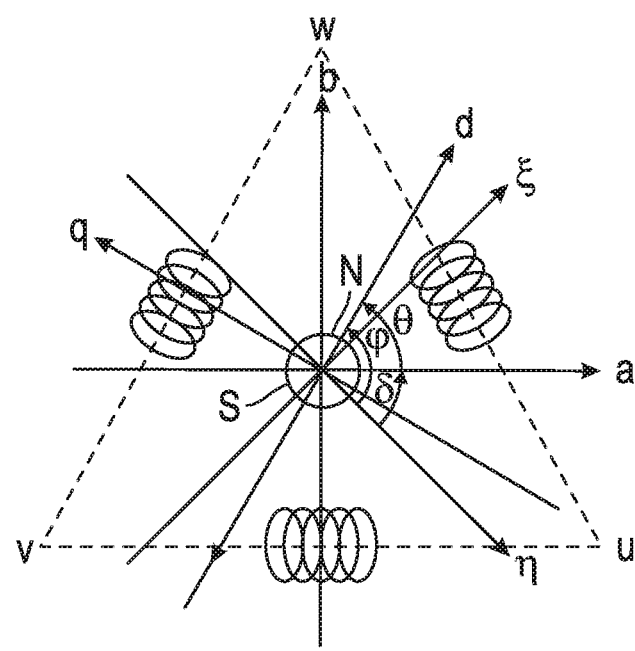
FIG. 28 is a diagram representatively illustrating elements and axes of an implementation of a PMSM having a delta configuration.

Descriptions and math related specifically to PMSMs with a delta configuration will now be given. Referring now to FIG. 28, various axes may be defined. The vu-axis, vw-axis, and wu-axis are stationary axes having axes aligned with corresponding stator cores. The a-axis is a stationary axis parallel to the vu-axis and the b-axis is the quadrature of the a-axis (in other words 90 degrees offset from the a-axis). The η-axis is a stationary axis having a phase difference of δ from the a-axis, and the ξ-axis is the quadrature of the η-axis. The d-axis is on an axis of the rotor magnetic flux and the q-axis is the quadrature of the d-axis (these are rotating axes). The θ angle is the phase difference between the a-axis and the d-axis. The rotor position in this representative example is defined as 0 degrees when the vu-axis is parallel with the d-axis. The φ angle is θ+δ. The north and south poles (N/S) of the permanent magnet of the PMSM rotor may be seen at the center of the figure.

The descriptions above with respect to the d-axis and q-axis inductance of IPMSMs and SPMSMs apply, namely, that d-axis inductance is smaller than q-axis inductance. FIGS. 29A-29B show rotor magnetic flux distribution and rotor position of an IPMSM which applies to an IPMSM having a delta configuration, and the distribution shows an approximate sinusoidal waveform completing one cycle with one electric angle rotation of the rotor. FIGS. 30A-30B show rotor permeability and rotor position of an IPMSM having a delta configuration, and the distribution shows an approximately sinusoidal waveform completing two cycles with one electric angle rotation of the rotor. Although flux distribution and rotor position of an SPMSM having a delta configuration are not shown, the reader may envision how these would differ from those of an IPMSM based on differences between the SPMSM and IPMSM graphs of previous figures related to motors having star configurations.

As described previously, vu means the current vector phase in which the energization is performed with direction from the v-terminal to the u-terminal, uv means energization is performed with direction from the u-terminal to the v-terminal, and vw, wv, wu, and uw are similarly defined.

Figure 31:
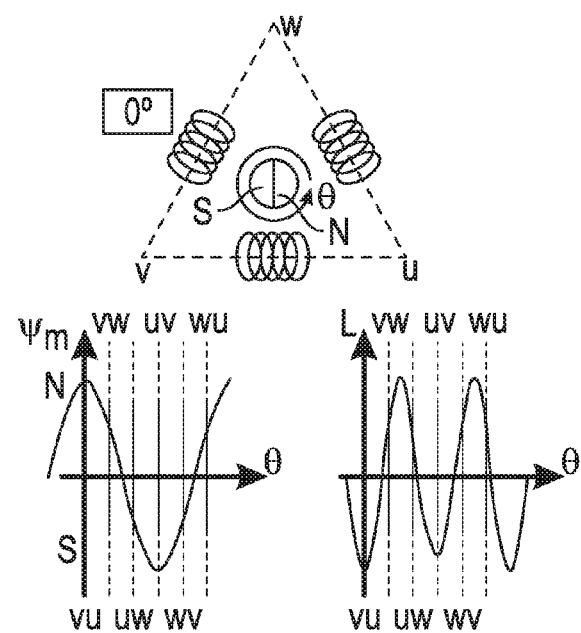
FIG. 31 representatively illustrates magnetic flux distribution and expected stator inductance distribution in an SPMSM having a delta configuration.
Figure 32:
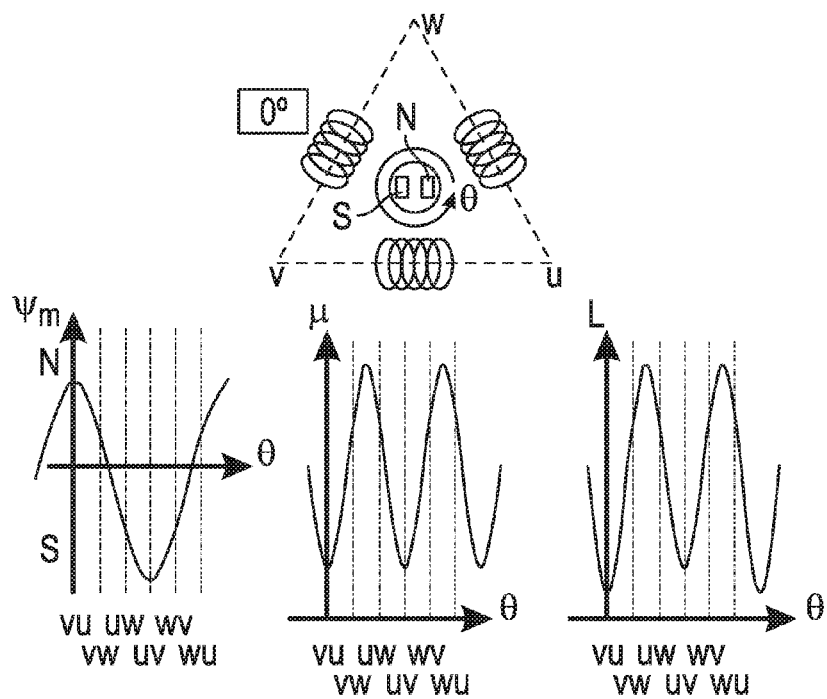
FIG. 32 representatively illustrates magnetic flux distribution, permeability distribution, and expected stator inductance distribution in an IPMSM having a delta configuration.

FIG. 31 shows an example of an SPMSM where the rotor position is at 0 degrees. In this position, when the vu-current vector is input, the stator inductance is expected to be smallest due to the magnetic saturation characteristics, and when the uv-current vector is input the inductance is expected to be second smallest. FIG. 32 shows an example of an IPMSM where the rotor position is at 0 degrees. When the vu-current vector is input the inductance is expected to be smallest due to the μ distribution and the magnetic saturation characteristics. When the uv-current vector is input the inductance is expected to be second smallest. The inductance distribution may be represented as a superimposed distribution of and the magnetic saturation characteristics, and the inductance distribution is seen to have a double frequency of the flux distribution.

Rotor position estimation specifically for a PMSM having a delta configuration is done using the following assumptions: rotor magnetic flux has a sinusoidal waveform even if there is some distortion; inductance distribution has double the frequency of the flux distribution; the phase of the sinusoidal waveform will indicate rotor position, and; although the inductance distribution shows double frequency of the magnetic flux distribution, magnetic saturation characteristics solve double function issues. The sinusoidal waveform is estimated by curve fitting.

For the delta configuration the relation between the energization patterns vu, vw, uw, uv, wv, and wu are defined as: $\alpha_1=vu$, $\alpha_2=vw$, $\alpha_3=uw$, $\alpha_4=uv$, $\alpha_5$ wv, $\alpha_6=wu$. Accordingly, $\alpha_i$ is the energization current vector phase and has intervals of π/3. As shown in FIG. 28 and FIGS. 29A-30B, when $\alpha_i$ is defined on the ab-axis the $\alpha_i$ values are as follows: $\alpha_1=0$, $\alpha_2=\pi/3$, $\alpha_3=2\pi/3$, $\alpha_4=\pi$, $\alpha_5=4\pi/3$, $\alpha_6=5\pi/3$. They therefore range between 0-2π (or 0-5π/3).

When $2\alpha_i$ is zero or an integral multiple of π/2, the value of the sine or cosine function becomes zero. To avoid this, the ηξ-coordinate system and φ are introduced. As described above:

$$\phi=\theta+\delta \quad \text{(Eq. 1D)}$$

Figure 33:
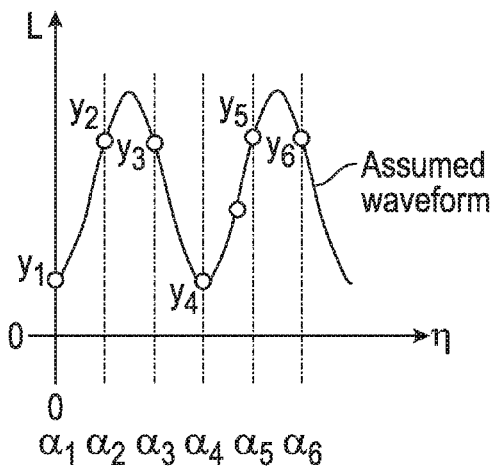
FIG. 33 representatively illustrates and assumed inductance (L) waveform of a delta configuration PMSM generated using measured values $y_1$ through $y_6$.
Figure 34:
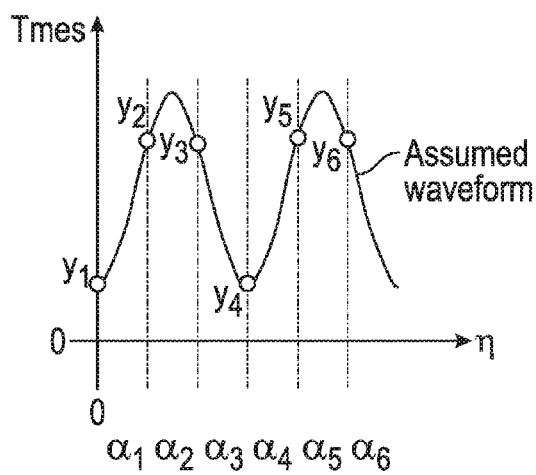
FIG. 34 representatively illustrates an assumed time value (Tmes) waveform of a delta configuration PMSM generated using measured values $y_1$ through $y_6$.
Figure 35:
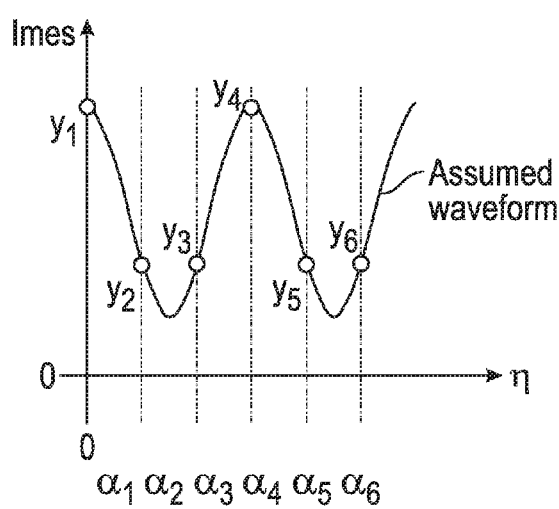
FIG. 35 representatively illustrates an assumed current value (Imes) waveform of a delta configuration PMSM generated using measured values $y_1$ through $y_6$.

Accordingly, estimating operations are initially performed on the ηξ-coordinate system and afterwards θ is calculated using φ and δ. Therefore, $\alpha_i$ is biased with δ and is defined as follows:

$$\alpha_i = \delta + \frac{\pi}{3}(i-1) \quad \text{(Eq. 2D)}$$

Where i=1, 2, 3, 4, 5, or 6 (though in other implementations more than six values could be used). The term δ is set to avoid the condition where $2\alpha_i$ becomes an integral multiple of π/2 or zero (for example setting δ equal to π/24 works). FIGS. 33-35 show the relationship between inductance (L), Tmes, Imes, and the measuring data (or measured values) $y_i$. FIG. 33 representatively illustrates an assumed inductance (L) waveform of a delta-configuration PMSM generated using measured values $y_1$ through $y_6$. FIG. 34 representatively illustrates an assumed time value (Tmes) waveform of a delta-configuration PMSM generated using measured values $y_1$ through $y_6$. FIG. 35 representatively illustrates an assumed current value (Imes) waveform of a delta-configuration PMSM generated using measured values $y_1$ through $y_6$.

The below math is based on a least squares method. When the measuring is performed using Tmes based on FIGS. 29A-30B, the model equation is given as $y=-A\cos(2\alpha-2\phi)$ where A is amplitude, y is measured data or a measured value, $\alpha$ is measuring current vector phase on the $\eta\xi$-coordinate system, and $\phi$ is the phase, which indicates the rotor position on the $\eta\xi$-coordinate system. If $\alpha$ and y are known, then the equation is solved by finding the solution to A and $\phi$. On the other hand, if measuring is performed with Imes, the model equation is given as $y=A\cos(2\alpha-2\phi)$. The DC bias of y may be ignored because the curve fitting algorithm uses a least squares method.

When the curve fitting algorithm is $y=-A\cos(2\alpha-2\phi)$, and each measuring current phase is defined as ($a_1, a_2, a_3, \ldots a_N$), the model equation is shown as follows:

$$\begin{bmatrix} y_1 \\ y_2 \\ \vdots \\ y_N \end{bmatrix} = -\begin{bmatrix} A\cos(2\alpha_1 - 2\varphi) \\ A\cos(2\alpha_2 - 2\varphi) \\ \vdots \\ A\cos(2\alpha_N - 2\varphi) \end{bmatrix} =$$

$$-\begin{bmatrix} A\cos(2\alpha_1)\cos(2\varphi) + A\sin(2\alpha_1)\sin(2\varphi) \\ A\cos(2\alpha_2)\cos(2\varphi) + A\sin(2\alpha_2)\sin(2\varphi) \\ \vdots \\ A\cos(2\alpha_N)\cos(2\varphi) + A\sin(2\alpha_N)\sin(2\varphi) \end{bmatrix} =$$

$$\begin{bmatrix} -\cos(2\alpha_1) & -\sin(2\alpha_1) \\ -\cos(2\alpha_2) & -\sin(2\alpha_2) \\ \vdots & \vdots \\ -\cos(2\alpha_N) & -\sin(2\alpha_N) \end{bmatrix} \begin{bmatrix} A\cos(2\varphi) \\ A\sin(2\varphi) \end{bmatrix}$$

The above equation may be written as Y=GP, where:

$$Y = \begin{bmatrix} y_1 \\ y_2 \\ \vdots \\ y_N \end{bmatrix} \quad G = \begin{bmatrix} -\cos(2\alpha_1) & -\sin(2\alpha_1) \\ -\cos(2\alpha_2) & -\sin(2\alpha_2) \\ \vdots & \vdots \\ -\cos(2\alpha_N) & -\sin(2\alpha_N) \end{bmatrix} \quad \text{(Eq. 3D)}$$

$$P = \begin{bmatrix} A\cos(2\varphi) \\ A\sin(2\varphi) \end{bmatrix}$$

If measurement error E is added, the equation may be written as Y=GP+E or E=Y−GP. The least squares method finds the solution to P which gives the extremum of square norm of E, as follows:

$$\|E\| = E^* \cdot E$$

$$= (Y^* - P^*G^*) \cdot (Y - GP)$$

$$= Y^*Y - Y^*GP - P^*G^*Y + P^*G^*GP$$

$$= Y^*Y - 2Y^*GP + P^*G^*GP$$

$$\frac{\partial}{\partial P}\|E\|^2 = -2Y^*G + 2P^*G^*G = 0$$

$$Y^*G = P^*G^*G$$

$$P^* = Y^*G(G^*G)^{-1}$$

$$P = (G^*G)^{-1}G^*Y$$

$$P = G^+Y \quad \text{(Eq. 4D)}$$

Where:

$Y^*, P^*, G^*$; adjoint matrix $=(G^*G)^{-1}G^*$; pseudo-inverse matrix

If $G^+$ is found by what Eq. 3D is assigned to Eq. 4D, then P may be found.

$$P = G^+Y$$

$$P = (G^TG)^{-1}G^TY; G^T=G^* \text{ since } G \text{ is a real number}$$

$$= \left(\begin{bmatrix} -\cos(2\alpha_1) & -\cos(2\alpha_2) & \ldots & -\cos(2\alpha_N) \\ -\sin(2\alpha_1) & -\sin(2\alpha_2) & \ldots & -\sin(2\alpha_N) \end{bmatrix} \begin{bmatrix} -\cos(2\alpha_1) & -\sin(2\alpha_1) \\ -\cos(2\alpha_2) & -\sin(2\alpha_2) \\ \vdots & \vdots \\ -\cos(2\alpha_N) & -\sin(2\alpha_N) \end{bmatrix}\right)^{-1}$$

$$\begin{bmatrix} -\cos(2\alpha_1) & -\cos(2\alpha_2) & \ldots & -\cos(2\alpha_N) \\ -\sin(2\alpha_1) & -\sin(2\alpha_2) & \ldots & -\sin(2\alpha_N) \end{bmatrix} \begin{bmatrix} y_1 \\ y_2 \\ \vdots \\ y_N \end{bmatrix} =$$

$$\begin{bmatrix} \sum_{i=1}^{N}(-\cos(2\alpha_i))^2 & \sum_{i=1}^{N}\sin(2\alpha_i)\cos(2\alpha_i) \\ \sum_{i=1}^{N}\sin(2\alpha_i)\cos(2\alpha_i) & \sum_{i=1}^{N}(-\sin(2\alpha_i))^2 \end{bmatrix}^{-1} \begin{bmatrix} \sum_{i=1}^{N}-\cos(2\alpha_i)y_i \\ \sum_{i=1}^{N}-\sin(2\alpha_i)y_i \end{bmatrix}$$

The term of $\sum_{i=1}^{N}\sin(2\alpha_i)\cos(2\alpha_i)$ must be zero because $\alpha_i$ is the same interval and is within just one period of the model equation, so the equation becomes:

$$= \begin{bmatrix} \sum_{i=1}^{N}(-\cos(2\alpha_i))^2 & 0 \\ 0 & \sum_{i=1}^{N}(-\sin(2\alpha_i))^2 \end{bmatrix}^{-1} \begin{bmatrix} \sum_{i=1}^{N}-\cos(2\alpha_i)y_i \\ \sum_{i=1}^{N}-\sin(2\alpha_i)y_i \end{bmatrix} = \quad \text{(Eq. 5D)}$$

$$\frac{1}{\sum_{i=1}^{N}(-\sin(2\alpha_i))^2 \times \sum_{i=1}^{N}(-\cos(2\alpha_i))^2}$$

$$\begin{bmatrix} \sum_{i=1}^{N}(-\cos(2\alpha_i))^2 & 0 \\ 0 & \sum_{i=1}^{N}(-\sin(2\alpha_i))^2 \end{bmatrix} \begin{bmatrix} \sum_{i=1}^{N}-\cos(2\alpha_i)y_i \\ \sum_{i=1}^{N}-\sin(2\alpha_i)y_i \end{bmatrix} =$$

-continued $$\frac{1}{\sum_{i=1}^{N}(-\sin(2\alpha_i))^2 \times \sum_{i=1}^{N}(-\cos(2\alpha_i))^2}$$

$$\begin{bmatrix} \sum_{i=1}^{N}(-\sin(2\alpha_i))^2 \times \sum_{i=1}^{N}-\cos(2\alpha_i)y_i \\ \sum_{i=1}^{N}(-\cos(2\alpha_i))^2 \times \sum_{i=1}^{N}-\sin(2\alpha_i)y_i \end{bmatrix} =$$

$$\begin{bmatrix} \dfrac{\sum_{i=1}^{N}-\cos(2\alpha_i)y_i}{\sum_{i=1}^{N}(-\cos(2\alpha_i))^2} \\ \dfrac{\sum_{i=1}^{N}-\sin(2\alpha_i)y_i}{\sum_{i=1}^{N}(-\sin(2\alpha_i))^2} \end{bmatrix} = \begin{bmatrix} A\cos(2\varphi) \\ A\sin(2\varphi) \end{bmatrix}$$

Therefore, φ is given as follows:

$$2\varphi = \tan^{-1}\frac{A\sin(2\varphi)}{A\cos(2\varphi)} \qquad \text{(Eq. 6D)}$$

And:

$$A=\sqrt{(A\cos(\phi))^2+(A\sin(\phi))^2}$$

When the model equation is y=A cos(2α−2φ) each measuring current phase is defined as ($\alpha_1, \alpha_2, \alpha_3, \ldots \alpha_N$), and the model equation is shown as follows:

$$\begin{bmatrix} y_1 \\ y_2 \\ \vdots \\ y_N \end{bmatrix} = \begin{bmatrix} A\cos(2\alpha_1 - 2\varphi) \\ A\cos(2\alpha_2 - 2\varphi) \\ \vdots \\ A\cos(2\alpha_N - 2\varphi) \end{bmatrix} = \begin{bmatrix} A\cos(2\alpha_1)\cos(2\varphi) + A\sin(2\alpha_1)\sin(2\varphi) \\ A\cos(2\alpha_2)\cos(2\varphi) + A\sin(2\alpha_2)\sin(2\varphi) \\ \vdots \\ A\cos(2\alpha_N)\cos(2\varphi) + A\sin(2\alpha_N)\sin(2\varphi) \end{bmatrix} =$$

$$\begin{bmatrix} \cos(2\alpha_1) & \sin(2\alpha_1) \\ \cos(2\alpha_2) & \sin(2\alpha_2) \\ \vdots & \vdots \\ \cos(2\alpha_N) & \sin(2\alpha_N) \end{bmatrix} \begin{bmatrix} A\cos(2\varphi) \\ A\sin(2\varphi) \end{bmatrix}$$

The above equation may be written as Y=GP, where:

$$Y = \begin{bmatrix} y_1 \\ y_2 \\ \vdots \\ y_N \end{bmatrix} \quad G = \begin{bmatrix} \cos(2\alpha_1) & \sin(2\alpha_1) \\ \cos(2\alpha_2) & \sin(2\alpha_2) \\ \vdots & \vdots \\ \cos(2\alpha_N) & \sin(2\alpha_N) \end{bmatrix} \qquad \text{(Eq. 3E)}$$

$$P = \begin{bmatrix} A\cos(2\varphi) \\ A\sin(2\varphi) \end{bmatrix}$$

If measurement error E is added, the equation may be written as Y=GP+E or E=Y−GP. The least squares method finds the solution to P which gives the extremum of square norm of E, as follows:

$$\|E\|=E^*\cdot E$$

$$=(Y^*-P^*G^*)\cdot(Y-GP)$$

$$=Y^*Y-Y^*GP-P^*G^*Y+P^*G^*GP$$

$$=Y^*Y-2Y^*GP+P^*G^*GP$$

$$\frac{\partial}{\partial P}\|E\|^2 = -2Y^*G + 2P^*G^*G = 0$$

$$Y^*G=P^*G^*G$$

$$P^*=Y^*G(G^*G)^{-1}$$

$$P=(G^*G)^{-1}G^*Y$$

$$=G^+Y \qquad \text{(Eq. 4E)}$$

Where:

$Y^*,P^*,G^*$; adjoint matrix $=(G^*G)^{-1}G^*$; pseudo−inverse matrix

If $G^+$ is found by what Eq. 3E is assigned to Eq. 4E, then P may be found.

$$P=G^+Y$$

$P=(G^TG)^{-1}G^TY$; $G^T=G^*$ since G is a real number $$= \left( \begin{bmatrix} \cos(2\alpha_1) & \cos(2\alpha_2) & \ldots & \cos(2\alpha_N) \\ \sin(2\alpha_1) & \sin(2\alpha_2) & \ldots & \sin(2\alpha_N) \end{bmatrix} \begin{bmatrix} \cos(2\alpha_1) & \sin(2\alpha_1) \\ \cos(2\alpha_2) & \sin(2\alpha_2) \\ \vdots & \vdots \\ \cos(2\alpha_N) & \sin(2\alpha_N) \end{bmatrix} \right)^{-1}$$

$$\begin{bmatrix} \cos(2\alpha_1) & \cos(2\alpha_2) & \ldots & \cos(2\alpha_N) \\ \sin(2\alpha_1) & \sin(2\alpha_2) & \ldots & \sin(2\alpha_N) \end{bmatrix} \begin{bmatrix} y_1 \\ y_2 \\ \vdots \\ y_N \end{bmatrix} =$$

$$\begin{bmatrix} \sum_{i=1}^{N}(\cos(2\alpha_i))^2 & \sum_{i=1}^{N}\cos(2\alpha_i)\sin(2\alpha_i) \\ \sum_{i=1}^{N}\sin(2\alpha_i)\cos(2\alpha_i) & \sum_{i=1}^{N}(\sin(2\alpha_i))^2 \end{bmatrix}^{-1} \begin{bmatrix} \sum_{i=1}^{N}\cos(2\alpha_i)y_i \\ \sum_{i=1}^{N}\sin(2\alpha_i)y_i \end{bmatrix}$$

The term of $\Sigma_{i=1}^{N}\sin(2\alpha_i)\cos(2\alpha_i)$ must be zero because $\alpha_i$ is the same interval and is within just one period of the model function, so the equation becomes:

$$= \begin{bmatrix} \sum_{i=1}^{N}(\cos(2\alpha_i))^2 & 0 \\ 0 & \sum_{i=1}^{N}(\sin(2\alpha_i))^2 \end{bmatrix}^{-1} \begin{bmatrix} \sum_{i=1}^{N}\cos(2\alpha_i)y_i \\ \sum_{i=1}^{N}\sin(2\alpha_i)y_i \end{bmatrix} = \qquad \text{(Eq. 5E)}$$

-continued $$\frac{1}{\sum_{i=1}^{N}(\sin(2\alpha_i))^2 \times \sum_{i=1}^{N}(\cos(2\alpha_i))^2} \begin{bmatrix} \sum_{i=1}^{N}(\cos(2\alpha_i))^2 & 0 \\ 0 & \sum_{i=1}^{N}(\sin(2\alpha_i))^2 \end{bmatrix}$$

$$\begin{bmatrix} \sum_{i=1}^{N}\cos(2\alpha_i)y_i \\ \sum_{i=1}^{N}\sin(2\alpha_i)y_i \end{bmatrix} =$$

$$\frac{1}{\sum_{i=1}^{N}(\sin(2\alpha_i))^2 \times \sum_{i=1}^{N}(\cos(2\alpha_i))^2}$$

$$\begin{bmatrix} \sum_{i=1}^{N}(\sin(2\alpha_i))^2 \times \sum_{i=1}^{N}\cos(2\alpha_i)y_i \\ \sum_{i=1}^{N}(\cos(2\alpha_i))^2 \times \sum_{i=1}^{N}\sin(2\alpha_i)y_i \end{bmatrix} = \begin{bmatrix} \frac{\sum_{i=1}^{N}\cos(2\alpha_i)y_i}{\sum_{i=1}^{N}(\cos(2\alpha_i))^2} \\ \frac{\sum_{i=1}^{N}\sin(2\alpha_i)y_i}{\sum_{i=1}^{N}(\sin(2\alpha_i))^2} \end{bmatrix} = \begin{bmatrix} A\cos(2\varphi) \\ A\sin(2\varphi) \end{bmatrix}$$

Therefore, $\phi$ is given as follows:

$$2\varphi = \tan^{-1}\frac{A\sin(2\varphi)}{A\cos(2\varphi)}$$

Therefore, when the model equation is $y=-A\cos(2\alpha-2\phi)$ the following algorithms may be used:

$$A\cos(2\varphi) = \frac{\sum_{i=1}^{N}-\cos(2\alpha_i)y_i}{3} \quad \text{(Eq. 7A)}$$

$$A\sin(2\varphi) = \frac{\sum_{i=1}^{N}-\sin(2\alpha_i)y_i}{3}$$

$$2\varphi = \tan^{-1}\left(\frac{A\sin(2\varphi)}{A\cos(2\varphi)}\right) = \tan^{-1}\left(\frac{\sum_{i=1}^{N}-\sin(2\alpha_i)y_i}{\sum_{i=1}^{N}-\cos(2\alpha_i)y_i}\right)$$

And when the model equation is $y=A\cos(2\alpha-2\phi)$ the following algorithms may be used:

$$A\cos(2\varphi) = \frac{\sum_{i=1}^{N}\cos(2\alpha_i)y_i}{3} \quad A\sin(2\varphi) = \frac{\sum_{i=1}^{N}\sin(2\alpha_i)y_i}{3} \quad \text{(Eq. 7B)}$$

$$2\varphi = \tan^{-1}\left(\frac{A\sin(2\varphi)}{A\cos(2\varphi)}\right) = \tan^{-1}\left(\frac{\sum_{i=1}^{N}\sin(2\alpha_i)y_i}{\sum_{i=1}^{N}\cos(2\alpha_i)y_i}\right)$$

The following procedure is then used to determine θ since the model equation is a trigonometric function with double angle variable.

$$\theta_a = \phi - \delta \quad \text{(Eq. 8A)}$$

$$\theta_b = \begin{cases} \theta_a + \pi, & \theta_a < 0 \\ \theta_a, & \theta_a \geq 0 \end{cases} \quad \text{(Eq. 9A)}$$

$$\theta = \begin{cases} \theta_b, & -\frac{\pi}{3} < \tau < +\frac{\pi}{3} \\ \theta_b + \pi & \tau < -\frac{\pi}{3}, \quad \tau > +\frac{\pi}{3} \end{cases} \quad \text{(Eq. 10A)}$$

Where $$\tau_a = \theta_b - a_k$$

$$\alpha_k = \begin{cases} \alpha_i \text{ which gives the least } y_i, \text{ model equation } y = -A\cos(2\alpha - 2\varphi) \\ \alpha_i \text{ which gives the largest } y_i, \text{ model equation } y = A\cos(2\alpha - 2\varphi) \end{cases}$$

$$\tau = \begin{cases} \tau_a, & \tau_a > -(\pi + \delta) \\ \tau_a + 2\pi, & \tau_a < -(\pi + \delta) \end{cases}$$

Equation 7A or 7B and Equations 8A-10A are then used for the actual operation. For example, referring now to FIG. 36, a representative example of a system for sensing rotor position of a motor (system) 142 is given. System 142 is coupled with a delta configuration three-phase permanent magnet synchronous motor (PMSM) 136, and the rotor 138 and stator 140 are represented. System 142 is in many ways similar to system 46 described previously, except that logic elements 144 are configured specifically to perform the operations of Equations 7A/7B and Equations 8A-10A. As with previously described systems, voltage pulses may be used and then a time measured (Tmes) or a current measured (Imes) in order to determine the position of the rotor. Three-phase inverter 26 has the configuration of three-phase inverter 128 of FIG. 24.

Figure 36:
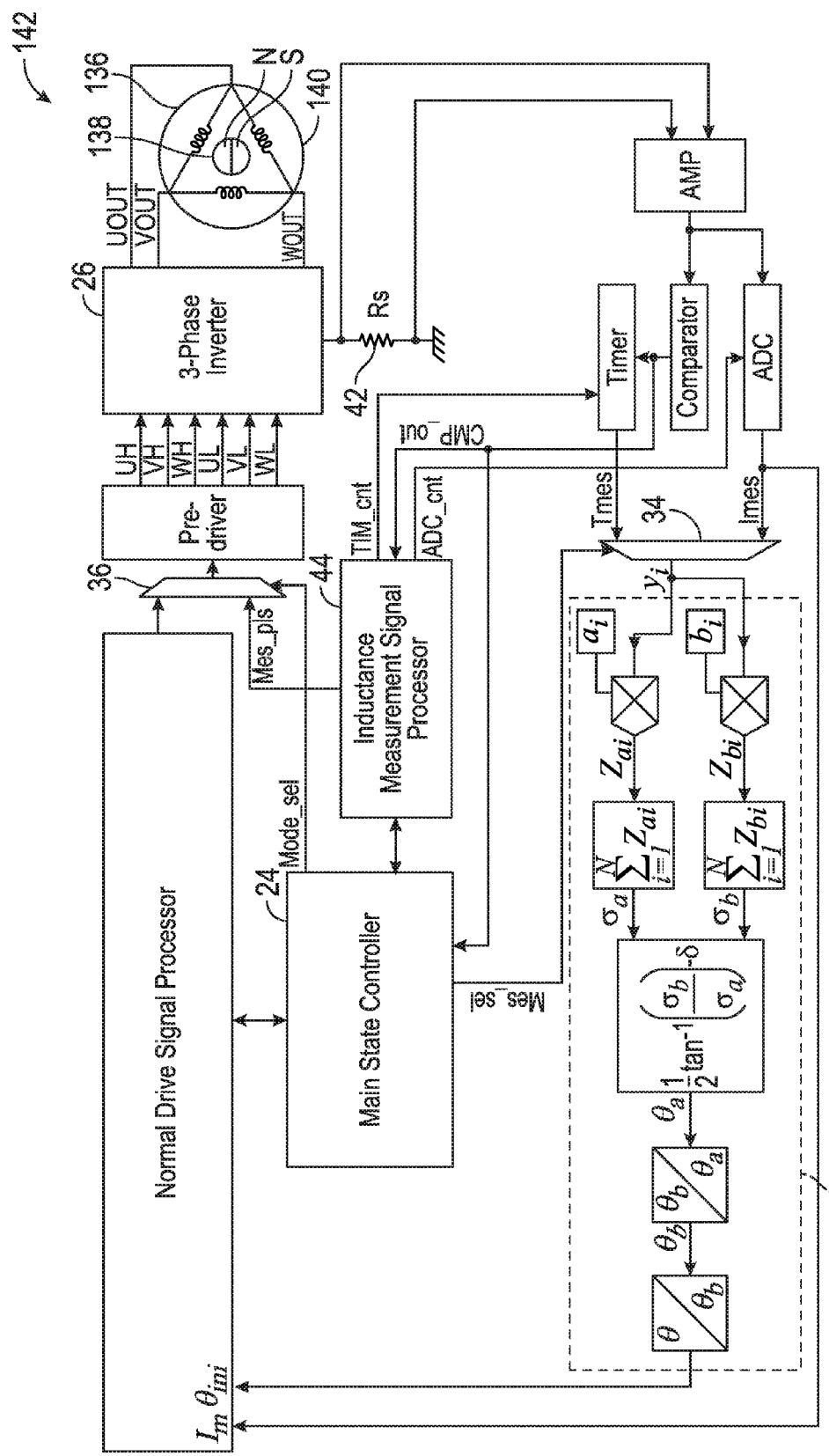
FIG. 36 is a block diagram representatively illustrating elements of an implementation of a system for sensing rotor position of a motor.

The multiplexer 34 is accordingly identical to that previously described and allows the measured values $y_i$ (whether Tmes or Imes values) to be passed through to logic elements 144 so that the position of the rotor of the PMSM may be calculated. The $\alpha_i$ values shown in FIG. 36 are $-\cos(2\alpha_i)$ or $\cos(2\alpha_i)$ and the $b_i$ values shown in FIG. 36 are $\sin(2\alpha_i)$ or $-\sin(2\alpha_i)$ depending on which mode is being used (current or time measurement). The value of $\alpha_i$ may also be described as being equal to $\delta+(i-1)(\pi/3)$. The value of i is greater than or equal to 1 and less than or equal to N (as described, in some implementations i=1, 2, 3, 4, 5, 6).

Summations are performed by logic elements 144 as indicated by Equation 7A/7B. The φ value is calculated using Equation 7A/7B and the δ value is subtracted therefrom to obtain the $\theta_a$ value as indicated by Equation 8A. The $\theta_b$ value is then calculated from the $\theta_a$ value using Equation 9A. The θ value is then calculated from the $\theta_b$ value using Equation 10A. System 142, similar to system 46, is thus used with a non-vector-control PMSM.

Various labels are given to different signals. The Mes_sel is the mode selection signal which is communicated from the main state controller to the multiplexer 34 to determine whether to allow Tmes or Imes signals to pass through (depending on which is being measured, the time or the current). The Mode_sel signal is communicated from the main state controller to the multiplexer 36 to switch between normal operation and initial rotor sensor position sensing operation. The Mes_pls signal is a measuring pulse signal to perform the position sensing. In implementations the Mes_pls signal could itself be the voltage pulse though in other implementations it is only a signal used to effectuate the voltage pulse. TIM_cnt is a control signal from the signal processor 44 to the timer to start/stop the timer. ADC_cnt is a control signal for the ADC to communicate the Imes value to the logic elements (and the Im value to the normal drive signal processor). CMP_out is the comparator output which is communicated to signal processor 44 and to the main state controller. $\theta_{ini}$ represents the initial rotor position as calculated by the system.

Figure 37:
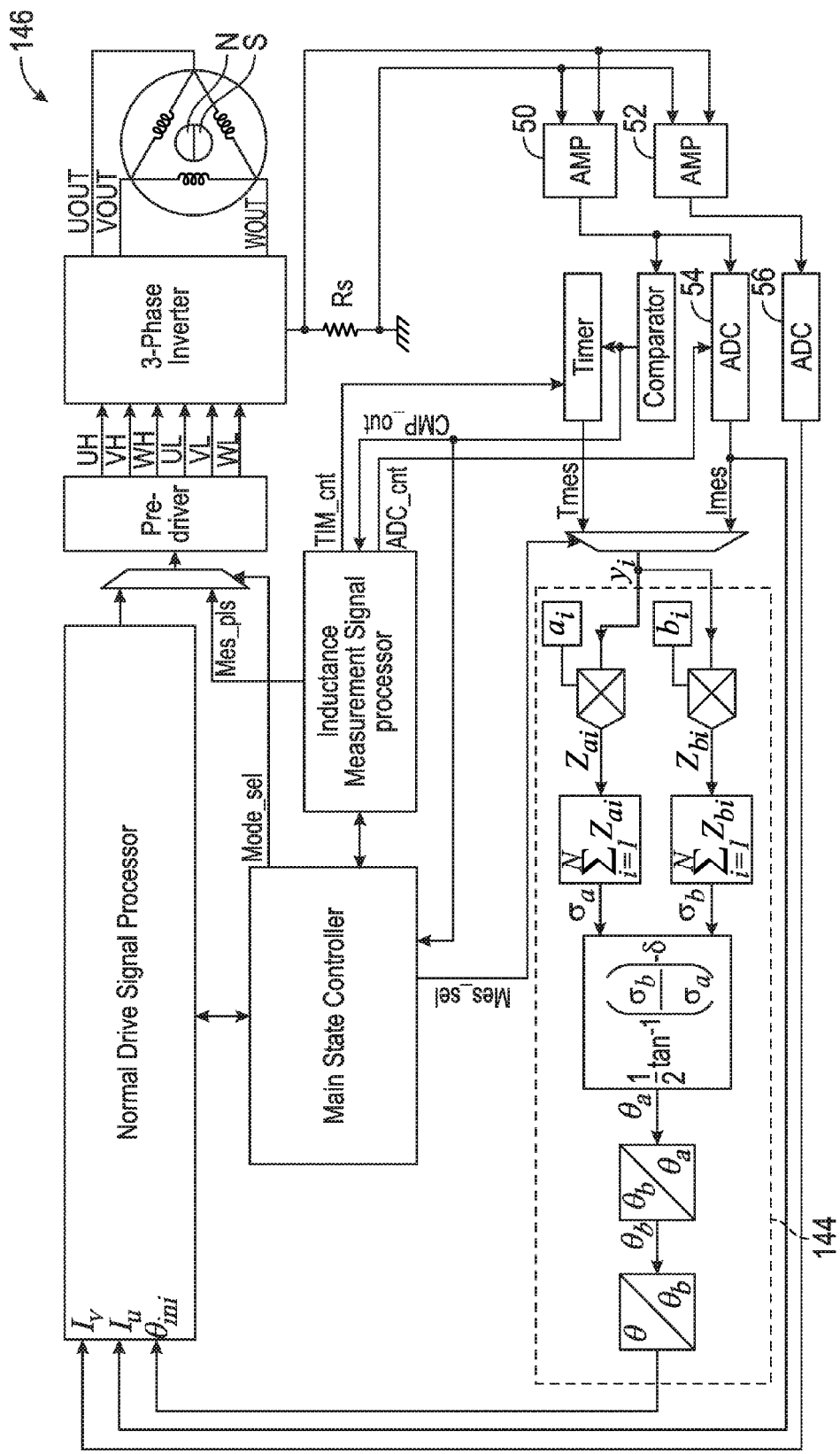
FIG. 37 is a block diagram representatively illustrating elements of another implementation of a system for sensing rotor position of a motor.

FIG. 37 shows a representative example of a system for sensing rotor position of a motor (system) 146 that is similar to system 142 except configured for vector control. An additional amplifier and ADC element are included so that two motor current signals Iv and Iu are sent to the normal drive signal processor for vector control. Thus AMP 50 and AMP 52 are both coupled with the single shunt resistor Rs. The output from AMP 50 is communicated to the comparator for Tmes measuring (for when Tmes mode is used) and the output from AMP 50 is also communicated to the ADC 54 which is converted to a digital signal and then sent to the normal drive signal processor as signal Iu for vector control. Additionally, the output from ADC 54 is communicated to multiplexer 34 but is only passed through to the logic elements 144 if the main state controller has switched the multiplexer to Imes mode. The ADC 54 output is communicated to the multiplexer 34 and to the normal drive signal processor when controlled to do so by the signal processor 44 using the ADC_cnt signal. AMP 52 communicates an analog signal to ADC 56 and ADC 56 coverts this to a digital signal and forwards it to the normal drive signal processor as signal Iv for vector control. The CMP_out signal is forwarded to both the signal processor 44 and to the main state controller. The normal drive signal processor thus uses the initial rotor position signal θini and the vector control current signals Iv and Iu to optimally increase, maintain, or decrease the speed of the rotor of the delta configuration PMSM as desired. The delta configuration PMSM may be an SPMSM or an IPMSM.

Figure 38:
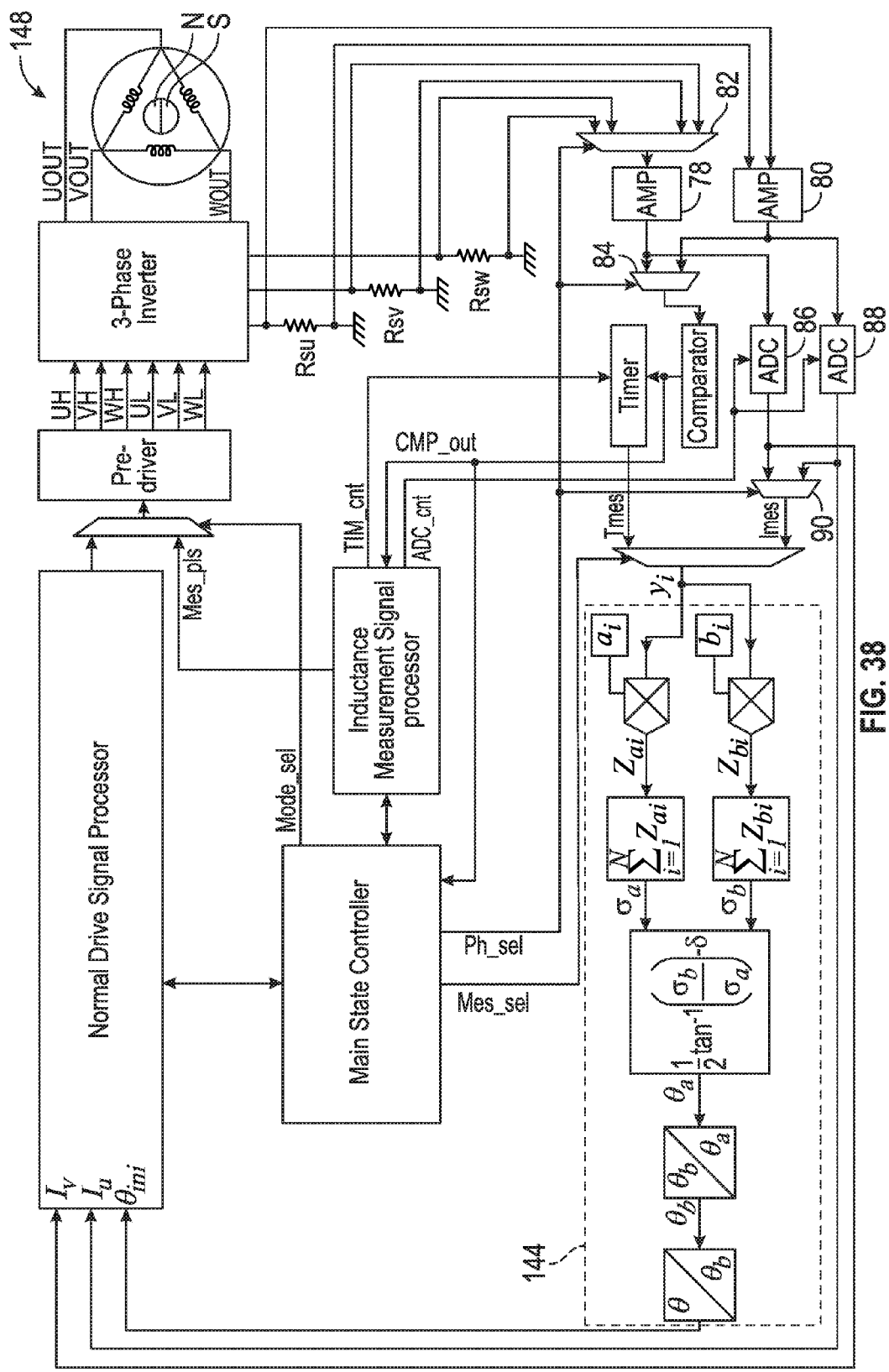
FIG. 38 is a block diagram representatively illustrating elements of another implementation of a system for sensing rotor position of a motor.

FIG. 38 shows an implementation of a system for sensing rotor position of a motor (system) 148 that is in many ways similar to system 76, previously described, except configured for use with a delta-configuration motor and using logic elements 144. The three-phase inverter has the configuration of three-phase inverter 130 of FIG. 25. The same signals are used to control the same switches, as previously described with respect to three-phase inverter 128, but three shunt resistors are coupled therewith as seen: Rsu, Rsv, and Rsw. The signal selection and forwarding is as described above for system 58. Multiplexer 82 forwards either a Tmes or Imes signal corresponding with Rsw or Rsv, and this is amplified using AMP 78 on one line and on another line is forwarded to ADC 86. AMP 80 amplifies a Tmes or Imes signal corresponding with Rsu and forwards it to multiplexer 84 and ADC 88. Multiplexer 90 forwards either the input from ADC 86 or ADC 88 to multiplexer 34. Except for the configuration of the system for use with a delta configuration PMSM (IPMSM or SPMSM) and the use of logic elements 144, the operation of the elements of system 148 is similar or identical to similarly situated elements of system 76. The CMP_out signal is forwarded to both the signal processor 44 and to the main state controller. System 148 is thus used for rotor position measurement or calculation of a vector-controlled delta configuration PMSM (whether SPMSM or IPMSM).

Figure 39:
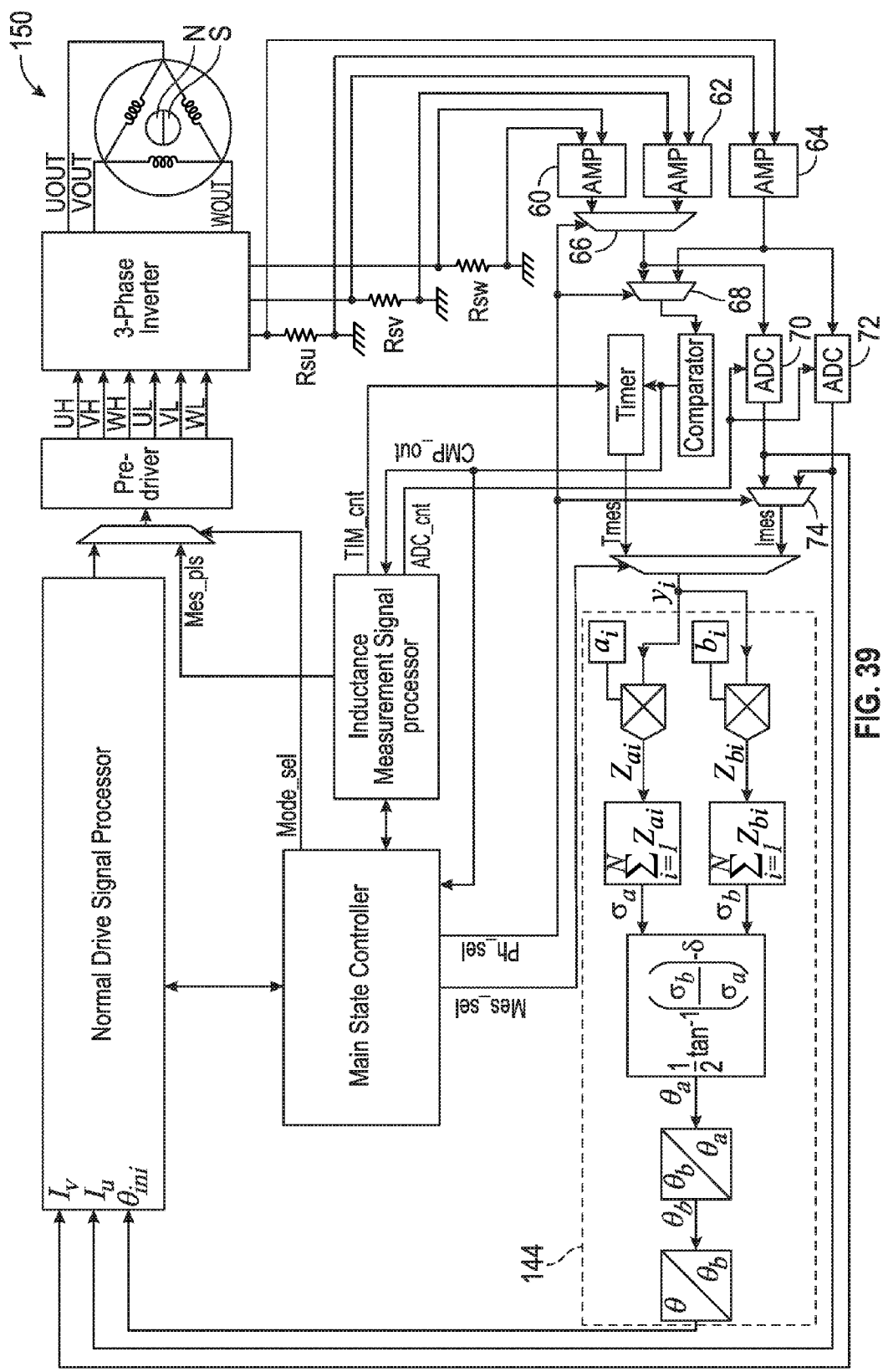
FIG. 39 is a block diagram representatively illustrating elements of another implementation of a system for sensing rotor position of a motor.

FIG. 39 shows an implementation of a system for sensing rotor position of a motor (system) 150 that is in many ways similar to system 58, except configured for use with a vector-controlled delta configuration PMSM (IPMSM or SPMSM) and having logic elements 144 for performing the operations of Equations 7A/7B and 8A-10A. Otherwise the operation and elements are similar as those previously described with respect to system 58.

Figure 40:
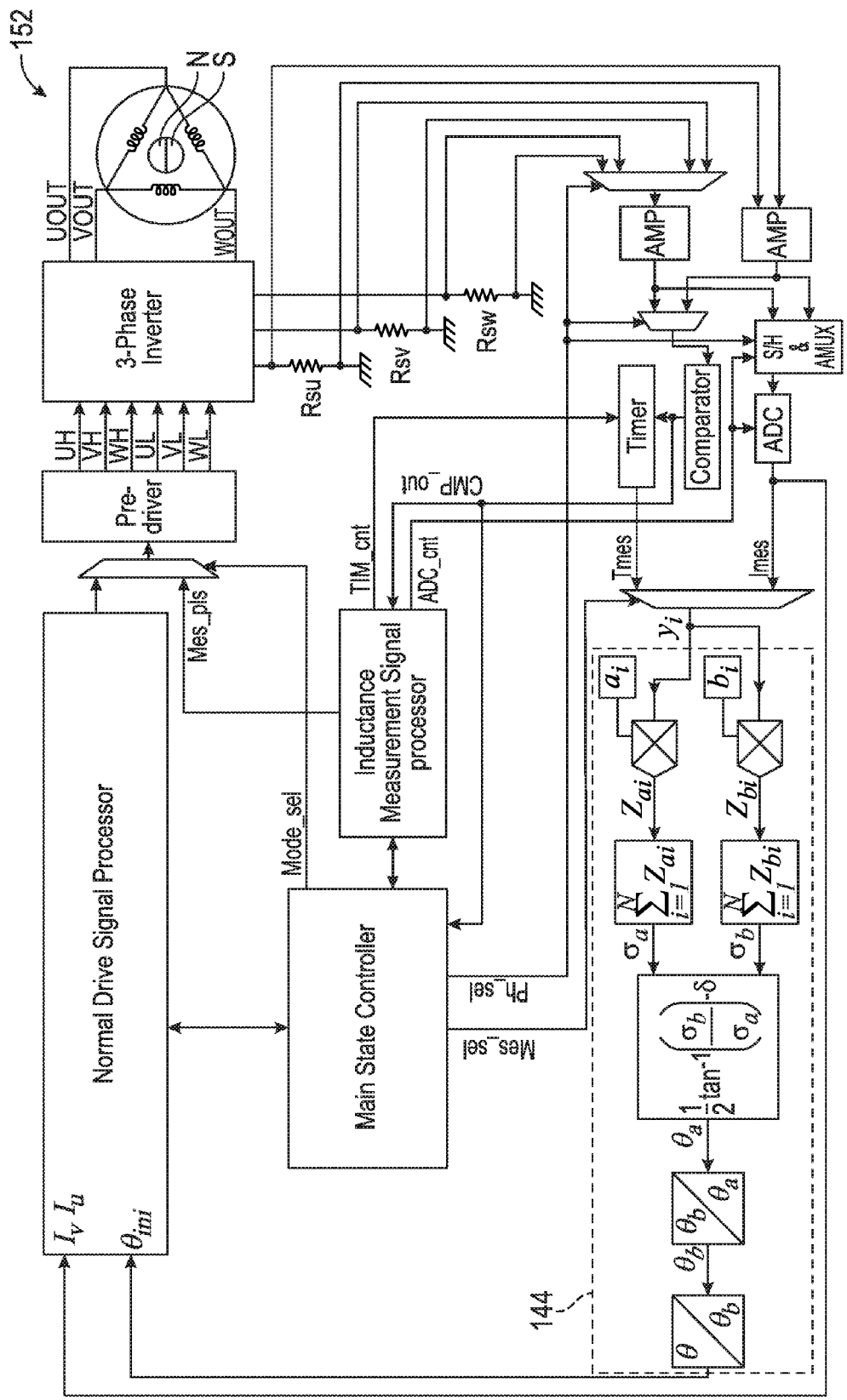
FIG. 40 is a block diagram representatively illustrating elements of another implementation of a system for sensing rotor position of a motor.

FIG. 40 shows an implementation of a system for sensing rotor position of a motor (system) 152 that is in many ways similar to system 92, except configured for use with a vector-controlled delta configuration PMSM (IPMSM or SPMSM) and having logic elements 144 for performing the operations of Equations 7A/7B and 8A-10A. Otherwise the operation and elements are similar as those previously described with respect to system 92.

Figure 41:
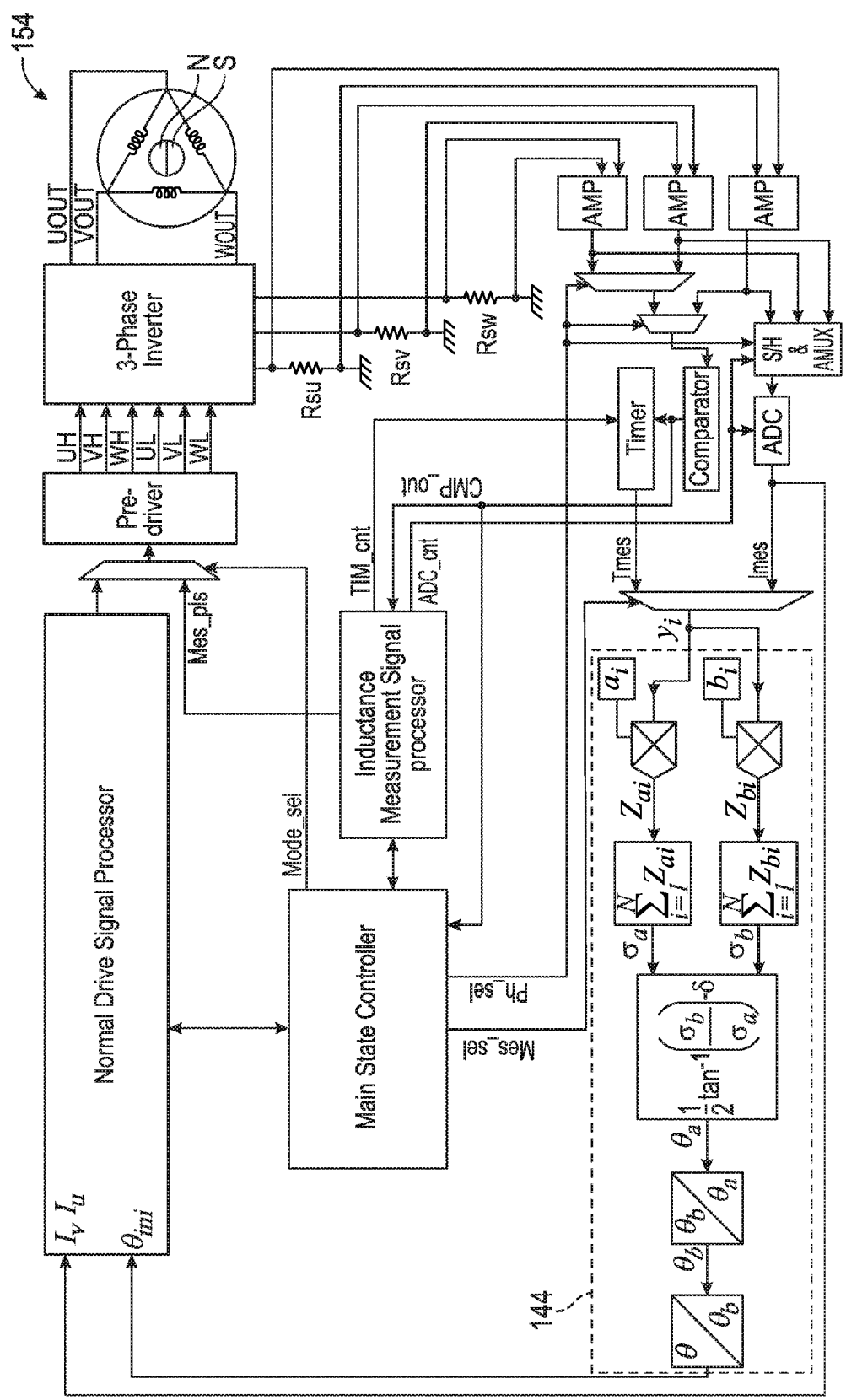
FIG. 41 is a block diagram representatively illustrating elements of another implementation of a system for sensing rotor position of a motor.

FIG. 41 shows an implementation of a system for sensing rotor position of a motor (system) 154 that is in many ways similar to system 110, except configured for use with a vector-controlled delta configuration PMSM (IPMSM or SPMSM) and having logic elements 144 for performing the operations of Equations 7A/7B and 8A-10A. Otherwise the operation and elements are similar as those previously described with respect to system 110.

Figure 42:
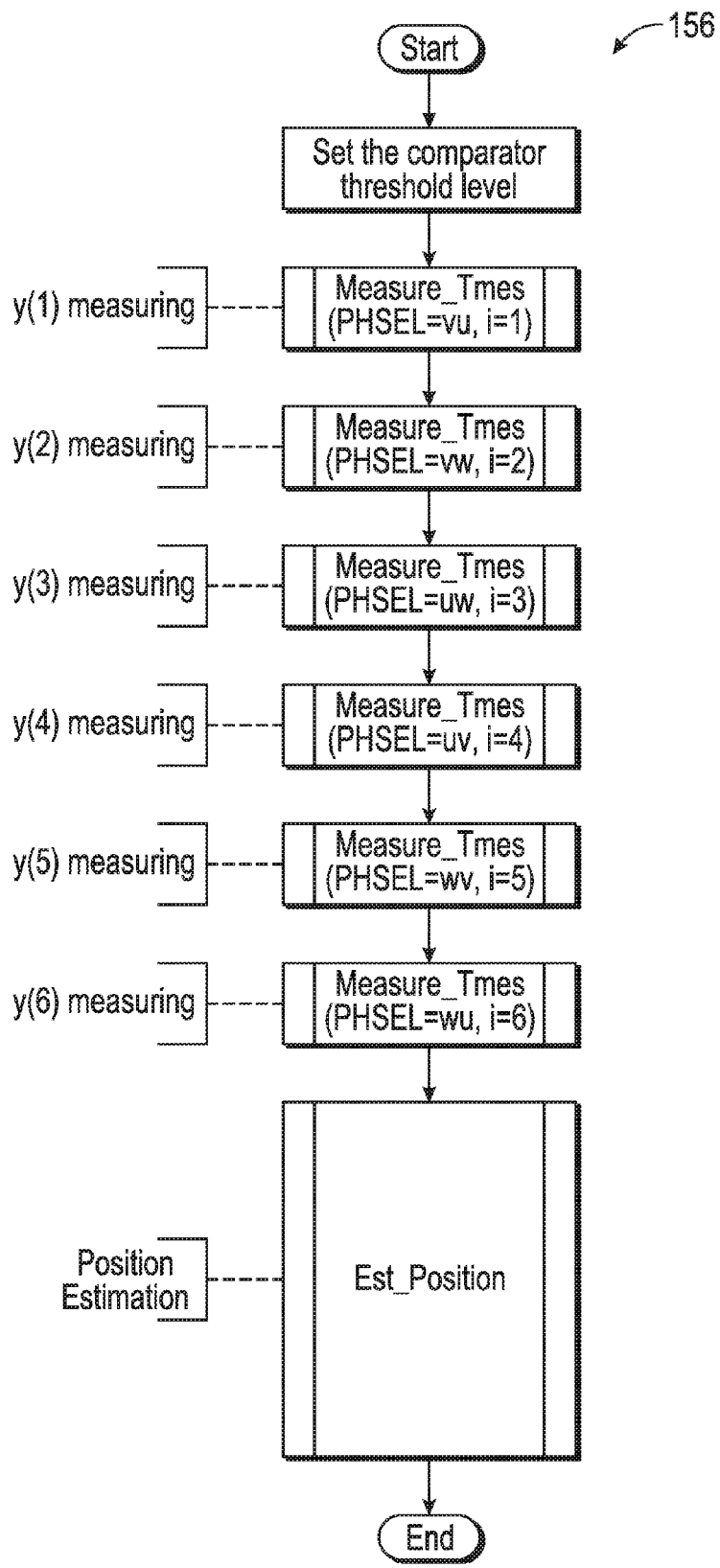
FIG. 42 is a flowchart representatively illustrating a method for sensing rotor position of a motor.

FIG. 42 shows a flow chart representing a method for sensing rotor position of a motor (method) 156 which may be used to sense or calculate the rotor position of a delta-configuration vector-controlled PMSM (whether an SPMSM or IPMSM). The flow chart method representatively illustrates a method which utilizes the Tmes measuring (a similar flowchart with some variations could be shown for Imes measuring). A comparator threshold value is set (to determine when the Ic value is reached for Tmes measuring or to determine when Imes peaks for Imes measuring) and the first $y_i$ measurement $y_1$ is done to measure Tmes corresponding with the vu current vector. This measurement corresponds with i=1. A second $y_i$ measurement $y_2$ is done to measure Tmes corresponding with the vw current vector, which measurement corresponds with i=2. A third measurement $y_3$ is done to measure Tmes corresponding with the uw current vector, which measurement corresponds with i=3. A fourth measurement $y_4$ is done to measure Tmes corresponding with the uv current vector, which measurement corresponds with i=4. A fifth measurement $y_5$ is done to measure Tmes corresponding with the wv current vector, which measurement corresponds with i=5. A sixth measurement $y_6$ is done to measure Tmes corresponding with the wu current vector, which measurement corresponds with i=6. For the Imes method the Imes values corresponding with each current vector could instead be measured.

Position is then calculated using Equation 7A or Equation 7B (depending on whether Tmes or Imes was measured—in this case Tmes was measured) and then Equations 8A-10A are used to calculate the rotor position as has been described previously.

FIG. 27 representatively illustrates a method for measuring time values (method) 134 that is a portion of each $y_1$ measuring step of FIG. 42. The timer is cleared and then the three-phase inverter output is switched to correspond with the Ph_sel signal to select either the wu, wv, uv, uw, vw, or vu current vector. The timer is then started. A wait time occurs until the comparator outputs a signal indicative that a current level Ic has been reached, at which point the timer is stopped. The three-phase inverter output is turned off (i.e., the end of the voltage pulse) and the measured Tmes value is the measured value $y_i$. A wait period then occurs to ensure full decay of the stator coil energy, after which the process may be started again. Although the current vectors are measured in this representative example in a specific order, in other implementations they could be measured in other orders.

A method similar to method 134, but for measuring Imes, could include utilizing the comparator to determine when to control one or more ADCs to forward an Imes signal to the multiplexer 34 for processing. For example, the comparator may determine when a current peaks and, at that time, may signal the signal processor 44 to control the ADC to forward a signal to multiplexer 34. This may be done for each current vector wu, wv, uv, uw, vw, and vu as described above for Tmes measuring.

In places where the description above refers to particular implementations of rotor position sensing system for three phase motors and related methods and implementing components, sub-components, methods and sub-methods, it should be readily apparent that a number of modifications may be made without departing from the spirit thereof and that these implementations, implementing components, sub-components, methods and sub-methods may be applied to other rotor position sensing system for three phase motors and related methods.

What is claimed is:

1. A system for sensing rotor position of a motor, the system comprising:

a controller coupled with a delta configuration three-phase permanent magnet synchronous motor (PMSM), the controller configured to cause a plurality of voltage pulses to be applied to the PMSM;

one of a timer and an analog-to-digital converter (ADC) coupled with the PMSM and with the controller and configured to measure a plurality of values (measured values) from a three-phase inverter coupled with the PMSM, each of the measured values corresponding with one of the plurality of voltage pulses and comprising one of a current value corresponding with an inductance of the PMSM and a time value corresponding with an inductance of the PMSM, one or more logic elements configured to calculate, based on the measured values and using one or more position algorithms, a position of a rotor of the PMSM relative to a stator of the PMSM;

wherein the one or more position algorithms includes one of $$\tan^{-1}\left(\frac{\sum_{i=1}^{N}-\sin(2\alpha_i)y_i}{\sum_{i=1}^{N}-\cos(2\alpha_i)y_i}\right)$$

and $$\tan^{-1}\left(\frac{\sum_{i=1}^{N}\sin(2\alpha_i)y_i}{\sum_{i=1}^{N}\cos(2\alpha_i)y_i}\right)$$

wherein each $\alpha_i$ includes a value between 0 and $2\pi$ and wherein each $y_i$ includes one of the measured values, and wherein the system is configured to calculate the position of the rotor when the rotor is in a stopped configuration and when the rotor is in a rotating configuration.

2. The system of claim 1, wherein the one or more logic elements are coupled with one or more shunt resistors that are coupled with the three-phase inverter.

3. The system of claim 1, wherein the system is configured to calculate a position of a rotor of a PMSM that is not controlled using vector control (field-oriented control).

4. The system of claim 1, wherein the PMSM comprises a surface permanent magnet synchronous motor (SPMSM).

5. The system of claim 1, wherein the PMSM comprises an interior permanent magnet synchronous motor (IPMSM).

6. The system of claim 1, wherein the one or more logic elements calculate the position of the rotor within 30 degrees of accuracy.

7. The system of claim 1, wherein the system comprises the timer, a comparator coupled with the timer, and a signal processor coupled with the timer and configured to toggle the timer between a start configuration and a stop configuration in response to an input from the comparator.

8. The system of claim 1, wherein the system is configured to calculate a position of a rotor of a PMSM that is controlled using vector control (field-oriented control).

9. A system for sensing rotor position of a motor, the system comprising:

a controller coupled with a delta configuration three-phase permanent magnet synchronous motor (PMSM), the controller configured to cause a plurality of voltage pulses to be applied to the PMSM;

at least three shunt resistors coupled with a three-phase inverter coupled with the PMSM;

one of a timer and an analog-to-digital converter (ADC) coupled with the at least three shunt resistors and configured to measure a plurality of values (measured values), each of the measured values corresponding with one of the plurality of voltage pulses and comprising one of a current value corresponding with an inductance of the PMSM and a time value corresponding with an inductance of the PMSM, one or more logic elements coupled with the one of the timer and the ADC and configured to calculate, based on the measured values and using one or more position algorithms, a position of a rotor of the PMSM relative to a stator of the PMSM;

wherein the one or more position algorithms includes one of $$\tan^{-1}\left(\frac{\sum_{i=1}^{N}-\sin(2\alpha_i)y_i}{\sum_{i=1}^{N}-\cos(2\alpha_i)y_i}\right)$$

and $$\tan^{-1}\left(\frac{\sum_{i=1}^{N}\sin(2\alpha_i)y_i}{\sum_{i=1}^{N}\cos(2\alpha_i)y_i}\right)$$

wherein each $\alpha_i$ includes a value between 0 and $2\pi$ and wherein each $y_i$ includes one of the measured values, and wherein the system is configured to calculate the position of the rotor when the rotor is in a stopped configuration and when the rotor is in a rotating configuration.

10. The system of claim 9, wherein the system is configured to calculate a position of a rotor of a PMSM that is not controlled using vector control (field-oriented control).

11. The system of claim 9, wherein the system comprises the timer, the ADC, a comparator, and a multiplexer each coupled with the one or more logic elements.

12. The system of claim 9, wherein the system further comprises a sample and hold element (S/H) and an analog multiplexer (AMUX) coupled with the one or more logic elements.

13. A method for sensing rotor position of a motor, the method comprising:
  coupling a controller and one of a timer and an analog-to-digital converter (ADC) with a delta configuration three-phase permanent magnet synchronous motor (PMSM);
  applying, using the controller, a plurality of voltage pulses to the PMSM;
  measuring, with the one of the timer and the ADC, a plurality of values (measured values) from a three-phase inverter coupled with the PMSM, each of the measured values corresponding with one of the plurality of voltage pulses and comprising one of a current value corresponding with an inductance of the PMSM and a time value corresponding with an inductance of the PMSM,
  calculating, with one or more logic elements coupled with the PMSM, based on the measured values and using one or more position algorithms, a position of a rotor of the PMSM relative to a stator of the PMSM;
  wherein the one or more position algorithms includes one of $$\tan^{-1}\left(\frac{\sum_{i=1}^{N}-\sin(2\alpha_i)y_i}{\sum_{i=1}^{N}-\cos(2\alpha_i)y_i}\right)$$

and $$\tan^{-1}\left(\frac{\sum_{i=1}^{N}\sin(2\alpha_i)y_i}{\sum_{i=1}^{N}\cos(2\alpha_i)y_i}\right)$$

wherein each $\alpha_i$ includes a value between 0 and $2\pi$ and wherein each $y_i$ includes one of the measured values,
  wherein the one or more logic elements are configured to calculate the position of the rotor when the rotor is in a stopped configuration and when the rotor is in a rotating configuration, and
  wherein the one or more logic elements are configured to calculate a position of a rotor of a PMSM that is not controlled using vector control (field-oriented control).

14. The method of claim 13, further comprising calculating, with the one or more logic elements, the position of the rotor relative to the stator when the rotor is in the stopped configuration.

15. The method of claim 13, further comprising coupling the timer with the PMSM and toggling the timer between a start configuration and a stop configuration using a signal processor in response to an input from a comparator.

16. The method of claim 13, further comprising coupling the ADC with the PMSM, converting an analog signal from the three-phase inverter to a digital signal using the ADC, and communicating the digital signal from the ADC to the one or more logic elements.

17. The method of claim 13, wherein the measured values are measured using one or more elements coupled with one or more shunt resistors that are coupled with the three-phase inverter.

* * * * *